US012571600B2

(12) United States Patent
Hebrink et al.

(10) Patent No.: US 12,571,600 B2
(45) Date of Patent: Mar. 10, 2026

(54) RADIATIVE COOLING ARTICLES INCLUDING A WHITE DIFFUSELY REFLECTIVE LAYER AND A NON-WHITE COLOR REFLECTIVE MIRROR

(71) Applicant: 3M INNOVATIVE PROPERTIES COMPANY, St. Paul, MN (US)

(72) Inventors: Timothy J. Hebrink, Scandia, MN (US); Lynn E. Lorimor, Minneapolis, MN (US); Lin Zhao, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 412 days.

(21) Appl. No.: 18/246,857

(22) PCT Filed: Oct. 28, 2021

(86) PCT No.: PCT/IB2021/059984
§ 371 (c)(1),
(2) Date: Mar. 28, 2023

(87) PCT Pub. No.: WO2022/112881
PCT Pub. Date: Jun. 2, 2022

(65) Prior Publication Data
US 2023/0366642 A1     Nov. 16, 2023

Related U.S. Application Data

(60) Provisional application No. 63/117,553, filed on Nov. 24, 2020.

(51) Int. Cl.
| | |
|---|---|
| *F28F 13/18* | (2006.01) |
| *G02B 5/02* | (2006.01) |
| *B60H 1/32* | (2006.01) |

(52) U.S. Cl.
CPC .............. *F28F 13/18* (2013.01); *G02B 5/021* (2013.01); *G02B 5/0226* (2013.01); *B60H 1/32* (2013.01)

(58) Field of Classification Search
CPC .............. B32B 7/023; B32B 2307/408; B32B 2307/416; B60H 1/32; F28F 13/18;
(Continued)

(56) References Cited

U.S. PATENT DOCUMENTS

| | | | |
|---|---|---|---|
| 3,239,478 A | 3/1966 | Harlan, Jr. | |
| 3,711,176 A | 1/1973 | Alfrey, Jr. et al. | |

(Continued)

FOREIGN PATENT DOCUMENTS

| | | | |
|---|---|---|---|
| EP | 3732514 A1 | 9/2023 | |
| EP | 3732514 B1 * | 9/2023 | ........... G02B 5/0841 |

(Continued)

OTHER PUBLICATIONS

Berreman, "Optics is Stratified and Anisotropic Media: 4×4-Matrix Formulation", Journal of the Optical Society of America, 1972, vol. 62, No. 4, pp. 502-510.

(Continued)

*Primary Examiner* — Eric S Ruppert
*Assistant Examiner* — Hans R Weiland
(74) *Attorney, Agent, or Firm* — Philip P. Soo; Adrian L. Pishko

(57) ABSTRACT

The present disclosure provides a radiative cooling article including a white diffusely reflective microporous layer and a non-white color reflective mirror film having first and second optical layers. The white diffusely reflective microporous layer has a solar weighted reflectivity at normal incidence of electromagnetic radiation over a majority of wavelengths in a range of 350 nanometers (nm) to 2500 nm of 0.8 or greater, 0.85, 0.9, or 0.95 or greater. The non-white (Continued)

color reflective film is disposed adjacent to a major surface of the white diffusely reflective microporous layer and the non-white color reflective film reflects a wavelength bandwidth of at least 30 nm within a wavelength range of 350 nm to 700 nm. The non-white color reflective film can be tuned to reflect light of a specific color (e.g., blue light, green light, or red light). The radiative cooling article may be useful for applications including commercial graphics located outdoors (e.g., on vehicles or buildings). The present disclosure further provides a composite cooling article including the radiative cooling article attached to a vehicle or a trailer. Also, the present disclosure provides a multi-surface passive cooling article including first and second elements in which at least one of the elements includes the radiative cooling article.

20 Claims, 19 Drawing Sheets

(58) Field of Classification Search

CPC ........ G02B 5/021; G02B 5/0226; G02B 5/02; Y02B 10/10

See application file for complete search history.

(56) References Cited

U.S. PATENT DOCUMENTS

| | | | |
|---|---|---|---|
| 3,935,338 A | 1/1976 | Robertson | |
| 4,162,343 A | 7/1979 | Wilcox et al. | |
| 4,181,752 A | 1/1980 | Martens et al. | |
| 4,310,584 A * | 1/1982 | Cooper | B32B 27/36 |
| | | | 428/483 |
| RE31,780 E | 12/1984 | Cooper et al. | |
| 4,726,989 A | 2/1988 | Mrozinski | |
| 4,874,567 A | 10/1989 | Lopatin et al. | |
| 4,952,650 A | 8/1990 | Young et al. | |
| 4,976,859 A | 12/1990 | Wechs | |
| 5,037,475 A | 8/1991 | Chida et al. | |
| 5,089,318 A | 2/1992 | Shetty et al. | |
| 5,103,337 A | 4/1992 | Schrenk et al. | |
| 5,122,905 A | 6/1992 | Wheatley et al. | |
| 5,122,906 A | 6/1992 | Wheatley | |
| 5,126,880 A | 6/1992 | Wheatley et al. | |
| 5,141,790 A | 8/1992 | Calhoun et al. | |
| 5,154,765 A | 10/1992 | Armanini | |
| 5,169,727 A | 12/1992 | Boardman | |
| 5,217,794 A | 6/1993 | Schrenk | |
| 5,233,465 A | 8/1993 | Wheatley et al. | |
| 5,238,623 A | 8/1993 | Mrozinski | |
| 5,262,894 A | 11/1993 | Wheatley et al. | |
| 5,268,228 A | 12/1993 | Orr | |
| 5,278,694 A | 1/1994 | Wheatley et al. | |
| 5,296,277 A | 3/1994 | Wilson et al. | |
| RE34,605 E | 5/1994 | Schrenk et al. | |
| 5,339,198 A | 8/1994 | Wheatly | |
| 5,344,681 A | 9/1994 | Calhoun et al. | |
| 5,360,659 A | 11/1994 | Arends et al. | |
| 5,362,516 A | 11/1994 | Wilson et al. | |
| 5,405,680 A * | 4/1995 | Chang | C09D 5/00 |
| | | | 428/404 |
| 5,448,404 A | 9/1995 | Schrenk et al. | |
| 5,449,540 A | 9/1995 | Calhoun et al. | |
| 5,450,235 A | 9/1995 | Smith | |
| 5,486,949 A | 1/1996 | Schrenk et al. | |
| 5,504,134 A | 4/1996 | Palmer et al. | |
| 5,614,286 A | 3/1997 | Bacon, Jr. et al. | |
| 5,691,846 A | 11/1997 | Benson, Jr. et al. | |
| 5,751,388 A | 5/1998 | Larson | |
| 5,763,049 A | 6/1998 | Frey et al. | |
| 5,876,688 A | 3/1999 | Laundon | |
| 5,882,774 A | 3/1999 | Jonza et al. | |
| 5,993,954 A | 11/1999 | Radovanovic et al. | |
| 6,045,894 A | 4/2000 | Jonza et al. | |

| | | | |
|---|---|---|---|
| 6,096,247 A | 8/2000 | Ulsh et al. | |
| 6,179,948 B1 | 1/2001 | Merrill et al. | |
| 6,261,994 B1 | 7/2001 | Bourdelais et al. | |
| 6,277,485 B1 | 8/2001 | Invie et al. | |
| 6,315,651 B1 | 11/2001 | Kuo | |
| 6,368,699 B1 | 4/2002 | Gilbert et al. | |
| 6,368,742 B2 | 4/2002 | Fisher et al. | |
| 6,531,230 B1 | 3/2003 | Weber et al. | |
| 6,632,850 B2 | 10/2003 | Hughes et al. | |
| 6,667,095 B2 | 12/2003 | Wheatley et al. | |
| 6,783,349 B2 | 8/2004 | Neavin et al. | |
| 6,967,778 B1 | 11/2005 | Wheatley et al. | |
| 7,060,351 B2 | 6/2006 | Hannington | |
| 7,271,951 B2 | 9/2007 | Weber et al. | |
| 7,328,638 B2 | 2/2008 | Gardiner et al. | |
| 7,350,442 B2 | 4/2008 | Ehnes et al. | |
| 7,632,568 B2 | 12/2009 | Padiyath et al. | |
| 7,652,736 B2 | 1/2010 | Padiyath et al. | |
| 7,952,805 B2 | 5/2011 | Mcgurran et al. | |
| 8,557,378 B2 | 10/2013 | Yamanaka et al. | |
| 8,962,214 B2 | 2/2015 | Smith et al. | |
| 10,240,013 B2 | 3/2019 | Mrozinski et al. | |
| 2003/0036577 A1 * | 2/2003 | Hughes | B01D 71/262 |
| | | | 521/82 |
| 2005/0233070 A1 | 10/2005 | Pellerite et al. | |
| 2006/0188704 A1 | 8/2006 | Mikami et al. | |
| 2007/0212635 A1 | 9/2007 | Oguma et al. | |
| 2009/0087629 A1 | 4/2009 | Everaerts et al. | |
| 2009/0147361 A1 | 6/2009 | Gardiner et al. | |
| 2010/0028564 A1 | 2/2010 | Cheng et al. | |
| 2010/0040842 A1 | 2/2010 | Everaerts et al. | |
| 2011/0126968 A1 | 6/2011 | Determan et al. | |
| 2013/0236697 A1 | 9/2013 | Walker, Jr. et al. | |
| 2014/0131023 A1 | 5/2014 | Raman et al. | |
| 2015/0131146 A1 | 5/2015 | Fan et al. | |
| 2015/0175479 A1 | 6/2015 | Brown et al. | |
| 2015/0338175 A1 * | 11/2015 | Raman | B60H 1/32 |
| | | | 165/185 |
| 2016/0268464 A1 | 9/2016 | Fan et al. | |
| 2016/0298266 A1 | 10/2016 | Zillig et al. | |
| 2019/0184687 A1 * | 6/2019 | Yasuda | B32B 27/08 |

FOREIGN PATENT DOCUMENTS

| | | | |
|---|---|---|---|
| JP | H07-138541 A | 5/1995 | |
| JP | H07-29569 U | 6/1995 | |
| WO | 1995017303 A1 | 6/1995 | |
| WO | 1996019347 A2 | 6/1996 | |
| WO | 1997001440 A1 | 1/1997 | |
| WO | 1997032224 A1 | 9/1997 | |
| WO | 1999039224 A1 | 8/1999 | |
| WO | 2000048037 A2 | 8/2000 | |
| WO | 2002012404 A2 | 2/2002 | |
| WO | 2008128073 A2 | 10/2008 | |
| WO | 2009089137 A2 | 7/2009 | |
| WO | 2017172564 A2 | 10/2017 | |
| WO | 2018130926 A1 | 7/2018 | |
| WO | 2019130198 A1 | 7/2019 | |
| WO | 2019130199 A1 | 7/2019 | |
| WO | 2020072818 A1 | 4/2020 | |
| WO | 2020240366 A1 | 12/2020 | |
| WO | 2020240447 A1 | 12/2020 | |
| WO | 2021137080 A1 | 7/2021 | |

OTHER PUBLICATIONS

Gentle, "A Subambient Open Roof Surface on the Mid-Summer Sun", Advanced Science, Sep. 2015, vol. 2, No. 9, 4 pages.

Hossain, "A Metamaterial Emitter for Highly Efficient Radiative Cooling", Advanced Optical Materials, 2015, vol. 3, No. 8, pp. 1047-1051.

Hossain, "Radiative Cooling: Principles, Progress, and Potentials", Advanced Science, 2016, vol. 3, pp. 1500360/1-1500360/10.

International Search report for PCT International Application No. PCT/US2021/059984, mailed on Jan. 25, 2022, 3 pages.

Li, "Full Daytime Sub-Ambient Radiative Cooling in Commercial-like Paints with High Figure of Merit", Cell Reports Physical Science, Oct. 2020, vol. 1, No. 10, Article 100221, pp. 1-12.

(56)          References Cited

OTHER PUBLICATIONS

Raman, "Passive Radiative Cooling Below Ambient Air Temperature Under Direct Sunlight", Nature, Nov. 2014, vol. 515, pp. 540-544.
Stallinga, "Berreman 4×4 matrix method for reflective liquid crystal displays", Journal of Applied Physics, Mar. 15, 1999, vol. 85, No. 6, pp. 3023-3031.
Tian, "Self-Cleaning and Self-Cooling Paper", arXiv preprint arXiv:2008.11889, 2020, pp. 1-13.
Zhai, "Scalable-Manufactured Randomized Glass-Polymer Hybrid Metamaterial for Daytime Radiative Cooling", Science, Mar. 2017, vol. 355, No. 6329, pp. 1062-1066.
Jyotirmoy Mandal et al: "Hierarchically porous polymer coatings for highly efficient passive daytime radiative cooling", Science, vol. 362, No. 6412, Oct. 19, 2018 (Oct. 19, 2018), pp. 315-319.
Extended European Search Report, Sep. 23, 2024.

* cited by examiner

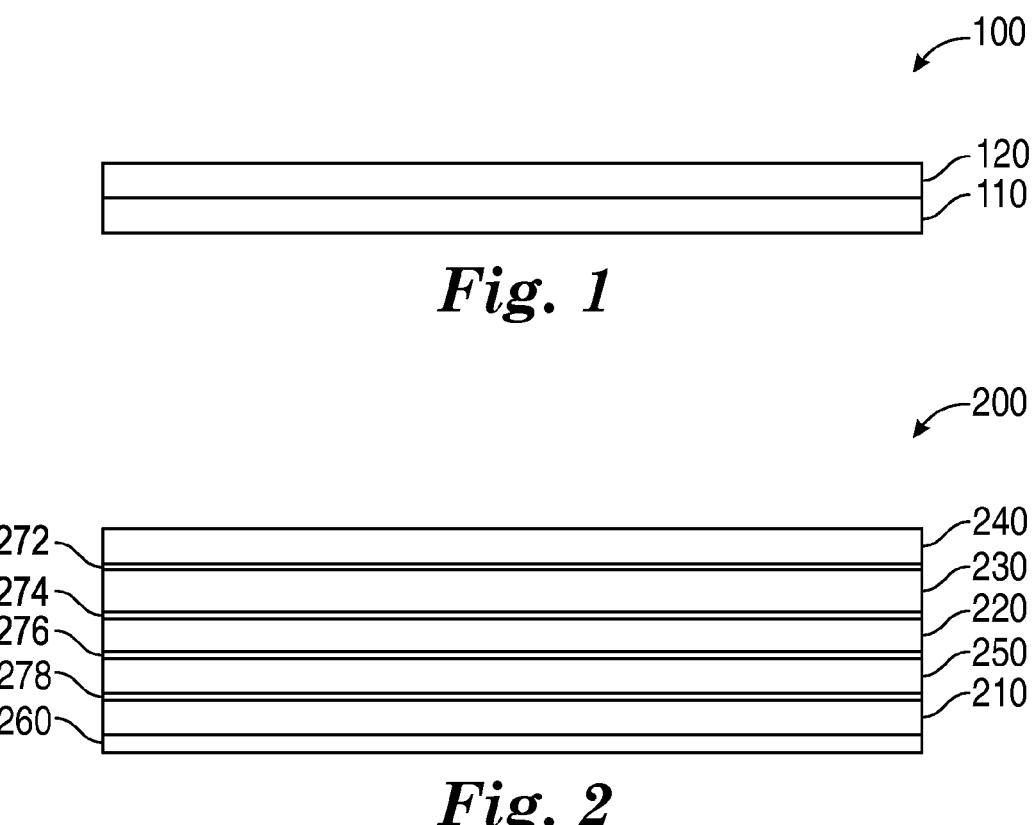
*Fig. 1*
*Fig. 2*
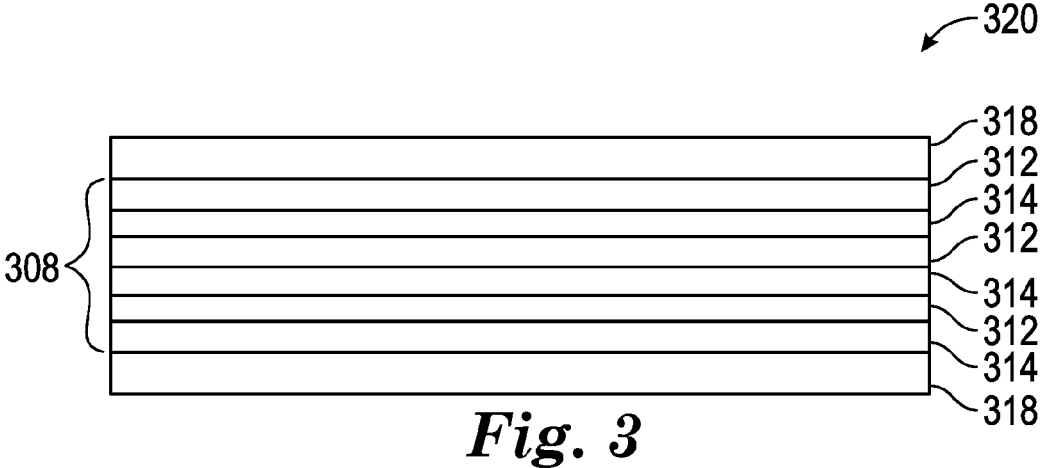
*Fig. 3*

1208

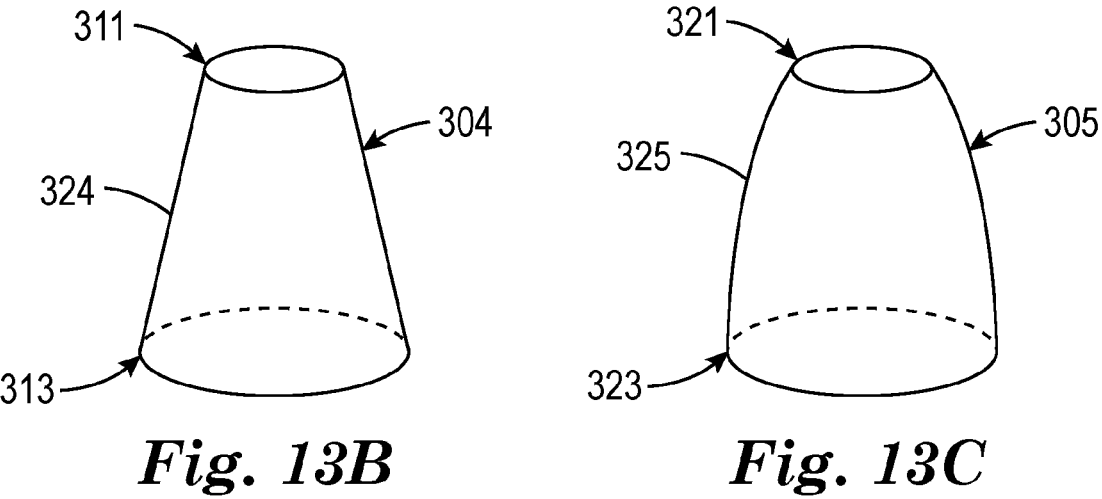
*Fig. 13B*          *Fig. 13C*
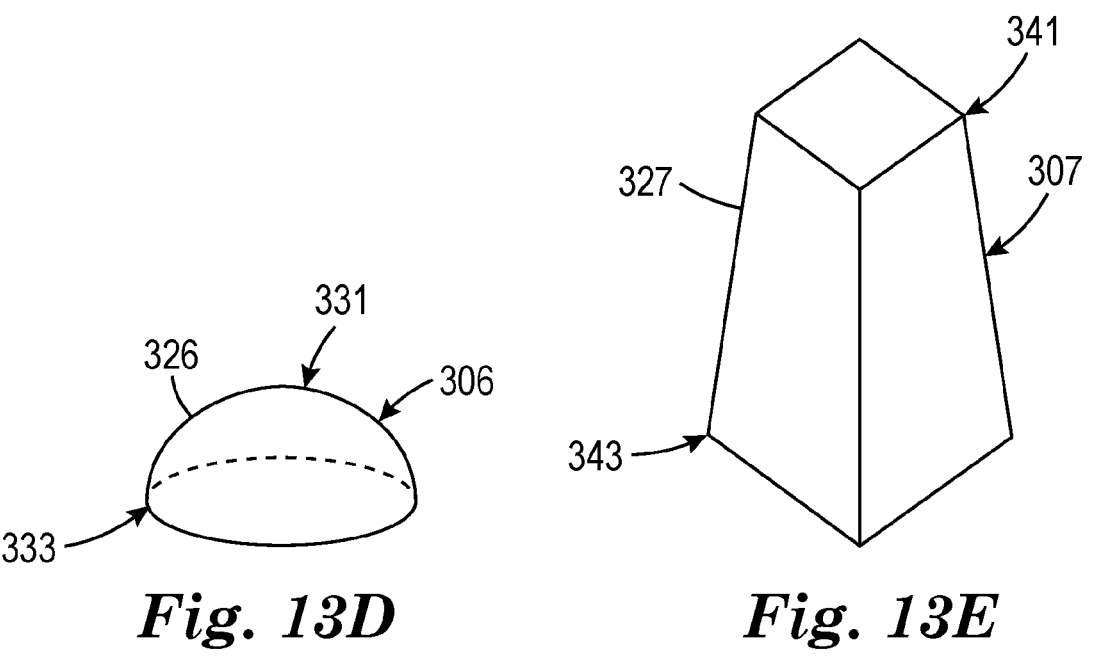
*Fig. 13D*          *Fig. 13E*

1810

1820

RADIATIVE COOLING ARTICLES INCLUDING A WHITE DIFFUSELY REFLECTIVE LAYER AND A NON-WHITE COLOR REFLECTIVE MIRROR

FIELD

The present disclosure generally relates to passive radiative cooling articles.

BACKGROUND

Passive radiative cooling without external energy sources may be appealing for reducing electricity needed in cooling applications such as refrigeration, air conditioning, vehicles, electrical transformers, and communication antennas. Surface material properties for passive radiative cooling to occur during the day include low emittance over the solar energy wavelengths of 0.3 to 2.5 micrometers and high emittance over infrared wavelength range of 3 to 20 micrometers. For cooling surfaces below air temperature by passive radiative cooling, the surface may have high emittance in the infrared wavelength range of 8 to 13 micrometers and not in the wavelength range of 3 to 8 micrometers (or 13 to 20 micrometers). According to Kirchhoff's law of thermal radiation, high emittance correlates to high absorbance. The orientation of the radiative cooling surface relative to the sky, especially on vertical surfaces, may affect performance. Some investigation into the ability to conduct passive cooling during the day has been conducted. Some cooling panels made with films for passive cooling have been described. Further advancements in passive radiative cooling technologies would be desirable.

SUMMARY

In a first aspect, a radiative cooling article is provided. The radiative cooling article comprises a white diffusely reflective microporous layer; and a non-white color reflective mirror film having a plurality of first optical layers and a plurality of second optical layers. The white diffusely reflective microporous layer has a solar weighted reflectivity at normal incidence of electromagnetic radiation over a majority of wavelengths in a range of 350 nanometers (nm) to 2500 nm of 0.8 or greater, 0.85, 0.9, or 0.95 or greater. The non-white color reflective film is disposed adjacent to a major surface of the white diffusely reflective microporous layer and the non-white color reflective film reflects a wavelength bandwidth of at least 30 nm within a wavelength range of 350 nm to 700 nm. The non-white color reflective film can be tuned to reflect light of a specific color (e.g., blue light, green light, or red light). The radiative cooling article may be useful for applications including commercial graphics located outdoors (e.g., on buildings or vehicles such as buses, automobiles, trucks, or trains).

In a second aspect, a composite cooling system is provided. The composite cooling system includes a radiative cooling article according to the first aspect attached to a vehicle or trailer.

In a third aspect, a multi-surface passive cooling article is provided. The multi-surface passive cooling article includes a plurality of first elements defining first element outer surfaces, the plurality of first elements defining a first absorbance of greater than or equal to 0.6 in an atmospheric window wavelength range from 8 to 13 micrometers and defining a first average reflectance of greater than or equal to 80% in a solar wavelength range from 0.4 to 2.5 micrometers. At least one of the first elements includes a radiative cooling layer including a) a white diffusely reflective microporous layer that has a solar weighted reflectivity at normal incidence of electromagnetic radiation over a majority of wavelengths in a range of 350 nanometers (nm) to 2500 nm of 0.8 or greater, 0.85, 0.9, or 0.95 or greater; and b) a non-white color reflective mirror film having a plurality of first optical layers and a plurality of second optical layers, the non-white color reflective film disposed adjacent to a major surface of the white diffusely reflective microporous layer, wherein the non-white color reflective film reflects a wavelength bandwidth of at least 30 nm within a wavelength range of 350 nm to 700 nm. The multi-surface passive cooling article further includes a plurality of second elements defining second element outer surfaces, the plurality of second elements defining a second absorbance of less than or equal to 0.5 in the atmospheric window wavelength range and defining a second average reflectance of greater than or equal to 60% in the solar wavelength range. The plurality of first elements and the plurality of second elements are interspersed to form a major structure having a first major surface including the first element outer surfaces and the second element outer surfaces and a second major surface opposing the first major surface. The major structure has a first end region and a second end region, wherein the first element outer surfaces face a first direction toward the first end region and the second element outer surfaces face a second direction toward the second end region.

BRIEF DESCRIPTION OF THE DRAWINGS

FIG. 1 is a schematic cross-sectional view of an exemplary radiative cooling article preparable according to the present disclosure.

FIG. 2 is a schematic cross-sectional view of another exemplary radiative cooling article preparable according to the present disclosure.

FIG. 3 is a schematic side view of an exemplary multi-layer optical film.

FIG. 4A shows a perspective view of a cross section relative to xyz-axes. FIG. 4C shows the cross section of FIG. 4A in an xz-plane. FIG. 4B shows another cross section in a yz-plane.

FIGS. 13B-13E are illustrations of various surface structures that may be used on the surface shown in FIG. 13A.

DETAILED DESCRIPTION

Glossary

Figure 4A:
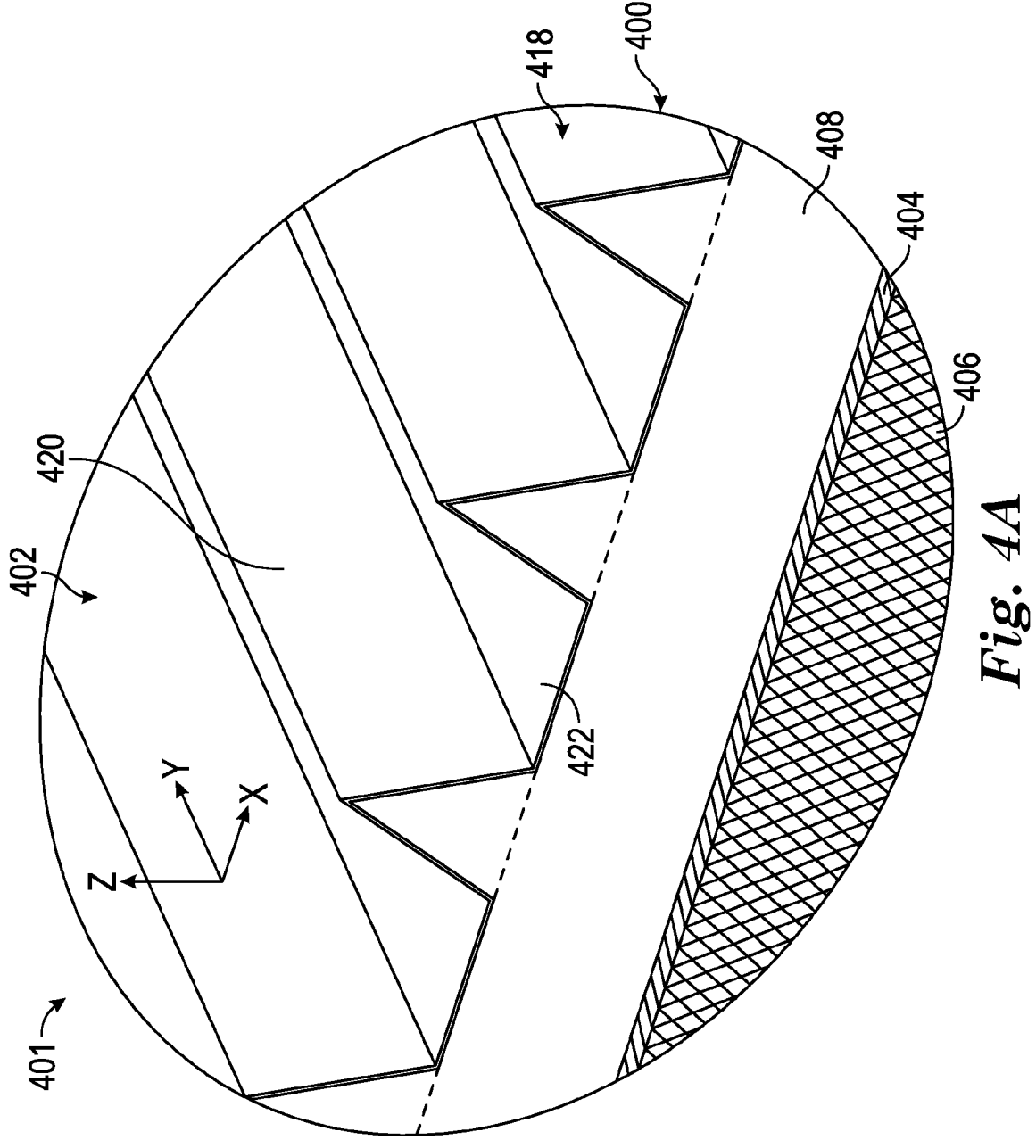
FIGS. 4A, 4B, and 4C are views of an antisoiling surface structure having micro-structures.

As used herein, "majority" means greater than 50%.

As used herein, "copolymer" refers to a polymer formed of two or more different monomers.

As used herein, "fluoropolymer" refers to any organic polymer containing fluorine.

As used herein, "nonfluorinated" means not containing fluorine.

As used herein, "adjacent" encompasses both in direct contact (e.g., directly adjacent) and having one or more intermediate layers present between the adjacent materials.

As used herein, "secured to" means directly or indirectly affixed to (e.g., in direct contact with, or adhesively bonded to by a unitary layer of adhesive).

As used herein, "incident" with respect to light refers to the light falling on or striking a material.

As used herein, "microporous" means having internal porosity (continuous and/or discontinuous) having average pore diameters of 50 to 10,000 nm. "Micro-voided" means having internal discrete voids having an average void diameter of 50 to 10,000 nm. Microporous and micro-voided are used interchangeably herein for the same purpose of reflecting solar energy and emitting far infrared energy in the atmospheric window region.

As used herein, the "atmospheric window region" or "atmospheric window wavelength range" of the electromagnetic spectrum refers to a portion of the electromagnetic spectrum that partially or fully includes wavelengths that can be partially transmitted through the atmosphere.

The atmospheric window region may include at least some infrared wavelengths of light. The atmospheric window region may be defined as wavelengths ranging from 8 to 13 micrometers, 7 to 14 micrometers, or even 6 to 14 micrometers As used herein, "infrared" (IR) refers to infrared electromagnetic radiation having a wavelength of >700 nm to 1 mm, unless otherwise indicated.

As used herein, "visible" (VIS) refers to visible electromagnetic radiation having a wavelength to from 400 nm to 700 nm, inclusive, unless otherwise indicated.

As used herein, "ultraviolet" (UV) refers to ultraviolet electromagnetic radiation having a wavelength of at least 250 nm and up to but not including 400 nm, unless otherwise indicated.

As used herein, "radiation" refers to electromagnetic radiation unless otherwise specified.

As used herein, "absorption" refers to a material converting the energy of light radiation to internal energy.

As used herein, "absorb" with respect to wavelengths of light encompasses both absorption and scattering, as scattered light also eventually gets absorbed.

As used herein, "scattering" with respect to wavelengths of light refers to causing the light to depart from a straight path and travel in different directions with different intensities.

As used herein, "reflectance" is the measure of the proportion of light or other radiation striking a surface at normal incidence which is reflected off it. Reflectivity typically varies with wavelength and is reported as the percent of incident light that is reflected from a surface (0 percent—no reflected light, 100—all light reflected. Reflectivity and reflectance are used interchangeably herein.

As used herein, "reflective" and "reflectivity" refer to the property of reflecting light or radiation, especially reflectance as measured independently of the thickness of a material.

As used herein, "average reflectance" refers to reflectance averaged over a specified wavelength range.

Absorbance can be measured with methods described in ASTM E903-12 "Standard Test Method for Solar Absorptance, Reflectance, and Transmittance of Materials Using Integrating Spheres". Absorbance measurements described herein were made by making transmission measurements as previously described and then calculating absorbance using Equation 1.

As used herein, the term "absorbance" with respect to a quantitative measurement refers to the base 10 logarithm of a ratio of incident radiant power to transmitted radiant power through a material. The ratio may be described as the radiant flux received by the material divided by the radiant flux transmitted by the material. Absorbance (A) may be calculated based on transmittance (T) according to Equation 1:

$$A = -\log_{10} T \qquad (1)$$

Emissivity can be measured using infrared imaging radiometers with methods described in ASTM E1933-14 (2018) "Standard Practice for Measuring and Compensating for Emissivity Using Infrared Imaging Radiometers." According to Kirchhoff's law of thermal radiation, absorbance correlates with emittance. Absorbance, absorptivity, emissivity, and emittance are used interchangeably herein for the same purpose of emitting infrared energy to the atmosphere. Absorb and emit are also used interchangeably herein.

As used herein, the terms "transmittance" and "transmission" refer to the ratio of total transmission of a layer of a material compared to that received by the material, which may account for the effects of absorption, scattering, reflection, etc. Transmittance (T) may range from 0 to 1 or be expressed as a percentage (T %).

As used herein, "transparent" refers to a material (e.g., film or layer) that absorbs less than 20% of light having wavelengths between 350 nm and 2500 nm.

As used herein, "bandwidth" refers to a width of a contiguous band of wavelengths.

As used herein, "non-white" refers to a material that absorbs a predetermined wavelength band, peak, or spectrum in the visible spectrum, associated with a predetermined color other than white.

As used herein, "white" refers to a material that scatters light in the visible spectrum such that the material exhibits an appearance of a white color.

As used herein, the term "passive radiative cooling" refers to providing cooling without consuming energy from a source of energy, such as a battery or other electricity source. Passive radiative cooling may be defined in contrast to "active cooling" for which a source of energy is consumed (for example, cooling by air conditioning unit having a compressor and fan powered by electricity).

As used herein, the term "sub-ambient cooling" refers to cooling a surface below ambient air temperature.

Radiative Cooling Articles

In a first aspect, the present disclosure provides a radiative cooling article. The radiative cooling article comprises:

a) a white diffusely reflective microporous layer that has a solar weighted reflectivity at normal incidence of electromagnetic radiation over a majority of wavelengths in a range of 350 nm to 2500 nm of 0.8 or greater, 0.85, 0.9, or 0.95 or greater; and b) a non-white color reflective mirror film having a plurality of first optical layers and a plurality of second optical layers, the non-white color reflective film disposed adjacent to a major surface of the white diffusely reflective microporous layer, wherein the non-white color reflective film reflects a wavelength bandwidth of at least 30 nm within a wavelength range of 350 nm to 700 nm. The non-white color reflective mirror film has higher reflectivity than the white diffusely reflective microporous layer.

Referring to the schematic cross-sectional view of FIG. 1, the present disclosure provides a colored radiative cooling article 100 by combining a non-white color reflecting mirror film 120 with a white diffusely reflective radiative cooling film 110. Suitable mirror films can be tuned to reflect, for example, blue light, green light, or red light with higher reflectivity than white diffusely reflective films reflect over the same wavelengths. In at least some embodiments, unique combinations of non-white color reflecting mirror films and white diffusely reflective microporous layers create a colored film capable of reflecting greater than 80% of solar energy, which is a requirement for sub-ambient cooling of surfaces. These unique combinations also tend to have an emissivity in the atmospheric window range of 8-13 micrometers, which is another requirement for sub-ambient cooling of surfaces. Colored radiative cooling films may be especially useful for commercial graphics applications of transportation vehicles including buses, trucks, trains, and even automobiles.

In some embodiments, the radiative cooling article comprises one or more indicium present on a major surface of at least one of the white diffusely reflective microporous layer or the non-white color reflective mirror film. Colored patterns can be made with the colored mirror to form graphics, including indicia, for aesthetic and marketing reasons. Further, one or more infrared-reflective colored pigments could be printed in graphic patterns, including letters and numbers, on the white diffusely reflective microporous layer or onto the color reflective mirror film. For instance, Example 3 of the present disclosure provides a red "3M" logo, achieved by black ink printed on a white diffusely reflective microporous layer and laminated to a red color reflective mirror film. The 3M logo is red in appearance because only the light reflected by the red mirror is seen over the black background. A black and white photograph of the example is provided in FIG. 18.

Any infrared-reflective ink or pigment is suitable for use in articles of the present disclosure. For instance, some suitable materials include the paints described in PCT publication WO 2020/072818 (Ruan et al.), incorporated by reference herein in its entirety, including a particle-polymer composite containing nanoparticles or microparticles in a polymeric matrix. Preferably, the particles have an electron bandgap of greater than 3.2 eV. The particles may be formed of $CaCO_3$, $BaSO_4$, ZnS, $SiO_2$, $Al_2O_3$, MgO, $YAlO_3$, CaO, $MgAl_2O_4$, and/or $LaAlO_3$, and optionally present in the paint in an amount of greater than 10% by volume. The polymeric matrix may be formed of an acrylic, silicone, polyvinyl alcohol, or polydimethylsiloxane.

In some embodiments, an infrared-reflective pigment may be an inorganic oxide pigment. Exemplary infrared-reflective pigments can include, without limitation, titanium dioxide, zinc sulfide, titanium brown spinal, chromium oxide green, iron oxide red, chrome titanate yellow, and nickel titanate yellow. Infrared-reflective pigments can include metals and metal alloys of aluminum, chromium, cobalt, iron, copper, manganese, nickel, silver, gold, iron, tin, zinc, bronze, brass. Metal alloys can include zinc-copper alloys, zinc-tin alloys, and zinc-aluminum alloys, among others. Some specific examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, or combinations thereof. Commercially available inorganic infrared-reflective pigments include those sold under the trade names XFAST, SICOPAL, METEOR, and SICOTAN, all available from BASF Corporation (Southfield, MI). For instance, XFAST Black 0095 has less absorption than conventional black pigments. Other inorganic infrared-reflective pigments are available from The Shepherd Color Company of Cincinnati, Ohio and Ferro of Cleveland, Ohio.

Infrared-reflective pigments can be homogeneous or heterogeneous. For example, an infrared-reflective pigment may be a composite material including a coating on a core material, e.g., a silica core coated with a metal, such as copper, or a titanium dioxide-coated mica particle. Exemplary composite pigments including a coloring pigment adsorbed on the surface of a metallic particle are described in U.S. Pat. No. 5,037,475 (Chida, et al.), which is incorporated herein by reference. Such colored metallic pigments are commercially available from U.S. Aluminum, Inc., Flemington, N.J., under the trade name FIREFLAKE.

Unexpectedly, it has been discovered that articles according to the present disclosure act exhibit passive radiative cooling properties. This is surprising at least because colored articles typically have low cooling power, particularly in comparison to uncolored articles. In certain embodiments, radiative cooling articles according to the present disclosure have an average absorbance of electromagnetic radiation of at least 0.80 over the wavelength range of 8-13 micrometers, such as 0.81 or greater, 0.82, 0.83, 0.84, 0.85, 0.86, 0.87, 0.88, 0.89, or 0.90 or greater. It is to be understood that the percent of incident light absorbed refers to the amount absorbed integrated over a particular wavelength range (as opposed to the amount of a single wavelength that is absorbed). Preferably, radiative cooling articles according to at least certain embodiments of the present disclosure exhibit passive radiative cooling to below ambient temperature under direct sunlight.

Each of the white diffusely reflective microporous layer and the non-white color reflective mirror film will be described in detail below:

White Diffusely Reflective Microporous Layer

The white diffusely reflective microporous layer may comprise a network of interconnected voids and/or discrete voids, which may be spherical, oblate, or some other shape. Primary functions of the white diffusely reflective microporous layer include reflecting at least a portion of visible and infrared radiation of the solar spectrum and to emit thermal radiation in the atmospheric window (i.e., wavelengths of 8 to 14 micrometers).

Accordingly, the white diffusely reflective microporous layer has voids that are of appropriate size that they diffusely reflect wavelengths in the 350 to 2500 nm wavelength range. Generally, this means that the void sizes should be in a size range (e.g., 100 to 3000 nm). Preferably, a range of void sizes corresponding to those dimensions is present so that effective broadband reflection will be achieved. As used herein the term "polymer" includes synthetic and natural organic polymers (e.g., cellulose and its derivatives). In some embodiments, the white diffusely reflective microporous layer comprises a polyester or polyester copolymer. In certain embodiments, the white diffusely reflective microporous layer comprises at least one of polyethylene, polypropylene, a polysaccharide, a fluoropolymer, or a fluoropolymer copolymer. Often, the white diffusely reflective microporous layer comprises a micro-voided film.

Reflectivity of the white diffusely reflective microporous layer is generally a function of the number of polymer film/void interfaces, since reflection (typically diffuse reflection) occurs at those locations. Accordingly, the porosity and thickness of the white diffusely reflective microporous layer will be important variable. In general, higher porosity and higher thickness correlate with higher reflectivity. However, for cost considerations film thickness is preferably minimized, although this is not a requirement. Accordingly, the thickness of the white diffusely reflective microporous layer is typically in the range of 10 micrometers to 500 micrometers, preferably in the range of 10 micrometers to 200 micrometers, although this is not a requirement. Likewise, the porosity of the white diffusely reflective microporous layer is typically in the range of 10 volume percent to 90 volume percent, preferably in the range of 20 volume percent to 85 volume percent, although this is not a requirement.

Microporous polymer films suitable for use as the white diffusely reflective microporous layer are known in the art and are described, for example, in U.S. Pat. No. 8,962,214 (Smith et al.) entitled "Microporous PVDF Films", in U.S. Pat. No. 10,240,013 (Mrozinski et al.) entitled "Microporous Material from Ethylene-Chlorotrifluoroethylene Copolymer and Method for Making Same", and in U.S. Pat. No. 4,874,567 (Lopatin et al.) entitled "Microporous Membranes from Polypropylene". These films may have average pore diameters of at least 0.05 micrometers.

In certain embodiments, the white diffusely reflective microporous layer includes at least one Thermally Induced Phase Separation (TIPS) material. The pore size of TIPS materials can be generally controlled due to the ability to select the extent of stretching of the layer. TIPS materials are relatively inexpensive to make, and methods for making them are known to the skilled practitioner. For example, various materials and methods are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.). White diffusely reflective microporous layers for use in aspects of the present disclosure also include Solvent Induced Phase Separated (SIPS) materials (e.g., U.S. Pat. No. 4,976,859 (Wechs)) and other white diffusely reflective microporous layers made by extrusion, extrusion/stretching and extrusion/stretching/extraction processes. Suitable white diffusely reflective microporous layers that may be formed by SIPS include for example and without limitation polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable white diffusely reflective microporous layers that may be formed by stretching techniques (e.g., U.S. Pat. No. 6,368,742 (Fisher et al.)) include for example and without limitation polytetrafluoroethylene (PTFE) and polypropylene.

In certain embodiments, the white diffusely reflective microporous layer comprises a thermoplastic polymer, for instance polyethylene, polypropylene, 1-octene, styrene, polyolefin copolymer, polyamide, poly-1-butene, poly-4-methyl-1-pentene, polyethersulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof.

Materials suitable for use as the white diffusely reflective microporous layer include nonwoven fibrous layers. Polymeric nonwoven layers can be made using a melt blowing process. Melt blown nonwoven fibrous layers can contain very fine fibers. In melt-blowing, one or more thermoplastic polymer streams are extruded through a die containing closely arranged orifices. These polymer streams are attenuated by convergent streams of hot air at high velocities to form fine fibers, which are then collected on a surface to provide a melt-blown nonwoven fibrous layer. Depending on the operating parameters chosen, the collected fibers may be semi-continuous or essentially discontinuous. Polymeric nonwoven layers can also be made by a process known as melt spinning. In melt spinning, the nonwoven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded", whereby a web comprising a set of melt-spun fibers are collected as a fibrous web and optionally subjected to one or more bonding operations to fuse the fibers to each other. Melt-spun fibers are generally larger in diameter than melt-blown fibers.

Polymers suitable for use in a melt blown or melt spinning process include polyolefins such as polypropylene and polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinyl acetate, polyacrylonitrile, cyclic polyolefin, and copolymers and blends thereof. In some embodiments, the polymer, copolymer, or blend thereof represents at least 35% of the overall weight of the directly formed fibers present in the nonwoven fibrous layer.

Nonwoven fibers can be made from a thermoplastic semi-crystalline polymer, such as a semi-crystalline polyester. Useful polyesters include aliphatic polyesters. Nonwoven materials based on aliphatic polyester fibers can be especially advantageous in resisting degradation or shrinkage at high temperature applications. This property can be achieved by making the nonwoven fibrous layer using a melt blowing process where the melt blown fibers are subjected to a controlled in-flight heat treatment operation immediately upon exit of the melt blown fibers from the multiplicity of orifices. The controlled in-flight heat treatment operation takes place at a temperature below a melting temperature of the portion of the melt blown fibers for a time sufficient to achieve stress relaxation of at least a portion of the molecules within the portion of the fibers subjected to the controlled in-flight heat treatment operation. Details of the in-flight heat treatment are described in U.S. Pat. Appl. Publ. No. 2016/0298266 (Zillig et al.).

Nonwoven fibrous layers that may be used for the white diffusely reflective microporous layer include ones made using an air laid process, in which a wall of air blows fibers onto a perforated collection drum having negative pressure inside the drum. The air is pulled though the drum and the fibers are collected on the outside of the drum where they are removed as a web.

Exemplary embodiments of microporous membrane fabricated with nonwoven fibers are highly reflective white papers comprising polysaccharides. Micro-porous polysaccharide white papers having greater than 90% reflectance over visible wavelengths of 400 to 700 nm are available from International Paper, Memphis, Tennessee, under the trade designations IP ACCENT OPAQUE DIGITAL (100 lbs), IP ACCENT OPAQUE DIGITAL (100 lbs), HAMMERMILL PREMIUM COLOR COPY (80 lbs), and HAMMERMILL PREMIUM COLOR COPY (100 lbs). Titania, $BaSO_4$ and other white pigments are often added to paper to increase their reflection of visible light (400-700 nm).

Other nonwoven fibrous layers that may be used for the white diffusely reflective microporous layer include those made using a wet laid process. A wet laying or "wetlaid" process comprises (a) forming a dispersion comprising one or more types of fibers, optionally a polymeric binder, and optionally a particle filler(s) in at least one dispersing liquid (preferably water); and (b) removing the dispersing liquid from the dispersion.

Suitable fibers for use in air laid and wet laid processes include those made from natural (animal or vegetable) and/or synthetic polymers, including thermoplastic and solvent-dispersible polymers. Useful polymers include wool; silk; cellulosic polymers (e.g., cellulose and cellulose derivatives); fluorinated polymers (e.g., polyvinyl fluoride, polyvinylidene fluoride, copolymers of vinylidene fluoride such as poly(vinylidene fluoride-co-hexafluoropropylene), and copolymers of chlorotrifluoroethylene such as poly(ethylene-co-chlorotrifluoroethylene)); chlorinated polymers; polyolefins (e.g., polyethylene, polypropylene, poly-1-butene, copolymers of ethylene and/or propylene, with 1-butene, 1-hexene, 1-octene, and/or 1-decene (e.g., poly(ethylene-co-1-butene), poly(ethylene-co-1-butene-co-1-hexene)); polyisoprenes; polybutadienes; polyamides (e.g., nylon 6, nylon 6,6, nylon 6,12, poly(iminoadipoyliminohexamethylene), poly(iminoadipoyliminodecamethylene), or polycaprolactam); polyimides (e.g., poly(pyromellitimide));

polyethers; polyether sulfones (e.g., poly(diphenyl ether sulfone), or poly(diphenyl sulfone-co-diphenylene oxide sulfone)); polysulfones; polyvinyl acetates; copolymers of vinyl acetate (e.g., poly(ethylene-co-vinyl acetate), copolymers in which at least some of the acetate groups have been hydrolyzed to provide various poly(vinyl alcohols) including poly(ethylene-co-vinyl alcohol)); polyphosphazenes; polyvinyl esters; polyvinyl ethers; poly(vinyl alcohols); polyaramids (e.g., para-aramids such as poly(paraphenylene terephthalamide) and fibers sold under the trade designation KEVLAR by DuPont Co., Wilmington, DE, pulps of which are commercially available in various grades based on the length of the fibers that make up the pulp such as, e.g., KEVLAR 1F306 and KEVLAR 1F694, both of which include aramid fibers that are at least 4 mm in length); polycarbonates; and combinations thereof. Nonwoven fibrous layers may be calendered to adjust the pore size.

The use of a reflective micro-voided polymer film as the white diffusely reflective microporous layer may provide a reflectance that is even greater than that of a silvered mirror. In some embodiments, a reflective micro-voided polymer film reflects a maximum amount of solar energy in a range from 350 to 2500 nanometers (nm). In particular, the use of a fluoropolymer blended into the micro-voided polymer film may provide a reflectance that is greater than other conventional multilayer optical films. Further, inorganic particles including barium sulfate, calcium carbonate, silica, alumina, aluminum silicate, zirconia, and titania may be blended into the micro-voided polymer film for providing high solar reflectance in solar radiation spectra of 0.4 to 2.5 micrometers and high absorbance in the atmospheric window of 8 to 13 micrometers. Preferably, the inorganic particles are white inorganic particles. In some embodiments, the article may form part of a cooling panel that may be disposed on the exterior of at least part of a building or a heat transfer system. The heat transfer system can cool a fluid, liquid or gas, which can then be used to remove heat from a building or vehicle, including an electric vehicle battery. The outer layer may be suitable for protecting the white diffusely reflective microporous layer, particularly, in outdoor environments. Including the outer layer may also facilitate less soiling of the surface and ease of cleaning the surface.

Exemplary polymers useful for forming the reflective micro-voided polymer film include polyethylene terephthalate (PET) available from 3M Company. Modified PET copolyesters including PETG available, for example, as SPECTAR 14471 and EASTAR GN071 from Eastman Chemical Company, Kingsport, TN, and PCTG available, for example, as TIGLAZE ST and EB0062 also from Eastman Chemical Company are also useful high refractive index polymers. The molecular orientation of PET and PET modified copolyesters may be increased by stretching which increases its in-plane refractive indices providing even more reflectivity in the multilayer optical film. In general, an incompatible polymer additive, or inorganic particle additive, is blended into the PET host polymer at levels of at least 10 wt. %, at least 20 wt. %, at least 30 wt. %, at least 40 wt. %, or even at least 49 wt. % during extrusion prior to stretching to nucleate voids during the stretching process. Suitable incompatible polymer additives for PET include: fluoropolymers, polypropylenes, polyethylenes, and other polymers which do not adhere well to PET. Similarly, if polypropylene is the host polymer, then incompatible polymer additives such as PET or fluoropolymers can be added to the polypropylene host polymer at levels of at least 1 wt. %, at least 5 wt. %, at least 10 wt. %, at least 20 wt. %, at least 30 wt. %, at least 40 wt. %, or even at least 49 wt. % during extrusion prior to stretching to nucleate voids during the stretching process. Exemplary suitable inorganic particle additives for nucleating voids in micro-voided polymer films include titania, silica, alumina, aluminum silicate, zirconia, calcium carbonate, barium sulfate, and glass beads and hollow glass bubbles, although other inorganic particles and combinations of inorganic particles may also be used. Cross-linked polymeric microspheres can also be used instead of inorganic particles. Preferably, the polymeric particles comprise particles of an aromatic polyester. Inorganic particles can be added to the host polymer at levels of at least 10 wt. %, at least 20 wt. %, at least 30 wt. %, at least 40 wt. %, or even at least 49 wt. % during extrusion prior to stretching to nucleate voids during the stretching process. If present, the inorganic particles preferably have a volume average particle diameter of 5 nm to 1 micrometer, although other particle sizes may also be used. Hard particles including glass beads and/or glass bubbles can be present on the surface layer of UV mirror skin layer or the antisoiling layer to provide scratch resistance. In some embodiments, glass beads and/or glass bubbles may even protrude from the surface as hemispheres or even quarter spheres. Crosslinked polymer beads such as those available from Soken Chemical and Engineering Co. under the trade designation "CHEMIS-NOW" can be effective void nucleating agents. Glass beads such as those available from Potters Industries LLC under the trade designation "SPHERIGLASS" can be effective nucleating agents. Similarly, if polypropylene is the host polymer, then incompatible polymer additives such as PET or fluoropolymers or crosslinked polymer beads or glass beads can be added to the polypropylene host polymer at levels of at least 1 wt. %, at least 5 wt. %, at least 10 wt. %, at least 20 wt. %, at least 30 wt. %, at least 40 wt. %, or even at least 49 wt. % during extrusion prior to stretching to nucleate voids during the stretching process.

In some embodiments, micro-voided polymer films comprise a fluoropolymer continuous phase. Exemplary suitable polymers include ECTFE, PVDF, and copolymers of tetrafluoroethylene, hexafluoropropylene, and vinylidene fluoride such as, for example, those available under the trade designation THV from 3M Company. Employing a fluoropolymer continuous phase can be advantageous when the radiative cooling article is formed to be at least partially nonplanar because fluoropolymers are often more flexible than other polymers (e.g., PET).

Exemplary micro-voided PET film comprising barium sulfate is available as LUMIRROR XJSA2 from Toray Plastics (America) Inc., North Kingstown, RI. LUMIRROR XJSA2 comprises $CaCO_3$ inorganic additive and crosslinked polymer beads to increase its reflectivity of visible light (400-700 nm) and solar energy (350-2500 nm). Additional exemplary reflective micro-voided polymer films are available from Mitsubishi Polymer Film, Inc., Greer, SC, as HOSTAPHAN V54B, HOSTAPHAN WDI3, and HOSTAPHAN W270.

Exemplary micro-voided polyolefin films are described in, for example, U.S. Pat. No. 6,261,994 (Bourdelais et al.).

The white diffusely reflective microporous layer is diffusely reflective, for example, of visible radiation over a majority of wavelengths in the range of 350 to 700 nanometers, inclusive.

In some embodiments, the white diffusely reflective microporous layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 350 nm (in some embodiments 375 nm or greater, 400 nm, 425 nm, 450 nm 475 nm, 500 nm, 525 nm, 550 nm, 575 nm, or 600 nm or greater) up to 700 nm (in some embodiments 675 nm or less, 650 nm, 625 nm, 600 nm, 575 nm, 550 nm, 525 nm, or 500 nm or less).

The reflectivity of the white diffusely reflective microporous layer may be reflective over a broader wavelength range. Accordingly, in some embodiments, the reflectivity of the microporous polymer layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 2.5 micrometers, preferably at least 300 nm to 3.0 micrometers, although this is not a requirement.

Non-White Color Reflective Mirror Film

The use of multilayer reflective films comprising alternating layers of two or more polymers to reflect light is known and is described, for example, in U.S. Pat. No. 3,711,176 (Alfrey, Jr. et al.), U.S. Pat. No. 5,103,337 (Schrenk et al.), WO 96/19347 (Jonza et al.), and WO 95/17303 (Ouderkirk et al.). The reflection and transmission spectra of a particular multilayer film depends primarily on the optical thickness of the individual layers, which is defined as the product of the actual thickness of a layer times its refractive index. Accordingly, films can be designed to reflect infrared, visible or ultraviolet wavelengths $\lambda_M$ of light by choice of the appropriate optical thickness of the layers in accordance with the following formula:

$$\lambda_M = (2/M)^* D_r$$

wherein M is an integer representing the particular order of the reflected light and $D_r$ is the optical thickness of an optical repeating unit (also called a multilayer stack) comprising two or more polymeric layers. Accordingly, $D_r$ is the sum of the optical thicknesses of the individual polymer layers that make up the optical repeating unit. $D_r$ is always one half lambda ($\lambda$) in thickness, where lambda is the wavelength of the first order reflection peak. By varying the optical thickness of an optical repeating unit along the thickness of the multilayer film, a multilayer film can be designed that reflects light over a broad band of wavelengths. This band is commonly referred to as the reflection band or stop band. In some embodiments, a reflection band has a sharp spectral edge at the long wavelength (red) and/or short wavelength (blue) side. It may be desirable to design a reflective film or other optical body that reflects light over a selected range in the visible region of the spectrum, e.g., a reflective film that reflects only green light. In such a case, it may be desirable to have sharp edges at both the red and blue sides of the reflection band. Multilayer optical films exhibiting sharpened reflective band edge(s) are described in detail, for instance, in U.S. Pat. No. 6,967,778 (Wheatley et al.), incorporated herein by reference in its entirety.

In one embodiment, an optical polymer film or a layered optical polymer film having a first and second major surface is provided. "Film" is used to refer to planar forms of plastic that are thick enough to be self-supporting but thin enough to be flexed, folded, conformed or creased without cracking. Film thickness depends upon desired applications and manufacturing methods.

"Optical Film" is used herein to refer to any reflective or partially reflective polymer film designed to exhibit desired reflection, transmission, absorption, or refraction of light upon exposure to a specific band of wavelengths of electromagnetic energy. Thus, conventional normally transparent polymeric films, such as polyester and polypropylene, are not considered "optical films" for the purposes of the present disclosure, even though such films may exhibit some degree of reflectance, or glare, when viewed from some angles. Films that exhibit both reflective and transmissive properties, however, such as those that are partially transmissive, are considered within the scope of this disclosure. Preferred optical polymer films generally absorb less than 25 percent of the radiant energy that impacts the film's surface. If the optical polymer films are colored by means of the introduction of colorants into the film, however, greater amounts of radiant energy may be absorbed by the colorant materials. Preferably, the radiating energy absorbed is less than 10 percent and most preferably less than 5 percent. The radiant energy, typically expressed as the energy in a range of wavelengths, may be reflected either specularly or diffusely. The reflectance may be isotropic, i.e., the film has the same reflective properties along both in-plane axes, or may be anisotropic, i.e., the film has different reflective properties along the orthogonal in-plane axes. The difference in reflective properties along the in-plane axes can be varied by controlling the relationship between the indices of refraction along each axis for each of the component materials.

Optical films come in a variety of forms and are selected according to a desired application. Some suitable examples include multilayer polarizers, visible and infrared mirrors, and color films such as those described in Patent Publications WO 95/17303, WO 96/19347, and WO 97/01440; U.S. Pat. No. 6,045,894 (Jonza et al.) U.S. Pat. No. 6,531,230 (Weber et al.); U.S. Pat. No. 5,103,337 (Schrenk et al.), U.S. Pat. No. 5,122,905 (Wheatley et al.), U.S. Pat. No. 5,122,906 (Wheatley), U.S. Pat. No. 5,126,880 (Wheatley et al.), U.S. Pat. No. 5,217,794 (Schrenk), U.S. Pat. No. 5,233,465 (Schrenk et al.), U.S. Pat. No. 5,262,894 (Wheatley et al.), U.S. Pat. No. 5,278,694 (Wheatley et al.), U.S. Pat. No. 5,339,198 (Wheatley et al.), U.S. Pat. No. 5,360,659 (Arends et al.), U.S. Pat. No. 5,448,404 (Schrenk et al.), U.S. Pat. No. 5,486,949 (Schrenk et al.) U.S. Pat. No. 4,162,343 (Wilcox et al.), U.S. Pat. No. 5,089,318 (Shetty et al.), U.S. Pat. No. 5,154,765 (Armanini), and U.S. Pat. No. 3,711,176 (Alfrey, Jr. et al.); and Reissued U.S. Pat. No. RE 31,780 (Cooper et al.) and U.S. Pat. No. RE 34,605 (Schrenk et al.), all contents of which are incorporated herein by reference.

In some embodiments, the non-white color reflective mirror is designed to be a dichroic mirror, i.e., a mirror that has a high reflectivity (and low transmission) for some optical wavelengths, and a low reflectivity (and high transmission) for other optical wavelengths. Such mirrors ordinarily have negligible absorption, such that any light that is not reflected is substantially transmitted, and vice versa, at least over visible and near infrared wavelengths. Such mirrors comprise stacks of optically thin microlayers, typically in an alternating arrangement of materials having a large refractive index mismatch, such as alternating layers of silicon dioxide and titanium dioxide, but other suitable inorganic or organic materials may also be used. Such mirrors may be made by vacuum deposition of the alternating layers on a glass or other suitable substrate. Alternatively, suitable mirror films may be made by a continuous process that may involve coextrusion of alternating polymer materials and stretching the resulting multilayer polymer web, e.g. as described in U.S. Pat. No. 5,882,774 (Jonza et al.) and U.S. Pat. No. 6,783,349 (Neavin et al.). Regardless of the materials used in each (e.g., dichroic) mirror and the method of manufacture used, the mirror is provided with a layer thickness profile for the stack of microlayers that is tailored to provide the desired reflection characteristics as a function of wavelength. Reference in this regard is made to U.S. Pat. No. 6,967,778 (Wheatley et al.). The thickness profile may be tailored to provide, for instance, a dichroic mirror that operates as a long pass filter, a short pass filter, or a notch filter, as desired.

Examples of optical films comprising immiscible blends of two or more polymeric materials include blend constructions wherein the reflective and transmissive properties are obtained from the presence of discontinuous polymeric regions having a cross-sectional diameter perpendicular to the major axis that is on the order of a fraction of the distance corresponding to a wavelength of light, and may also obtain the desired optical properties through orientation, such as the blend mirrors and polarizers as described in Patent Publications WO 97/32224 (Ouderkirk et al.), U.S. Pat. No. 6,179,948 (Merrill et al.), and U.S. Pat. No. 5,751,388 (Larson), the contents of which are all herein incorporated by reference. Additional suitable reflective films include the reflective cube-corner sheeting described in U.S. Pat. No. 5,450,235 (Smith et al.), U.S. Pat. No. 5,691,846 (Benson et al.), U.S. Pat. No. 5,614,286 (Bacon, et al.) and U.S. Pat. No. 5,763,049 (Frey et al.), all of whose descriptions are incorporated herein by reference. Examples of these films are available commercially, for example from 3M Company as 3M SCOTCHLITE Reflective Material Series 6200 High Gloss Film and as SCOTCHLITE Diamond Grade Ultraflexible Conspicuity Sheeting Series 960. These optical films achieve optical properties through the presence of cured cube-corner structures on one side of a polymer film construction.

In some embodiments, the non-white color reflective mirror film comprises a multilayer optical film comprising alternating layers of polyethylene terephthalate (PET) and a copolymer of methyl methacrylate (coPMMA). In some embodiments, the non-white color reflective mirror film comprises a multilayer optical film comprising alternating layers of PET and a fluoropolymer.

Advantageously, the non-white color reflective mirror film can provide a reflected color by reflecting a wavelength bandwidth of at least 30 nm (in some embodiments 32 nm or greater, 35 nm, 37 nm, 40 nm, 42 nm, 45 nm, 47 nm, 50 nm, 52 nm, 55 nm, 57 nm, 60 nm, 62 nm, 65 nm, 67 nm, 70 nm, 72 nm, or 75 nm or greater), within a wavelength range from 380 nm to 450 nm (e.g., reflected violet color), 450 nm to 500 nm or 400 nm to 500 nm (e.g., reflected blue color), from 500 nm to 600 nm (e.g., reflected green color), or from 600 nm to 700 nm (e.g., reflected red color). In some embodiments, the non-white color reflective mirror also reflects a wavelength bandwidth of at least 30 nm, (in some embodiments, a wavelength bandwidth of at least 100 nm, 200 nm, 300 nm, 400 nm, or 500 nm) within a wavelength range from 700 nm to 2000 nm, such as a wavelength of 700 nm or greater, 750 nm, 800 nm, 850 nm, 900 nm, 950 nm, 1000 nm 1050 nm, 1100 nm, 1150 nm, 1200 nm, 1250 nm or 1300 nm or greater; and 2000 nm or less, 1950 nm, 1900 nm, 1850 nm, 1800 nm, 1750 nm, 1700 nm, 1650 nm, 1600 nm, 1550 nm, 1500 nm, 1450 nm, 1400 nm, or 1350 nm or less.

Figure 12A:
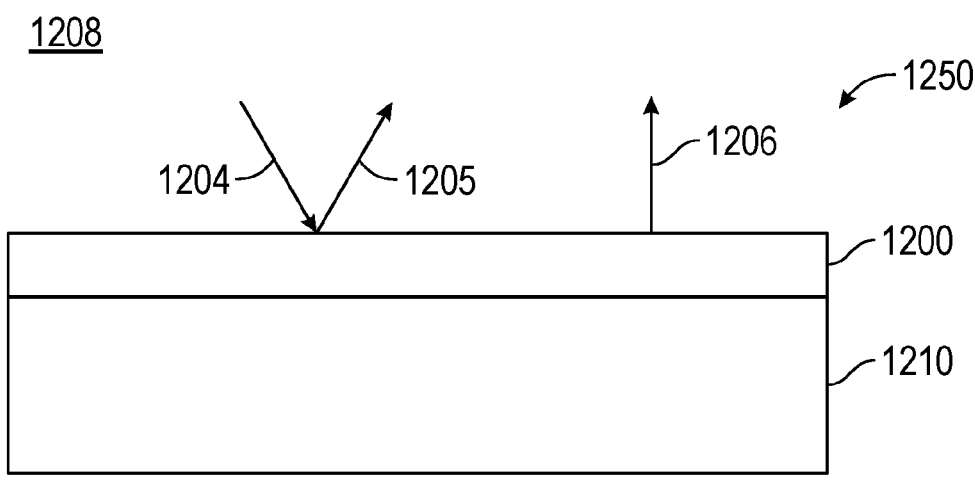
FIG. 12A is a schematic side view of a composite cooling system including a radiative cooling article and a substrate.

Referring now to FIG. 12A, in use a radiative cooling article 1200 may be secured to a substrate 1210 such that radiative cooling article 1200 is in thermal communication with substrate 1210, and together form a composite cooling system 1250. Radiative cooling article 1200 may be generally planar in shape; however it does not need to be planar and may be flexible to conform to substrate 1210. Composite cooling system 1250 may reflect sunlight 1204 to cool substrate 1210, which may be particularly effective in daytime environment. Without radiative cooling article 1200, sunlight 1204 may be absorbed by the substrate 1210 and converted into heat. Reflected sunlight 1205 may be directed into atmosphere 1208. Radiative cooling article 1200 may radiate light 1206 in the atmospheric window region of the electromagnetic spectrum into atmosphere 1208 to cool substrate 1210, which may be particularly effective in the nighttime environment. Radiative cooling article 1200 may allow heat to be converted into light 1206 (e.g., infrared light) capable of escaping atmosphere 1208 through the atmospheric window. The radiation of light 1206 may be a property of radiative cooling article 1200 that does not require additional energy and may be described as passive radiation, which may cool radiative cooling article 1200 and substrate 1210, which is thermally coupled to radiative cooling article 1200. During the day, the reflective properties allow radiative cooling article 1200 to emit more energy than is absorbed. The radiative properties in combination with the reflective properties, to reflect sunlight during the day, the radiative cooling article 1200 may provide more cooling than an article that only radiates energy through the atmosphere and into space.

Radiative cooling article 1200 may be suitable for outdoor environments and have, for example, a suitable operating temperature range, water resistance, and ultraviolet (UV) stability. Resistance to photo-oxidation can be measured by changes in reflectivity or changes in color. Passive radiation cooling articles described herein may not have a change in reflectivity of greater than 5% over at least 5 years. Passive radiation cooling articles described herein may not have a change in color, described as b* per ASTM G-155-13 (2013), of greater than 5 after exposure to 18,700 kJ/m² at 340 nanometers. One mechanism for detecting the change in physical characteristics is the use of the weathering cycle described in ASTM G155-05a (October 2005) using a D65 light source in the reflected mode. Under the noted test, the article should withstand an exposure of at least 18,700 kJ/m² at 340 nanometers without change in reflectivity, color, onset of cracking, or surface pitting.

Exemplary substrates for substrate 1210 include vehicles (e.g., the roof, body panels and or windows), buildings (e.g., roofs, walls), heat exchangers, clothing, umbrellas, hats, boats, and railcars. Exemplary substrates may be part of a larger article, apparatus, or system (e.g., a window of building).

Figure 12B:
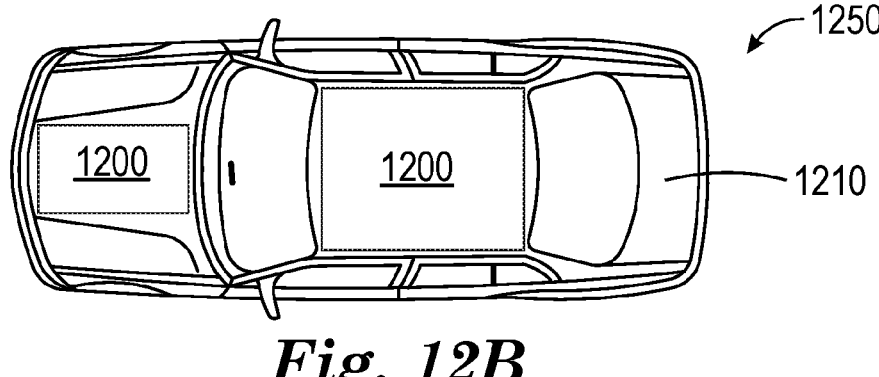
FIG. 12B is a schematic top view of a composite cooling system including radiative cooling articles on a vehicle.
Figure 13A:
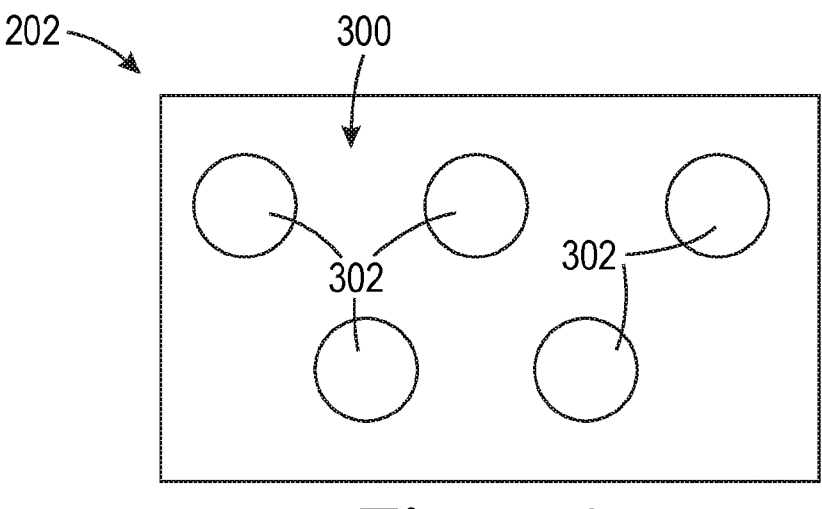
FIG. 13A is a top-down view of a surface of an outer layer of a radiative cooling article.

In a second aspect, the present disclosure provides a composite cooling system. The composite cooling system comprises a radiative cooling article attached to a vehicle or trailer. For instance, referring to FIG. 12B, in use one or more radiative cooling articles 1200 may be secured to a substrate 1210 that is a vehicle (or trailer, not shown), such that the one or more radiative cooling articles 1200 are in thermal communication with substrate 1210 and together form a composite cooling system 1250. Radiative cooling article 1200 may be generally planar in shape; however it does not need to be planar and may be flexible to conform to substrate 1210. Radiative cooling may be achieved with composite cooling system 1250 as described above with respect to FIG. 12A.

Among other parameters, the amount of cooling and temperature reduction may depend on the reflective and absorptive properties of radiative cooling article 1200. The cooling effect of radiative cooling article 1200 may be described with reference to a first temperature of the ambient air proximate or adjacent to the substrate 1210 and a second temperature of the portion of substrate 1210 proximate or adjacent to radiative cooling article 1200. In some embodiments, the first temperature is greater than the second temperature by at least 0.5 degrees Celsius (in some embodiments, at least 1, 1.5, 1.7, 2, 2.5, 2.7, 3, 3.5, 4, 4.5, 5, 5.5, 8.3, or even at least 11.1) degrees Celsius (e.g., at least 0.9, 1.8, 3.6, 5, 10, 15, or even at least 20 degrees Fahrenheit) and 12 degrees Celsius or less.

Optional Layers

Referring to FIG. 2, a schematic side view of an exemplary radiative cooling article 200 is shown. The radiative cooling article 200 comprises a non-white color reflecting mirror film 220 (e.g., indirectly) adjacent to a white diffusely reflective radiative cooling film 210, with several optional layers located between the non-white color reflecting mirror film 220 and the white diffusely reflective radiative cooling film 210 as well as on either side of each of the non-white color reflecting mirror film 220 and the white diffusely reflective radiative cooling film 210.

In some embodiments, the radiative cooling article 200 comprises an optional layer 230 that is a hard coat or overlaminate layer, a protective layer, an antisoiling layer, an infrared-reflective layer, or an ultraviolet-reflective multilayer optical film. The infrared-reflective layer has an average reflectance of at least 50 percent over the wavelength range of 700 nm to 2000 nm. The ultraviolet-reflective multilayer optical film is at least 50 percent reflective of (e.g., incident) ultraviolet radiation over a majority of wavelengths (e.g., over half of the wavelengths) in a range of at least 340 nm but less than 400 nm. The layer 230 is disposed adjacent to the non-white color reflecting mirror film 220 and opposite the white diffusely reflective radiative cooling film 210. When the layer 230 is a hard coat or overlaminate layer, a protective layer, or an antisoiling layer, the layer 230 is typically an outer layer of the radiative cooling article 200. An outer layer is typically configured to protect the non-white color reflective mirror film 220 from degradation due to issues such as corrosion, weathering, dirt, scratches, and the like.

In some embodiments, the radiative cooling article 200 comprises the optional layer 240 that is a protective layer. When the layer 230 is present and is an infrared-reflective layer or an ultraviolet-reflective multilayer optical film, often the layer 240 is a protective layer comprising a fluoropolymer.

In some embodiments, the radiative cooling article 200 comprises an optional layer 250 that is an infrared-reflective layer disposed between the white diffusely reflective microporous layer and the non-white color reflective mirror film.

In some embodiments, the radiative cooling article 200 comprises one or more optional transparent adhesive tie layers 272, 274, 276, and/or 278, which may adhere various layers together as shown in FIG. 2. For instance, transparent adhesive tie layer(s) 276 and/or 278 may be disposed between the white diffusely reflective microporous layer and the non-white color reflective mirror film. When the layer 230 is present and is an infrared-reflective layer or an ultraviolet-reflective multilayer optical film, there could be an optional transparent adhesive tie layer 274 located between the non-white color reflecting mirror film 220 and the layer 230.

In some embodiments, the radiative cooling article 200 comprises an optional layer 260 that is an air bleed adhesive disposed adjacent to the white diffusely reflective microporous layer 210 and opposite the non-white color reflective mirror film 220. Further optionally, a release liner may be provided directly adjacent to the air bleed adhesive layer 260 (not shown). Optional releasable liners used with an optional adhesive layer may comprise, for example, a polyolefin film, a fluoropolymer film, a coated PET film, or a siliconized film or paper.

Each of the above-mentioned optional layers is described below in detail.

Hard Coat or Overlaminate Layer

The radiative cooling article optionally comprises a hard coat or overlaminate layer disposed adjacent to a major surface of the non-white color reflective mirror film and opposite the white diffusely reflective microporous layer. The hard coat or overlaminate layer is an outer layer. The hard coat or overlaminate layer may be of any polymeric material that provides the desired effect, such as ultraviolet light absorption and/or weather protection.

This layer may be coextruded, extrusion coated, laminated, or otherwise adhered to the non-white color reflective mirror film. Typically, the hard coat or overlaminate layer should be as thin as possible to minimize adverse effects on the optical properties of the radiative cooling article. If desired, the hard coat or overlaminate layer may be applied using conventional coating methods such as roll coating (for example, gravure roll coating) or spray coating (for example, electrostatic spray coating). The hard coat or overlaminate layer preferably is crosslinked using, for example, techniques like those which may be employed when a crosslinked organic base coat layer is used. The hard coat or overlaminate layer may be formed using flash evaporation, vapor deposition, and crosslinking of a monomer or oligomer. Examples of monomers or oligomers for use in such protective layers include volatilizable (meth) acrylates. Some suitable polymeric materials for the hard coat or overlaminate layer include for instance and without limitation, crosslinked acrylate polymers, urethane polymers, or vinyl polymers. The hard coat or overlaminate layer may also contain adhesion-promoting additives.

Protective Layer

In some embodiments, the radiative cooling article optionally further comprises a protective layer comprising a fluoropolymer, the protective layer disposed adjacent to a major surface of the non-white color reflective mirror film and opposite the white diffusely reflective microporous layer. The protective layer is an outer layer. In some embodiments, the protective layer comprises surface structures. In some embodiments, an outer surface of the protective layer is patterned and/or is textured, e.g., including a light matte finish. In certain embodiments, a textured surface is provided for aesthetic purposes, for instance, texturing could be employed to provide the layer with an appearance of a natural wood grain.

Any suitable fluoropolymer material may be used in the protective layer. Non-limiting examples of fluoropolymers that may be used include: a polymer of tetrafluoroethylene (TFE), hexafluoropropylene (HFP), and vinylidene fluoride (for example, available under the trade designation "3M DYNEON THV" from 3M Company), a polymer of TFE, HFP, vinylidene fluoride, and perfluoropropyl vinyl ether (PPVE) (for example, available under the trade designation "3M DYNEON THVP" from 3M Company), a polyvinylidene fluoride (PVDF) (for example, "3M DYNEON PVDF 6008" available from 3M Company), an ethylene chlorotrifluoroethylene (ECTFE) polymer (for example, available under the trade designation "HALAR 350LC ECTFE" from Solvay, Brussels, Belgium), an ethylene tetrafluoroethylene (ETFE) (for example, available under the trade designation "3M DYNEON ETFE 6235" from 3M Company), a perfluoroalkoxy alkane (PFA) polymer, a fluorinated ethylene propylene (FEP) polymer, a polytetrafluoroethylene (PTFE), a polymer of TFE, HFP, and ethylene (for example, available under the trade designation "3M DYNEON HTE1705" from 3M Company), or various combinations thereof. In general, various combinations of fluoropolymers can be used. In some embodiments, the fluoropolymer includes FEP. In some embodiments, the fluoropolymer includes PFA.

Examples of suitable fluoropolymers include those available, for example, from 3M Company under the trade designations "3M DYNEON THV221GZ" (39 mol % tetrafluoroethylene, 11 mol % hexafluoropropylene, and 50 mol % vinylidene fluoride), "3M DYNEON THV2030GZ" (46.5 mol % tetrafluoroethylene, 16.5 mol % hexafluoropropylene, 35.5 mol % vinylidene fluoride, and 1.5 mol % perfluoropropyl vinyl ether), "3M DYNEON THV610GZ" (61 mol % tetrafluoroethylene, 10.5 mol % hexafluoropropylene, and 28.5 mol % vinylidene fluoride), and "3M DYNEON THV815GZ" (72.5 mol % tetrafluoroethylene, 7 mol % hexafluoropropylene, 19 mol % vinylidene fluoride, and 1.5 mol % perfluoropropyl vinyl ether).

Examples of fluoropolymers also include PVDF available, for example, under the trade designations "3M DYNEON PVDF 6008" and "3M DYNEON PVDF 11010" from 3M Company; FEP available, for example, under the trade designation "3M DYNEON FLUOROPLASTIC FEP 6303Z" from 3M Company; ECTFE available, for example, under the trade designation "HALAR 350LC ECTFE" from Solvay; "NEOFLON EFEP" from Daikin Industries, Ltd., Osaka, Japan; "AFLAS" from Asahi Glass Co., Ltd., Tokyo, Japan; and copolymers of ethylene and tetrafluoroethylene available under the trade designations "DYNEON ET 6210A" and "DYNEON ET 6235" from Dyneon LLC; "TEFZEL ETFE" from E.I. duPont de Nemours and Co., Wilmington, DE; and "FLUON ETFE" by Asahi Glass Co., Ltd.

Antisoiling Layer

In some embodiments, the radiative cooling article optionally further comprises an antisoiling layer disposed adjacent to a major surface of the non-white color reflective mirror film and opposite the white diffusely reflective microporous layer. The antisoiling layer is an outer layer. The antisoiling layer provides a degree of protection from soil accumulation on the surface that could impede the function of the radiative cooling article (e.g., by absorbing solar radiation).

In some embodiments the optional antisoiling layer is a polymer film, preferably comprising one or more repellent polymers such as, for example, fluoropolymers. Examples of comonomers for making fluoropolymers that may be used include TFE, HFP, THV, PPVE. Exemplary fluoropolymers for use as the antisoiling layer include PVDF, ECTFE, ETFE, PFA, FEP, PTFE, HTE, and combinations thereof. In some embodiments, the fluoropolymer includes FEP. In some embodiments, the fluoropolymer includes PFA.

In some embodiments, the antisoiling layer is applied as a coating onto the non-white color reflective mirror. Numerous applied antisoiling compositions are known in the art including, for example, those described in U.S Pat. Appln. Pubs. 2015/0175479 (Brown et al.), 2005/0233070 (Pellerite et al.), U.S. Pat. No. 6,277,485 (Invie et al.), and WO 02/12404 (Liu et al.)

In some embodiments, the outward facing surface of the optional antisoiling layer (i.e., opposite the white diffusely reflective microporous layer) may be microstructured and/or nanostructured over some or all of its surface; for example, as described in PCT International Publication No. WO 2019/130198 and entitled "ANTI-REFLECTIVE SUR- FACE STRUCTURES". In some embodiments, the nano-structure may be superimposed on the microstructure on the surface of the antisoiling layer.

The antisoiling layer has a major surface (i.e., an anti-soiling surface) that includes micro-structures and/or nano-structures. The micro-structures may be arranged as a series of alternating micro-peaks and micro-spaces. The size and shape of the micro-spaces between micro-peaks may miti-gate the adhesion of dirt particles to the micro-peaks. The nano-structures may be arranged as at least one series of nano-peaks disposed on at least the micro-spaces. The micro-peaks may be more durable to environmental effects than the nano-peaks. Because the micro-peaks are spaced only by a micro-space, and the micro-spaces are signifi-cantly taller than the nano-peaks, the micro-peaks may serve to protect the nano-peaks on the surface of the micro-spaces from abrasion.

In reference to the antisoiling layer, the term or prefix "micro" refers to at least one dimension defining a structure or shape being in a range from 1 micrometer to 1 millimeter. For example, a micro-structure may have a height or a width that is in a range from 1 micrometer to 1 millimeter. As used herein, the term or prefix "nano" refers to at least one dimension defining a structure or a shape being less than 1 micrometer. For example, a nano-structure may have at least one of a height or a width that is less than 1 micrometer.

Figure 4B:
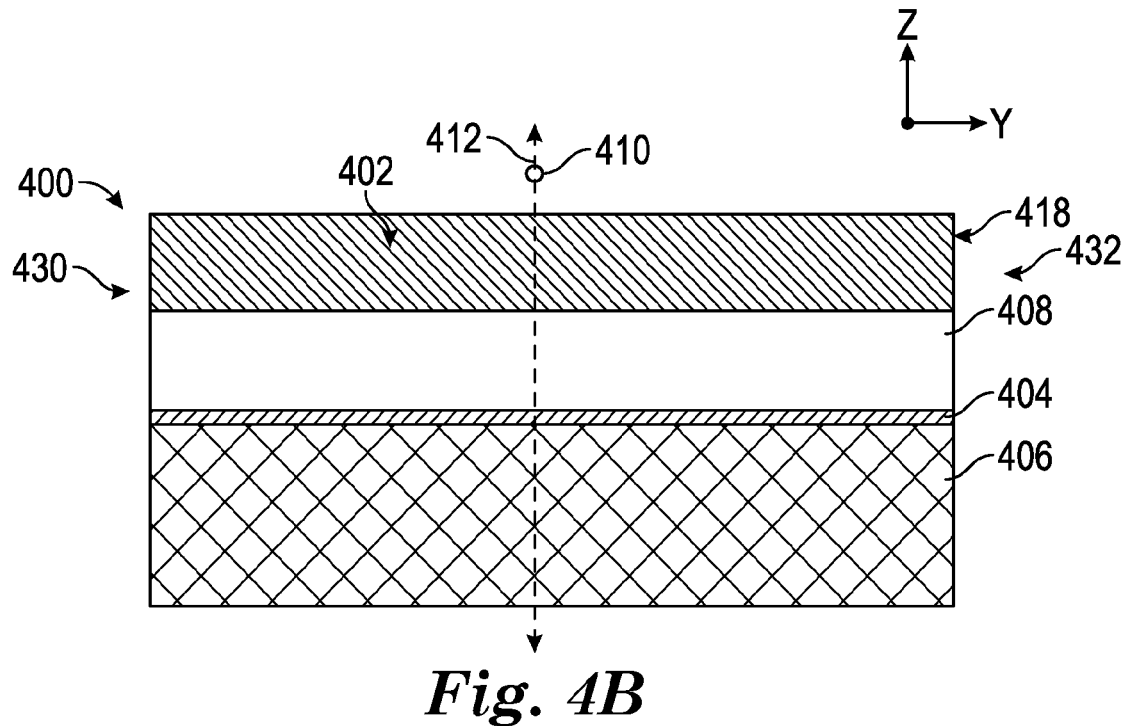
Figure 4C:
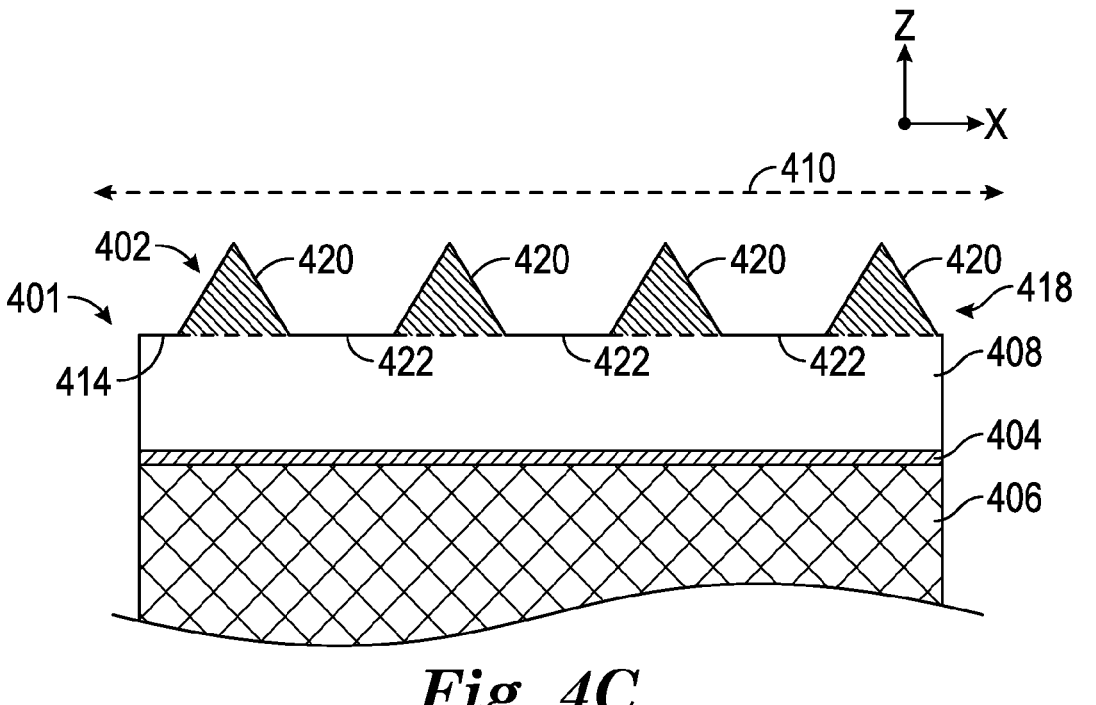

FIGS. 4A, 4B, and 4C show cross-sections 400, 401 of an antisoiling surface structure, shown as antisoiling layer 408 having antisoiling surface 402 defined by a series of micro-structures 418. In particular, FIG. 4A shows a perspective view of the cross section 401 relative to xyz-axes. FIG. 4C shows cross section 401 in an xz-plane parallel to axis 410. FIG. 4B shows cross section 400 in a yz-plane orthogonal to cross section 401 and orthogonal to axis 410.

Antisoiling surface 402 is depicted in FIGS. 4A-4C as if antisoiling layer 408 were lying on a flat horizontal surface. Antisoiling layer 408, however, may be flexible and may conform to substrates that are not flat.

In some embodiments, micro-structures 418 are formed in antisoiling layer 408. Micro-structures 418 and remaining portions of antisoiling layer 408 below the micro-structures may be formed of the same material. Antisoiling layer 408 may be formed of any suitable material capable of defining micro-structures 418, which may at least partially define antisoiling surface 402. Antisoiling layer 408 may be trans-parent to various frequencies of light. In at least one embodi-ment, antisoiling layer 408 may be non-transparent, or even opaque, to various frequencies of light. In some embodi-ments, antisoiling layer 408 may include an ultraviolet (UV) stable material. In some embodiments, antisoiling layer 408 may include a polymer material such as a fluoropolymer or a polyolefin polymer.

Antisoiling surface 402 may extend along axis 410, for example, parallel or substantially parallel to the axis. Plane 412 may contain axis 410, for example, parallel or inter-secting such that axis 410 is in plane 412. Both axis 410 and plane 412 may be imaginary constructs used herein to illustrate various features related to antisoiling surface 402. For example, the intersection of plane 412 and antisoiling surface 402 may define line 414 describing a cross-sectional profile of the surface as shown in FIG. 4C that includes micro-peaks 420 and micro-spaces 422 as described herein in more detail. Line 414 may include at least one straight segment or curved segments.

Line 414 may at least partially define series of micro-structures 418. Micro-structures 418 may be three-dimen-sional (3D) structures disposed on antisoiling layer 408, and line 414 may describe only two dimensions (e.g., height and width) of that 3D structure. As can be seen in FIG. 4B, micro-structures 418 may have a length that extends along surface 402 from one side 430 to another side 432.

Micro-structures 418 may include a series of alternating micro-peaks 420 and micro-spaces 422 along, or in the direction of, axis 410, which may be defined by, or included in, line 414. The direction of axis 410 may coincide with a width dimension. Micro-spaces 422 may each be disposed between pair of micro-peaks 420. In other words, plurality of micro-peaks 420 may be separated from one another by at least one micro-spaces 422. In at least one embodiment, at least one pair of micro-peaks 420 may not include micro-space 422 in-between. Pattern of alternating micro-peaks 420 and micro-spaces 422 may be described as a "skipped tooth riblet" (STR). Each of micro-peaks 420 and micro-spaces 422 may include at least one straight segment or curved segment.

A slope of line 414 (e.g., rise over run) may be defined relative to the direction of axis 410 as an x-coordinate (run) and relative to the direction of plane 412 as a y-axis (rise). A maximum absolute slope may be defined for at least one portion of line 414. As used herein, the term "maximum absolute slope" refers to a maximum value selected from the absolute value of the slopes throughout a particular portion of line 414. For example, the maximum absolute slope of one micro-space 422 may refer to a maximum value selected from calculating the absolute values of the slopes at every point along line 414 defining the micro-space. A line defined the maximum absolute slope of each micro-space 422 may be used to define an angle relative to axis 410. In some embodiments, the angle corresponding to the maximum absolute slope may be at most 30 (in some embodiments, at most 25, 20, 15, 10, 5, or even at most 1) degrees. In some embodiments, the maximum absolute slope of at least some (in some embodiments, all) of micro-peaks 420 may be greater than the maximum absolute slope of at least some (in some embodiments, all) of micro-spaces 422.

In some embodiments, line 414 may include boundary 416 between each adjacent micro-peak 420 and micro-space 422. Boundary 416 may include at least one of straight segment or curved segment. Boundary 416 may be a point along line 414. In some embodiments, boundary 416 may include a bend. The bend may include the intersection of two segments of line 414. The bend may include a point at which line 414 changes direction in a locale (e.g., a change in slope between two different straight lines). The bend may also include a point at which line 414 has the sharpest change in direction in a locale (e.g., a sharper turn compared to adjacent curved segments). In some embodiments, boundary 416 may include an inflection point. An inflection point may be a point of a line at which the direction of curvature changes.

Figure 5:
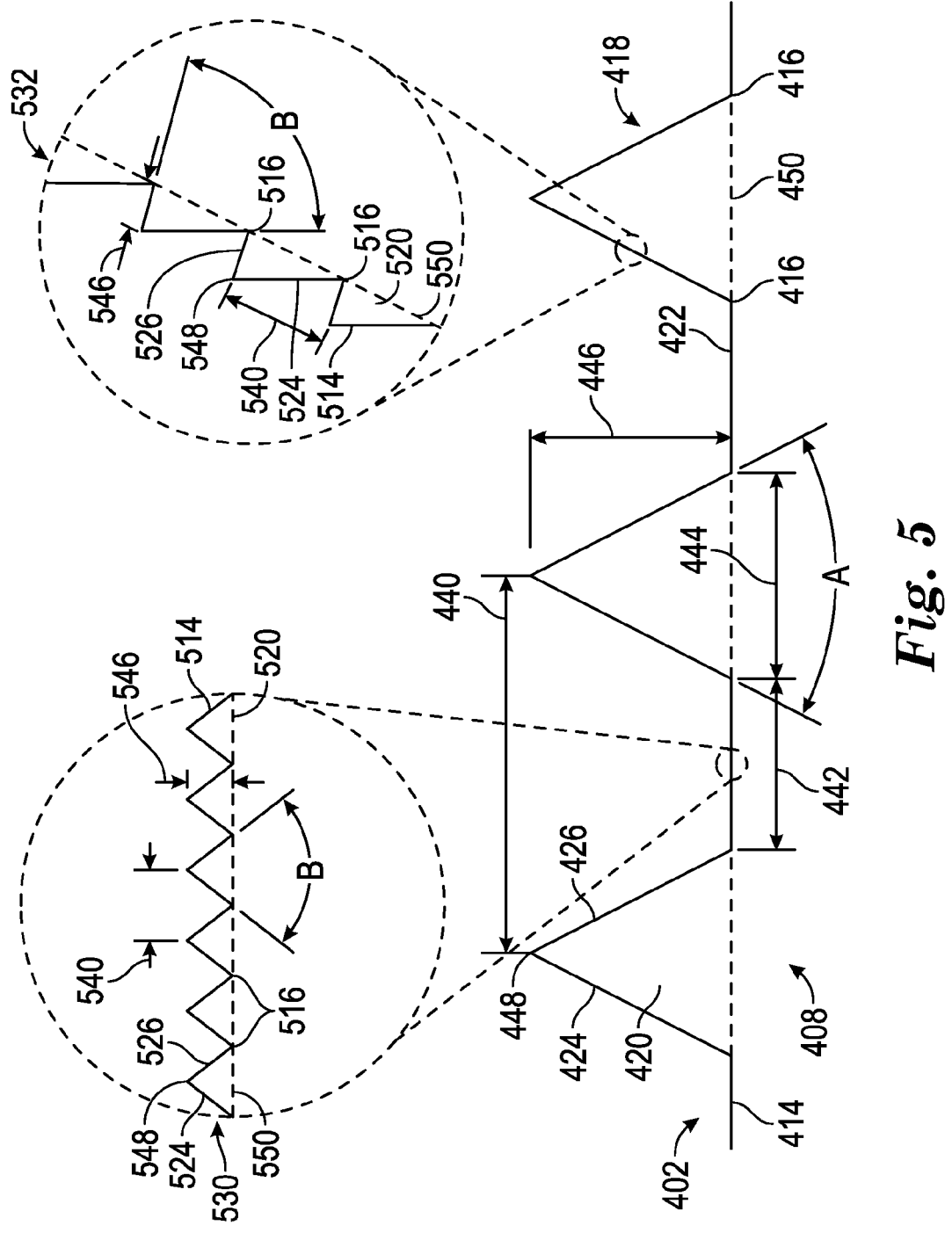
FIG. 5 is a cross-sectional illustration of various nano-structures of the antisoiling surface structure of FIGS. 4A-4C in an xz-plane.

FIG. 5 shows antisoiling surface 402 of antisoiling layer 408 with nano-structures 530, 532, which are visible in two magnified overlays. At least one micro-peak 420 may include at least one first micro-segment 424 or at least one second micro-segment 426. Micro-segments 424, 426 may be disposed on opposite sides of apex 448 of micro-peak 420. Apex 448 may be, for example, the highest point or local maxima of line 414. Each micro-segment 424, 426 may include at least one: straight segment or curved seg-ment.

Line 414 defining first and second micro-segments 424, 426 may have a first average slope and a second average slope, respectively. The slopes may be defined relative to baseline 450 as an x-axis (run), wherein an orthogonal direction is the z-axis (rise). As used herein, the term "average slope" refers to an average slope throughout a particular portion of a line. In some embodiments, the average slope of first micro-segment 424 may refer to the slope between the endpoints of the first micro-segment. In some embodiments, the average slope of first micro-segment 424 may refer to an average value calculated from the slopes measured at multiple points along the first micro-segment. In general, the micro-peak first average slope may be defined as positive and the micro-peak second average slope may be defined as negative. In other words, the first average slope and the second average slope have opposite signs. In some embodiments, the absolute value of the micro-peak first average slope may be equal to the absolute value of the micro-peak second average slope. In some embodiments, the absolute values may be different. In some embodiments, the absolute value of each average slope of micro-segments 424, 426 may be greater than the absolute value of the average slope of micro-space 422.

Angle A of micro-peaks 420 may be defined between the micro-peak first and second average slopes. In other words, the first and second average slopes may be calculated and then an angle between those calculated lines may be determined. For purposes of illustration, angle A is shown as relating to first and second micro-segments 424, 426. In some embodiments, however, when the first and second micro-segments are not straight lines, the angle A may not necessarily be equal to the angle between two micro-segments 424, 426. Angle A may be in a range to provide sufficient antisoiling properties for surface 402. In some embodiments, angle A may be at most 120 (in some embodiments, at most 110, 100, 95, 90, 85, 80, 75, 70, 65, 60, 55, 50, 45, 40, 35, 30, 25, 20, or even at most 10) degrees. In some embodiments, angle A is at most 85 (in some embodiments, at most 75) degrees. In some embodiments, angle A is, at the low end, at least 30 (in some embodiments, at least 25, 40, 45, or even at least 50) degrees. In some embodiments, angle A is, at the high end, at most 75 (in some embodiments, at most 60, or even at most 55) degrees.

Micro-peaks 420 may be any suitable shape capable of providing angle A based on the average slopes of micro-segments 424, 426. In some embodiments, micro-peaks 420 are generally formed in the shape of a triangle. In some embodiments, micro-peaks 420 are not in the shape of a triangle. The shape may be symmetrical across a z-axis intersecting apex 448. In some embodiments, the shape may be asymmetrical.

Each micro-space 422 may define micro-space width 242. Micro-space width 442 may be defined as a distance between corresponding boundaries 416, which may be between adjacent micro-peaks 420. A minimum for micro-space width 442 may be defined in terms of micrometers. In some embodiments, micro-space width 442 may be at least 10 (in some embodiments, at least 20, 25, 30, 40, 50, 60, 70, 75, 80, 90, 100, 150, 200, or even at least 250) micrometers. In some applications, micro-space width 442 is, at the low end, at least 50 (in some embodiments, at least 60) micrometers. In some applications, micro-space width 442 is, at the high end, at most 90 (in some embodiments, at most 80) micrometers. In some applications, micro-space width 442 is 70 micrometers.

As used herein, the term "peak distance" refers to the distance between consecutive peaks, or between the closest pair of peaks, measured at each apex or highest point of the peak. Micro-space width 442 may also be defined relative to micro-peak distance 440. In particular, a minimum for micro-space width 442 may be defined relative to corresponding micro-peak distance 440, which may refer to the distance between the closest pair of micro-peaks 420 surrounding micro-space 422 measured at each apex 448 of the micro-peaks. In some embodiments, micro-space width 442 may be at least 10% (in some embodiments, at least 20%, 25%, 30%, 40%, 50%, 60%, 70%, 80%, or even at least 90%) of the maximum for micro-peak distance 440. In some embodiments, the minimum for micro-space width 442 is, at the low end, at least 30% (in some embodiments, at least 40%) of the maximum for micro-peak distance 440. In some embodiments, the minimum for micro-space width 442 is, at the high end, at most 60% (in some embodiments, at most 50%) of the maximum for micro-peak distance 440. In some embodiments, micro-space width 442 is 45% of micro-peak distance 440.

A minimum the micro-peak distance 440 may be defined in terms of micrometers. In some embodiments, micro-peak distance 440 may be at least 1 (in some embodiments, at least 2, 3, 4, 5, 10, 25, 50, 75, 100, 150, 200, 250, or even at least 500) micrometers. In some embodiments, micro-peak distance 440 is at least 100 micrometers. A maximum for micro-peak distance 440 may be defined in terms of micrometers. Micro-peak distance 440 may be at most 1000 (in some embodiments, at most 900, 800, 700, 600, 500, 400, 300, 250, 200, 150, 100, or even at most 50) micrometers. In some embodiments, micro-peak distance 440 is, at the high end, at most 200 micrometers. In some embodiments, micro-peak distance 440 is, at the low end, at least 100 micrometers. In some embodiments, micro-peak distance 440 is 150 micrometers.

Each micro-peak 420 may define micro-peak height 446. Micro-peak height 446 may be defined as a distance between baseline 550 and apex 448 of micro-peak 420. A minimum may be defined for micro-peak height 446 in terms of micrometers. In some embodiments, micro-peak height 446 may be at least 10 (in some embodiments, at least 20, 25, 30, 40, 50, 60, 70, 80, 90, 100, 150, 200, or even at least 250) micrometers. In some embodiments, micro-peak height 446 is at least 60 (in some embodiments, at least 70) micrometers. In some embodiments, micro-peak height 446 is 80 micrometers.

Plurality of nano-structures 530, 532 may be defined at least partially by line 414. Plurality of nano-structures 530 may be disposed on at least one or micro-space 422. In particular, line 514 defining nano-structures 530 may include at least one series of nano-peaks 520 disposed on at least one micro-space 422. In some embodiments, at least one series of nano-peaks 520 of plurality of nano-structures 532 may also be disposed on at least one micro-peak 420.

Due to at least their difference in size, micro-structures 418 may be more durable than nano-structures 530, 532 in terms of abrasion resistance. In some embodiments, plurality of nano-structures 532 are disposed only on micro-spaces 422 or at least not disposed proximate to or adjacent to apex 448 of micro-peaks 420.

Each nano-peak 520 may include at least one of first nano-segment 524 and second nano-segment 526. Each nano-peak 520 may include both nano-segments 524, 526. Nano-segments 524, 526 may be disposed on opposite sides of apex 548 of nano-peak 520. First and second nano-segments 524, 526 may define a first average slope and a second average slope, respectively, which describe line 514 defining the nano-segment. For nano-structures 530, 532, the slope of line 514 may be defined relative to baseline 550 as an x-axis (run), wherein an orthogonal direction is the z-axis (rise).

In general, the nano-peak first average slope may be defined as positive and the nano-peak second average slope may be defined as negative, or vice versa. In other words, the first average slope and the second average slope at least have opposite signs. In some embodiments, the absolute value of the nano-peak first average slope may be equal to the absolute value of the nano-peak second average slope (e.g., nano-structures 530). In some embodiments, the absolute values may be different (e.g., nano-structures 532). Angle B of nano-peaks 520 may be defined between lines defined by the nano-peak first and second average slopes. Similar to angle A, angle B as shown is for purposes of illustration and may not necessarily equal to any directly measured angle between nano-segments 524, 526.

Angle B may be a range to provide sufficient antisoiling properties for surface 402. In some embodiments, angle B may be at most 120 (in some embodiments, at most 110, 100, 90, 85, 80, 75, 70, 65, 60, 55, 50, 45, 40, 35, 30, 25, 20, or even at most 10) degrees. In some embodiments, angle B is, at the high end, at most 85 (in some embodiments, at most 80, or even at most 75) degrees. In some embodiments, angle B is, at the low end, at least 55 (in some embodiments, at least 60, or even at least 65) degrees. In some embodiments, angle B is 70 degrees. Angle B may be the same or different for each nano-peak 520. For example, in some embodiments, angle B for nano-peaks 520 on micro-peaks 420 may be different than angle B for nano-peaks 520 on micro-spaces 422.

Nano-peaks 520 may be any suitable shape capable of providing angle B based on lines defined by the average slopes of nano-segments 524, 526. In some embodiments, nano-peaks 520 are generally formed in the shape of a triangle. In at least one embodiment, nano-peaks 520 are not in the shape of a triangle. The shape may be symmetrical across apex 548. For example, nano-peaks 520 of nano-structures 530 disposed on micro-spaces 422 may be symmetrical. In at least one embodiment, the shape may be asymmetrical. For example, nano-peaks 520 of nano-structures 532 disposed on micro-peaks 420 may be asymmetrical with one nano-segment 524 being longer than other nano-segment 526. In some embodiments, nano-peaks 520 may be formed with no undercutting.

Each nano-peak 520 may define nano-peak height 546. Nano-peak height 546 may be defined as a distance between baseline 550 and apex 548 of nano-peak 520. A minimum may be defined for nano-peak height 546 in terms of nanometers. In some embodiments, nano-peak height 546 may be at least 10 (in some embodiments, at least 50, 75, 100, 120, 140, 150, 160, 180, 200, 250, or even at least 500) nanometers. In some embodiments, nano-peak height 546 is at most 250 (in some embodiments, at most 200) nanometers, particularly for nano-structures 530 on micro-spaces 422. In some embodiments, nano-peak height 546 is in a range from 100 to 250 (in some embodiments, 160 to 200) nanometers. In some embodiments, nano-peak height 546 is 180 nanometers.

In some embodiments, nano-peak height 546 is at most 160 (in some embodiments, at most 140) nanometers, particularly for nano-structures 532 on micro-peaks 420. In some embodiments, nano-peak height 546 is in a range from 75 to 160 (in some embodiments, 100 to 140) nanometers. In some embodiments, nano-peak height 546 is 120 nanometers.

As used herein, the terms "corresponding micro-peak" or "corresponding micro-peaks" refer to micro-peak 420 upon which nano-peak 520 is disposed or, if the nano-peak is disposed on corresponding micro-space 422, refers to one or both of the closest micro-peaks that surround that micro-space. In other words, micro-peaks 420 that correspond to micro-space 422 refer to the micro-peaks in the series of micro-peaks that precede and succeed the micro-space.

Nano-peak height 546 may also be defined relative to micro-peak height 446 of corresponding micro-peak 420. In some embodiments, corresponding micro-peak height 446 may be at least 10 (in some embodiments, at least 50, 100, 150, 200, 300, 400, 500, 600, 700, 800, 900, or even at least 1000) times nano-peak height 546. In some embodiments, corresponding micro-peak height 446 is, at the low end, at least 300 (in some embodiments, at least 400, 500, or even at least 600) times nano-peak height 546. In some embodiments, corresponding micro-peak height 446 is, at the high end, at most 900 (in some embodiments, at most 800, or even at most 700) times nano-peak height 546.

Nano-peak distance 540 may be defined between nano-peaks 520. A maximum for nano-peak distance 540 may be defined. In some embodiments, nano-peak distance 540 may be at most 1000 (in some embodiments, at most 750, 700, 600, 500, 400, 300, 250, 200, 150, or even at most 100) nanometers. In some embodiments, nano-peak distance 540 is at most 400 (in some embodiments, at most 300) nanometers. A minimum for the nano-peak distance 540 may be defined. In some embodiments, nano-peak distance 540 may be at least 1 (in some embodiments, at least 5, 10, 25, 50, 75, 100, 150, 200, 250, 300, 350, 400, 450, or even at least 500) nanometers. In some embodiments, nano-peak distance 540 is at least 150 (in some embodiments, at least 200) nanometers. In some embodiments, the nano-peak distance 540 is in a range from 150 to 400 (in some embodiments, 200 to 300) nanometers. In some embodiments, the nano-peak distance 540 is 250 nanometers.

Nano-peak distance 540 may be defined relative to the micro-peak distance 440 between corresponding micro-peaks 420. In some embodiments, corresponding micro-peak distance 440 is at least 10 (in some embodiments, at least 50, 100, 200, 300, 400, 500, 600, 700, 800, 900, or even at least 1000) times nano-peak distance 540. In some embodiments, corresponding micro-peak distance 440 is, at the low end, at least 200 (in some embodiments, at least 300) times nano-peak distance 540. In some embodiments, corresponding micro-peak distance 440 is, at the high end, at most 500 (in some embodiments, at most 400) times the nano-peak distance 540.

In some embodiments of forming the antisoiling surface, a method may include extruding a hot melt material having a UV-stable material. The extruded material may be shaped with a micro-replication tool. The micro-replication tool may include a mirror image of a series of micro-structures, which may form the series of micro-structures on the surface of antisoiling layer 408. The series of micro-structures may include a series of alternating micro-peaks and micro-spaces along an axis. A plurality of nano-structures may be formed on the surface of the layer on at least the micro-spaces. The plurality of nano-peaks may include at least one series of nano-peaks along the axis.

In some embodiments, the plurality nano-structures may be formed by exposing the surface to reactive ion etching. For example, masking elements may be used to define the nano-peaks.

In some embodiments, the plurality of nano-structures may be formed by shaping the extruded material with the micro-replication tool further having an ion-etched diamond. This method may involve providing a diamond tool wherein at least a portion of the tool comprises a plurality of tips, wherein the pitch of the tips may be less than 1 micrometer, and cutting a substrate with the diamond tool, wherein the diamond tool may be moved in and out along a direction at a pitch (p1). The diamond tool may have a maximum cutter width (p2) and $$\frac{p_1}{p_2} \geq 2.$$

The nano-structures may be characterized as being embedded within the micro-structured surface of the anti-soiling layer 408. Except for the portion of the nano-structure exposed to air, the shape of the nano-structure may generally be defined by the adjacent micro-structured material.

A micro-structured surface layer including nano-structures can be formed by use of a multi-tipped diamond tool. Diamond Turning Machines (DTM) can be used to generate micro-replication tools for creating antisoiling surface structures including nano-structures as described in U.S. Pat. Appl. Publ. No. 2013/0236697 (Walker et al.) A micro-structured surface further comprising nano-structures can be formed by use of a multi-tipped diamond tool, which may have a single radius, wherein the plurality of tips has a pitch of less than 1 micrometer. Such multi-tipped diamond tool may also be referred to as a "nano-structured diamond tool." Hence, a micro-structured surface wherein the micro-structures further comprise nano-structures can be concurrently formed during diamond tooling fabrication of the micro-structured tool. Focused ion beam milling processes can be used to form the tips and may also be used to form the valley of the diamond tool. For example, focused ion beam milling can be used to ensure that inner surfaces of the tips meet along a common axis to form a bottom of valley. Focused ion beam milling can be used to form features in the valley, such as concave or convex arc ellipses, parabolas, mathematically defined surface patterns, or random or pseudo-random patterns. A wide variety of other shapes of valley can also be formed. Exemplary diamond turning machines and methods for creating discontinuous, or non-uniform, surface structures can include and utilize a fast tool servo (FTS) as described in, for example, PCT Pub. No. WO 00/48037 (Campbell et al.); U.S. Pat. No. 7,350,442 (Ehnes et al.) and U.S. Pat. No. 7,328,638 (Gardiner et al.); and U.S. Pat. Pub. No. 2009/0147361 (Gardiner et al.).

In some embodiments, the plurality of nano-structures may be formed by shaping the extruded material, or anti-soiling layer 408, with the micro-replication tool further having a nano-structured granular plating for embossing. Electrodeposition, or more specifically electrochemical deposition, can also be used to generate various surface structures including nano-structures to form a micro-replication tool. The tool may be made using a 2-part electroplating process, wherein a first electroplating procedure may form a first metal layer with a first major surface, and a second electroplating procedure may form a second metal layer on the first metal layer. The second metal layer may have a second major surface with a smaller average roughness than that of the first major surface. The second major surface can function as the structured surface of the tool. A replica of this surface can then be made in a major surface of an optical film to provide light diffusing properties. One example of an electrochemical deposition technique is described in PCT Pub. No. WO 2018/130926 (Derks et al.).

Figure 6:
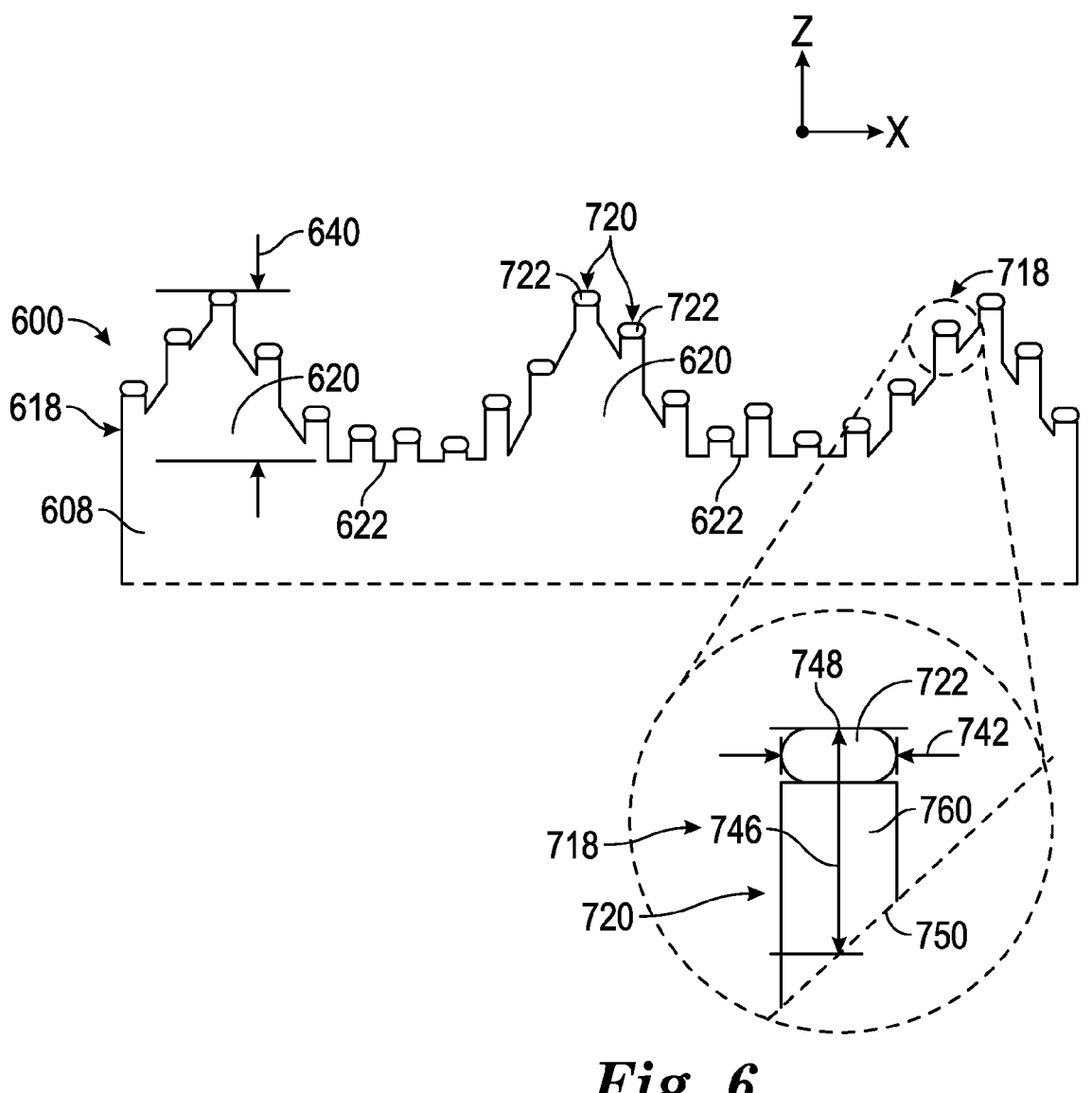
FIG. 6 is a cross-sectional illustration of various nano-structures including masking elements in an xz-plane as an alternative to the nano-structures of FIG. 5 that maybe used with the antisoiling surface structure of FIGS. 4A-4C.

FIG. 6 shows a cross section 600 of antisoiling layer 608 having antisoiling surface 602. Antisoiling surface 602 may be similar to antisoiling surface 402, for example, in that micro-structures 418, 618 of antisoiling layer 408, 608 may have the same or similar dimensions and may also form a skipped tooth riblet pattern of alternating micro-peaks 620 and micro-spaces 622. Antisoiling surface 602 differs from surface 402 in that, for example, nano-structures 720 may include nanosized masking elements 722.

Nano-structures 720 may be formed using masking elements 722. For example, masking elements 722 may be used in a subtractive manufacturing process, such as reactive ion etching (RIE), to form nano-structures 720 of surface 602 having micro-structures 618. A method of making a nano-structure and nano-structured articles may involve depositing a layer to a major surface of a substrate, such as antisoiling layer 408, by plasma chemical vapor deposition from a gaseous mixture while substantially simultaneously etching the surface with a reactive species. The method may include providing a substrate, mixing a first gaseous species capable of depositing a layer onto the substrate when formed into a plasma, with a second gaseous species capable of etching the substrate when formed into a plasma, thereby forming a gaseous mixture. The method may include forming the gaseous mixture into a plasma and exposing a surface of the substrate to the plasma, wherein the surface may be etched, and a layer may be deposited on at least a portion of the etched surface substantially simultaneously, thereby forming the nano-structure.

The substrate can be a (co)polymeric material, an inorganic material, an alloy, a solid solution, or a combination thereof. The deposited layer can include the reaction product of plasma chemical vapor deposition using a reactant gas comprising a compound selected from the group consisting of organosilicon compounds, metal alkyl compounds, metal isopropoxide compounds, metal acetylacetonate compounds, metal halide compounds, and combinations thereof. Nano-structures of high aspect ratio, and optionally with random dimensions in at least one dimension, and even in three orthogonal dimensions, can be prepared.

In some embodiments, antisoiling layer 608 having a series of micro-structures 618 disposed on antisoiling surface 602 of the layer may be provided. The series of micro-structures 618 may include a series of alternating micro-peaks 620 and micro-spaces 622.

A series of nanosized masking elements 722 may be disposed on at least micro-spaces 622. Antisoiling surface 602 of antisoiling layer 608 may be exposed to reactive ion etching to form plurality of nano-structures 718 on the surface of the layer including series of nano-peaks 720. Each nano-peak 720 may include masking element 722 and column 760 of layer material between masking element 722 and layer 608. Masking element 722 may be formed of any suitable material more resistant to the effects of RIE than the material of antisoiling layer 608. In some embodiments, masking element 722 includes an inorganic material. Non-limiting examples of inorganic materials include silica and silicon dioxide. In some embodiments, the masking element 722 is hydrophilic. Non-limiting examples of hydrophilic materials include silica and silicon dioxide.

As used herein, the term "maximum diameter" refers to a longest dimension based on a straight line passing through an element having any shape. Masking elements 722 may be nanosized. Each masking element 722 may define maximum diameter 742. In some embodiments, the maximum diameter of masking element 722 may be at most 1000 (in some embodiments, at most 750, 500, 400, 300, 250, 200, 150, or even at most 100) nanometers. Maximum diameter 742 of each masking element 722 may be described relative to micro-peak height 640 of corresponding micro-peak 620. In some embodiments, corresponding micro-peak height 640 is at least 10 (in some embodiments, at least 25, 50, 100, 200, 250, 300, 400, 500, 750, or even at least 1000) times maximum diameter 742 of masking element 722.

Each nano-peak 720 may define height 722. Height 722 may be defined between baseline 750 and the apex 748 of masking element 722.

Figure 7A:
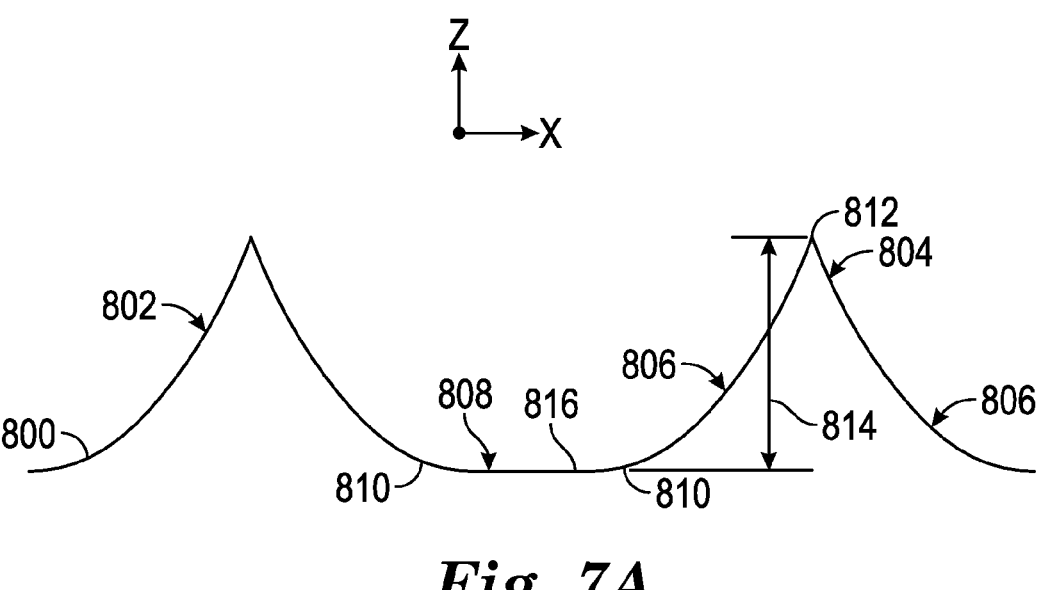
FIGS. 7A and 7B show illustrations of lines representing the cross-sectional profile of different forms of micro-structures for an antisoiling surface structure in an xz-plane.
Figure 7B:
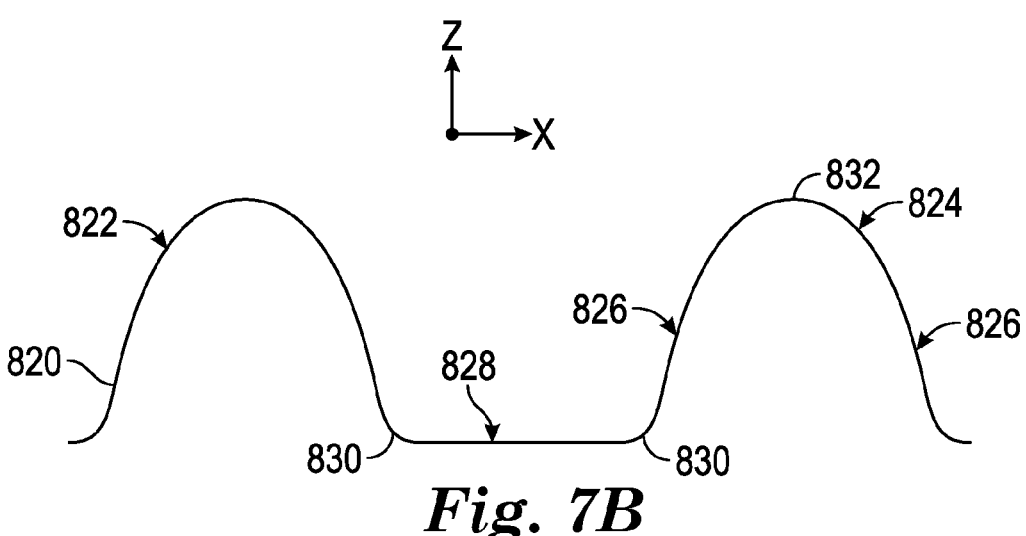

FIGS. 7A and 7B show lines 800 and 820 representing the cross-sectional profile of different forms of peaks 802, 822, which may be micro-peaks of micro-structures or nano-peaks of nano-structures, for any of the antisoiling surfaces, such as surfaces 402, 602. As mentioned, structures do not need to be strictly in the shape of a triangle. Line 800 shows that first portion 804 (top portion) of peak 802, including apex 812, may have a generally triangular shape, whereas adjacent side portions 806 may be curved. In some embodiments, as illustrated, side portions 806 of peak 802 may not have a sharper turn as it transitions into space 808. Boundary 810 between side portion 806 of peak 802 and space 808 may be defined by a threshold slope of line 800 as discussed herein, for example, with respect to FIGS. 4A-4C and 5.

Space 808 may also be defined in terms of height relative to height 814 of peak 802. Height 814 of peak 802 may be defined between one of boundaries 810 and apex 812. Height of space 808 may be defined between bottom 816, or lowest point of space 808, and one of boundaries 810. In some embodiments, the height of space 808 may be at most 40% (in some embodiments, at most 30%, 25%, 20%, 15%, 10%, 5%, 4%, 3%, or even at most 2%) of height 814 of peak 802. In some embodiments, the height of space 808 is at most 10% (in some embodiments, at most 5%, 4%, 3%, or even at most 2%) of height 814 of peak 802.

Line 820 shows that first portion 824 (top portion) of peak 820, including the apex, may have a generally rounded shape without a sharp turn between adjacent side portions 826. Apex 832 may be defined as the highest point of structure 820, for example, where the slope changes from positive to negative. Although first portion 824 (top portion) may be rounded at apex 832, peak 820 may still define an angle, such as angle A (see FIG. 5), between first and second average slopes. Boundary 830 between side portion 826 of peak 820 and space 828 may be defined, for example, by a sharper turn. Boundary 830 may also be defined by slope or relative height, as discussed herein.

As shown in FIGS. 8 to 11, the antisoiling surface may be discontinuous, intermittent, or non-uniform. For example, the antisoiling surface may also be described as including micro-pyramids with micro-spaces surrounding the micro-pyramids (see FIGS. 8 and 11).

Figure 8:
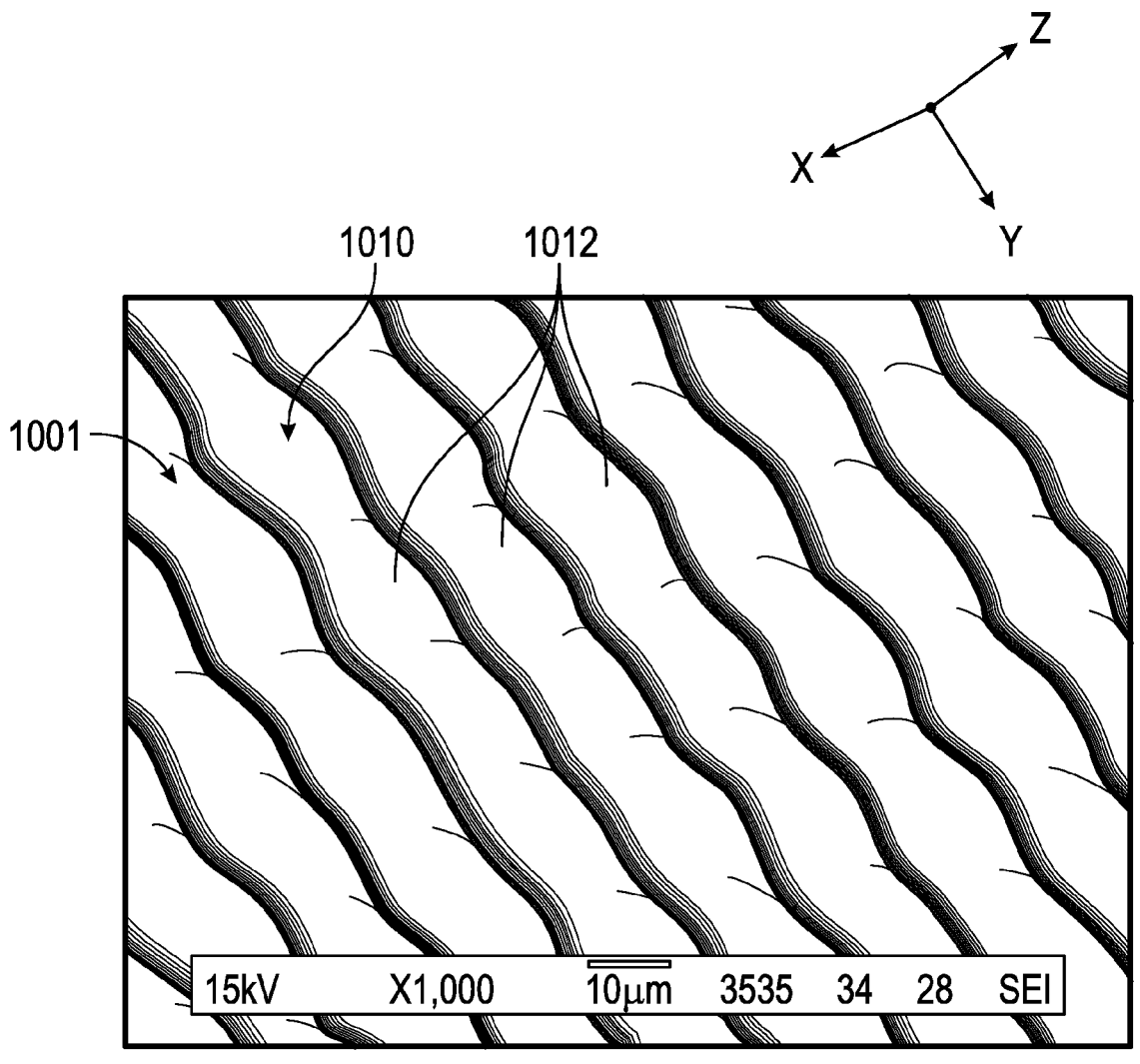
FIG. 8 is a perspective illustration of a portion of a first anti-reflective surface structure with discontinuous micro-structures.

FIG. 8 shows first antisoiling surface 1001 defined at least partially by non-uniform micro-structures 1210. For example, if antisoiling surface 1000 were viewed in the yz-plane (similar to FIG. 4B), at least one micro-peak 1012 may have a non-uniform height from the left side to the right side of the view, which can be contrasted to FIG. 4B showing micro-peak 420 having a uniform height from the left side to the right side of the view. In particular, micro-peaks 1012 defined by the micro-structures 1010 may be non-uniform in at least one of height or shape. The micro-peaks 1012 are spaced by micro-spaces (not shown in this perspective view), similar to other surfaces described herein, such as micro-space 422 of surface 402 (FIGS. 4A and 4C).

Figure 9:
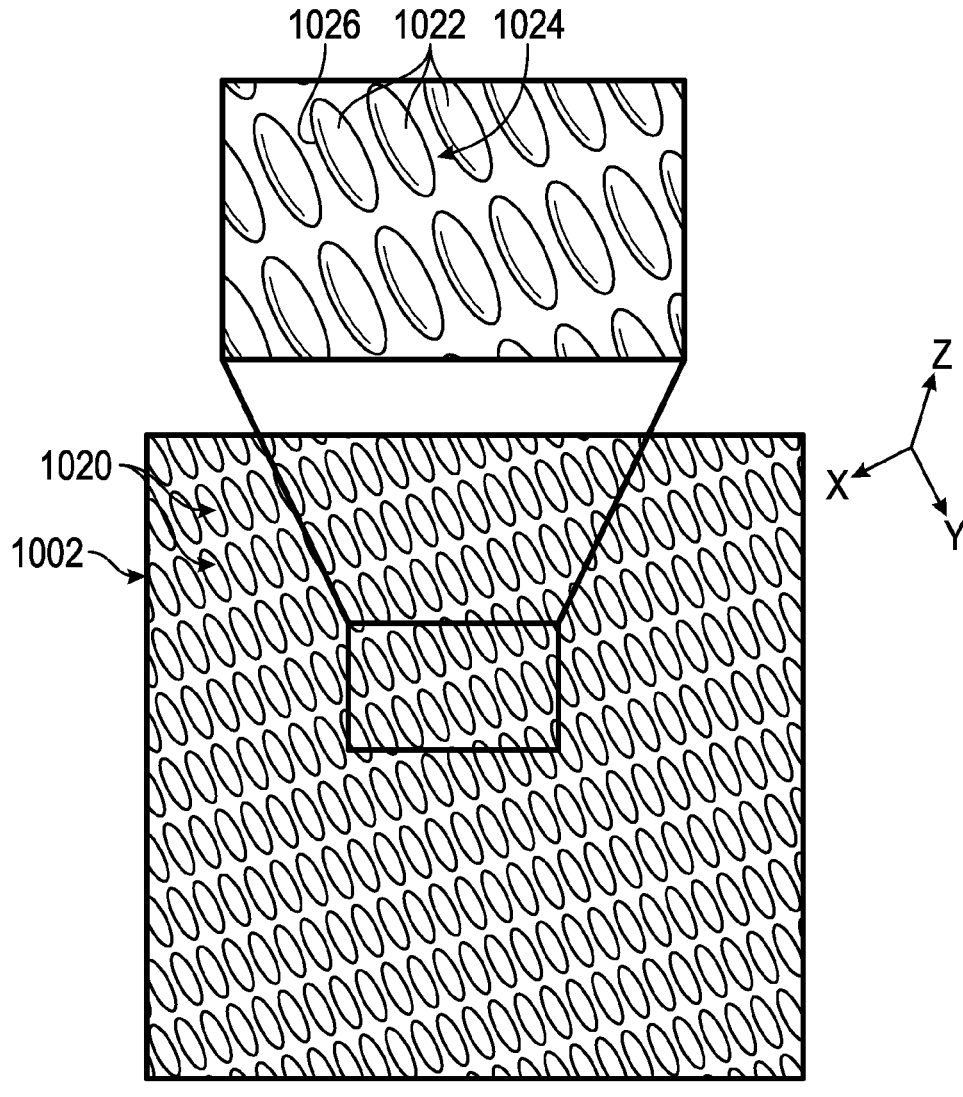
FIG. 9 is a perspective illustration of a portion of a second antisoiling surface structure with discontinuous micro-structures.

FIG. 9 shows second antisoiling surface 1002 with dis-continuous micro-structures 1020. For example, if antisoil-ing surface 1002 were viewed on the yz-plane (similar to FIG. 4B), more than one nano-peak 1022 may be shown spaced by micro-structures 1020, which can be contrasted to FIG. 4B showing micro-peak 420 extending continuously from the left side to the right side of the view. In particular, micro-peaks 1022 of micro-structures 1020 may be sur-rounded by micro-spaces 1024. Micro-peaks 1022 may each have a half dome-like shape. For example, the half dome-like shape may be a hemisphere, a half ovoid, a half-prolate spheroid, or a half-oblate spheroid. Edge 1026 of the base of each micro-peak 1022, extending around each micro-peak, may be a rounded shape (e.g., a circle, an oval, or a rounded rectangle). The shape of the micro-peaks 1022 may be uniform, as depicted in the illustrated embodiment, or can be non-uniform.

Figure 10:
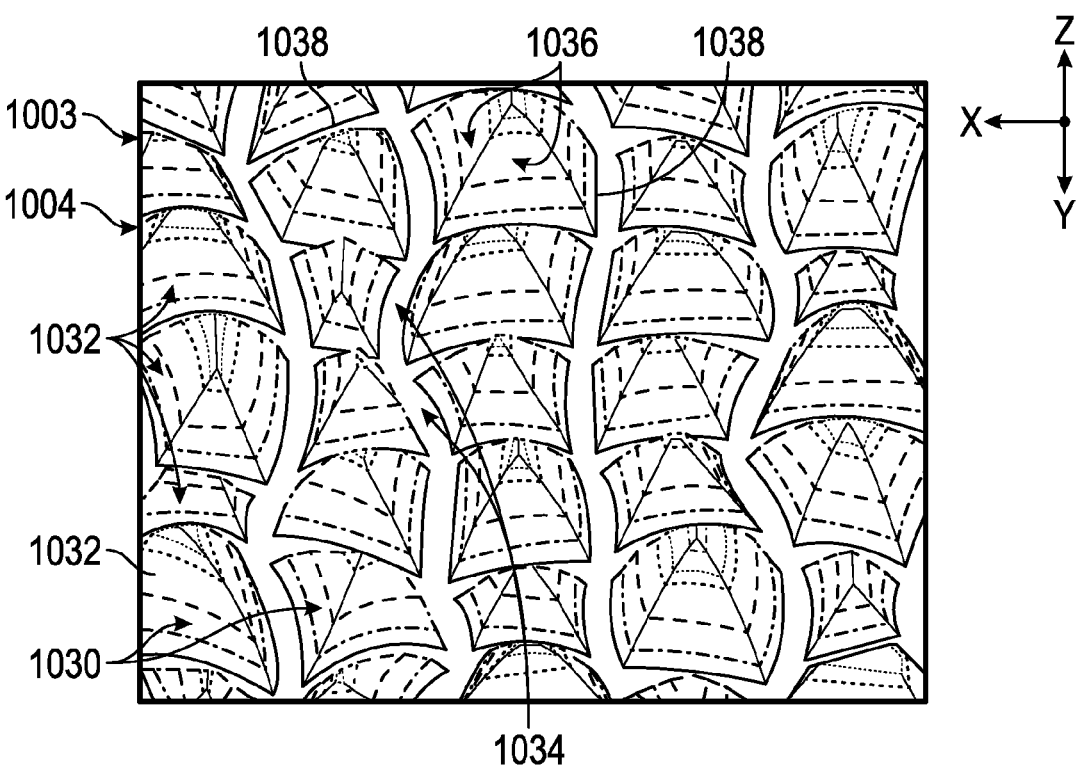
FIGS. 10 and 11 are perspective illustrations of different portions of a third anti-reflective surface structure with discontinuous micro-structures.
Figure 11:
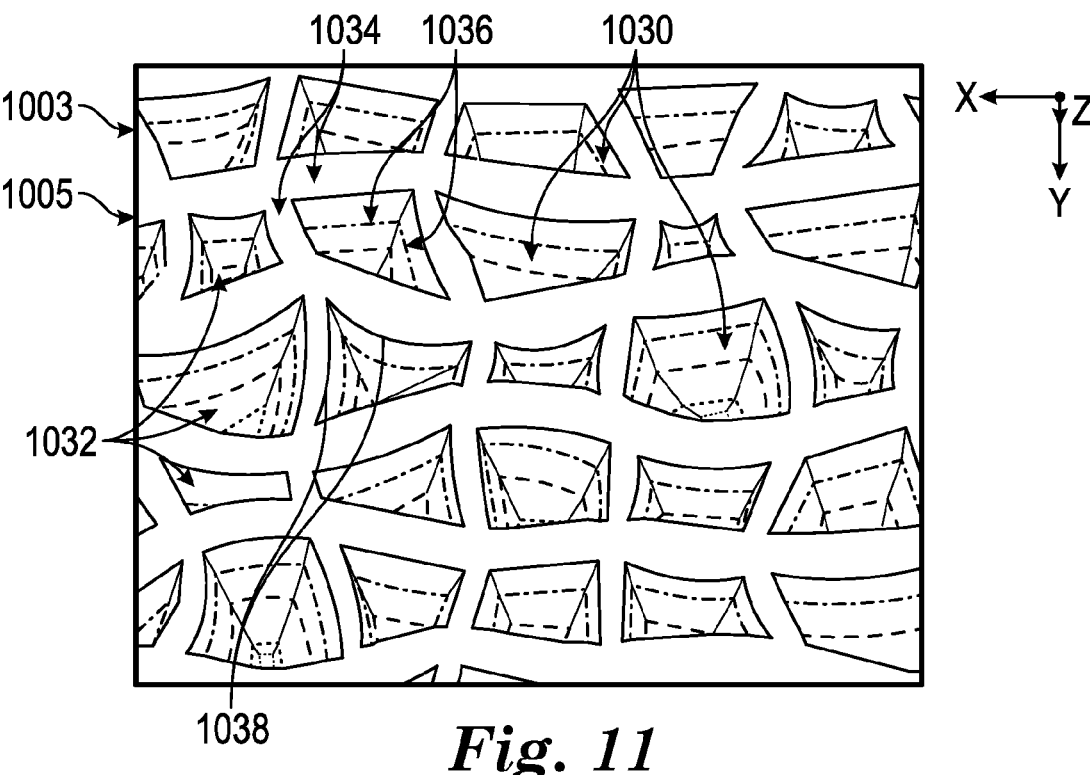

FIGS. 10 and 11 are perspective illustrations of first portion 1004 (FIG. 10) and second portion 1005 (FIG. 11) of third antisoiling surface 1003 with discontinuous micro-structures 1030. Both are perspective views. The FIG. 10 view shows more of a "front" side of the micro-structures 1030 close to a 45-degree angle, whereas the FIG. 11 view shows some of a "back" side of the micro-structures closer to an overhead angle. Micro-peaks 1032 of micro-structures 1030 surrounded by micro-spaces 1034 may have a pyra-mid-like shape (e.g., micro-pyramids). For example, the pyramid-like shape may be a rectangular pyramid or a triangular pyramid. Sides 1036 of the pyramid-like shape may be non-uniform in shape or area, as depicted in the illustrated embodiment, or can be uniform in shape or area. Edges 1038 of the pyramid-like shape may be non-linear, as depicted in the illustrated embodiment, or can be linear. The overall volume of each micro-peak 1032 may be non-uniform, as depicted in the illustrated embodiment, or can be uniform.

Multilayer films can be advantageous for having physical and chemical properties on the top surface of the film that differ from the physical and chemical properties on the bottom surface of the film. For example, highly fluorinated polymers are beneficial for stain, chemical, and dirt resis-tance, but inherently do not adhere well to other polymers or adhesives. A first fluoropolymer layer 1501 having a high content of tetra-fluoroethylene (TFE) have higher fluorine content and thus can be beneficial as the micro-structured surface layer in articles described herein. The second fluo-ropolymer layer 1502 may have a lower content of TFE and still adhere well to the first fluoropolymer layer 1501. If the second fluoropolymer layer also comprises vinylidene fluo-ride (VDF), it will adhere well to other fluoropolymers comprising VDF, such as polyvinylidene fluoride (PVDF). If the second, or third, fluoropolymer 1503 layer comprises enough VDF, it will adhere well to non-fluorinated polymer layer 1504 such as acrylate polymers and even urethane polymers. Useful multi-layer fluoropolymer films for anti-soiling surface structured films having highly fluorinated top surface layers and less fluorinated bottom surface layers are described in PCT Pub. No. WO2017/172564 (Hebrink et al.).

Antistatic agent(s) may also be incorporated into the antisoiling layer to reduce unwanted attraction of dust, dirt, and debris. Ionic antistatic agents (e.g., under the trade designation 3M IONIC LIQUID ANTI-STAT FC-4400 or 3M IONIC LIQUID ANTI-STAT FC-5000 available from 3M Company) may be incorporated into PVDF fluoropoly-mer layers to provide static dissipation. Antistatic agents for PMMA and methyl methacrylate copolymer (CoPMMA) optical polymer layers may be provided as STATRITE from Lubrizol Engineered Polymers, Brecksville, OH. Additional antistatic agents for PMMA and CoPMMA optical polymer layers may be provided as PELESTAT from Sanyo Chemical Industries, Tokyo, Japan. Optionally, antistatic properties can be provided with transparent conductive coatings, such as: indium tin oxide (ITO), fluorine doped tin oxide (FTO), aluminum doped zinc oxide (AZO), metallic nanowires, carbon nanotubes, or a thin layer of graphene, any of which may be disposed, or coated, onto one of the layers of the antisoiling surface structured films described herein.

Preferably, the hard coat or overlaminate layer, the protective layer, or the antisoiling layer comprises ceramic or glass beads, ceramic or glass bubbles, or combinations thereof. For example, ceramic or glass beads and/or ceramic or glass bubbles are hard particles that can be present on the surface (e.g., outer) layer to provide scratch resistance. In some embodiments, such beads and/or bubbles may even protrude from the surface as hemispheres or even quarter spheres.

Referring now to FIGS. 13A-13E, an outer surface 300 of an outer (e.g., protective) layer 202 of a radiative cooling article may include structures that provide high absorptivity in the atmospheric window region. In particular, the structures may be sized appropriately to increase the absorptivity of radiative cooling article (e.g., 200 of FIG. 2). Surface 300 of outer layer 202 may be seen in a top-down view in FIG. 13A. As illustrated, plurality of structures 302 may be disposed in or on the surface of at least one of the layers, such as outer layer 202. The structures may be dispersed evenly through at least one of the layers, such as outer layer 202. In some embodiments, structures 302 may be disposed in or on the surface and be dispersed evenly through at least one of the layers. The arrangement of structures 302 may be described as an array, which may be two dimensional or three dimensional.

Structures 302 may include inorganic particles. For example, each structure 302 depicted may correspond to one inorganic particle. The inorganic particles may be dispersed in or disposed on at least one layer. The inorganic particles may comprise titania, silica, zirconia, or zinc oxide. The inorganic particles may be in the form of nanoparticles including; nanotitania, nanosilica, nanozironia, or even nano-scale zinc oxide particles. The inorganic particles may be in the form of beads or microbeads. The inorganic particles may be formed of a ceramic material, glass, or various combinations of thereof. In some embodiments, the inorganic particles have an effective D90 particle size of at least 1 (in some embodiments, at least 3, 5, 6, 7, 8, 9, 10, or even at least 13) micrometers. In some embodiments, the inorganic particles have an effective D90 particle size of at most 40 (in some embodiments, at most 25, 20, 15, 14, 13, 12, 11, 10, 9, or even at most 8) micrometers. As defined in NIST "Particle Size Characterization," ASTM E-2578-07 (2012) describes D90 as the intercept where 90% of the samples mass has particles with a diameter less than the value. For example, a D90 of 10 micrometers specifies that 90% of the samples mass includes particles with diameters less than 10 micrometers. Particle diameter may be measured with a particle size analyzer (e.g., available under the trade designation "HORIBA PARTICLE SIZE ANALYZER" from Flow Sciences, Inc., Leland, NC).

Suitable ceramic microspheres are available under the trade designations "3M CERAMIC MICROSPHERES WHITE GRADE W-210" (alkali aluminosilicate ceramic, effective D90 particle size of 12 micrometers), "3M CERAMIC MICROSPHERES WHITE GRADE W-410" (alkali aluminosilicate ceramic, effective D90 particle size of 21 micrometers), "CERAMIC MICROSPHERES WHITE GRADE W-610" (alkali aluminosilicate ceramic, effective D90 particle size of 32 micrometers), from 3M Company, or various combinations thereof. In general, various combinations of inorganic particles of the same or different size may be used.

Structures 302 may include surface structures. The surface structures may be disposed on a surface, such as surface 300 of outer layer 202. In some embodiments, the surface structures may be integrated into or on the surface. For example, the surface structures may be formed by extrusion replication or micro-replication on at least one of the layers of the radiative cooling article, as described in International Publication No. WO 2019/130199 (Hebrink et al.). The surface structures may or may not be formed of the same material as the at least one layer.

As can be seen in FIGS. 13B-13E, surface structures 304, 305, 306, 307 may define first widths 311, 321, 331, 341 and second widths 313, 323, 333, 343. First widths 311, 321, 331, 341 may be described as outer widths, and second widths 313, 323, 333, 343 may be described as base widths. In some embodiments, the surface structures 304, 305, 306, 307 may have an average width in a range of 1 to 40 micrometers, which may facilitate emissivity or absorptivity in the atmospheric window region. A surface structure 304, 305, 306, 307 may include sidewall 324, 325, 326, 327 defining each width 311, 313, 321, 323, 331, 333, 341, 343. The sidewalls 324, 325, 326, 327 may take various geometries. Some geometries may be particularly suited to certain manufacturing processes. The geometries may be defined by a cross-section extending between first width 311, 321, 331, 341 and second width 313, 323, 333, 343. Surface structures 304, 305, 306 may be described as conical or having a cone-like shape. As used herein, the term "width" may refer to a diameter of structure 304, 305, 306, for example, when the cross-section of the structure is circular, oval, or cone-like. In FIG. 13B, the cross-section of sidewall 324 of surface structure 304 may include at least one straight line between widths 311, 313. First width 311 may be smaller than the second width 313 to define a slope. In FIGS. 13C-13D, the cross-section of sidewalls 325, 326 of surface structures 305, 306, respectively, may include at least one curve or arc between respective first and second widths 321, 323 and 331, 333. In FIG. 13C, width 321 is non-zero to give a tapered cylindrical shape to surface structure 305. In FIG. 13D, width 331 is equal to zero to give a hemispherical shape to surface structure 306. In some embodiments, the surface structure 306 may be spheroid, or even an ellipsoid shape. As can be seen in FIG. 13E, surface structure 307 may be described as a square- or rectangular-shaped post. The cross-section of sidewall 327 of surface structure 307 may be include a straight line between widths 341, 343, as illustrated, or may even include at least one curve or arc between the widths. Sidewall 327 may define a slope, wherein first width 341 is less than second width 343, as illustrated, or may even be vertical, wherein the first and second widths are equal.

Each structure 304, 305, 306, 307 may protrude from the surface 300 by a height extending orthogonal to the surface. The width of each structure 304, 305, 306, 307 may be defined orthogonal to the height and parallel to the surface 300. In some embodiments, each surface structure 304, 305, 306, 307 has an average width of at least 1 (in some embodiments, at least 3, 5, 6, 7, 8, 9, or even at least 10) micrometers. In some embodiments, each surface structure 304, 305, 306, 307 has an average width of at most 50 (in some embodiments, at most 20, 15, 14, 13, 12, 11, 10, 9, or even at most 8) micrometers. In some embodiments, each surface structure 304, 305, 306, 307 has an average height of at least 1 (in some embodiments, at least 3, 5, 6, 7, 8, 9, or even at least 10) micrometers. In some embodiments, each surface structure 304, 305, 306, 307 has an average height of at most 50 (in some embodiments, at most 20, 15, 14, 13, 12, 11, 10, 9, or even at most 8) micrometers.

Transparent Adhesive Tie Layer

Suitable transparent adhesives for the one or more tie layers include for instance, pressure sensitive adhesives. Classes of suitable pressure sensitive adhesives include acrylics, tackified rubber, tackified synthetic rubber, ethylene vinyl acetate and the like. Suitable acrylic adhesives are disclosed, for example, in U.S. Pat. No. 3,239,478 (Harlan); U.S. Pat. No. 3,935,338 (Robertson); U.S. Pat. No. 5,169, 727 (Boardman); U.S. Pat. No. 4,952,650 (Young et al.) and U.S. Pat. No. 4,181,752 (Martens et al.), incorporated herein by reference.

In select embodiments, the transparent adhesive is optically clear, which means that the adhesive has both transparency and clarity (e.g., low haze). In certain embodiments, an optically clear adhesive (OCA) is selected from an acrylate, a polyurethane, a polyolefin (such as a polyisobutylene (PIB)), a silicone, or a combination thereof. Illustrative OCAs include those described in International Pub. No. WO 2008/128073 (Everaerts et al.) relating to antistatic optically clear pressure sensitive adhesives, U.S. Pat. App. Pub. Nos. US 2009/089137 (Sherman et al.) relating to stretch releasing OCA, US 2009/0087629 (Everaerts et al.) relating to indium tin oxide compatible OCA, US 2010/0028564 (Cheng et al.) relating to antistatic optical constructions having optically transmissive adhesive, US 2010/0040842 (Everaerts et al.) relating to adhesives compatible with corrosion sensitive layers, US 2011/0126968 (Dolezal et al.) relating to optically clear stretch release adhesive tape, and U.S. Pat. No. 8,557,378 (Yamanaka et al.) relating to stretch release adhesive tapes. Suitable OCAs include acrylic optically clear pressure sensitive adhesives such as, for example, 3M OCA 8146, 8211, 8212, 8213, 8214, and 8215, each available from 3M Company, St. Paul, MN.

In some embodiments, the transparent adhesive may be resistant to ultraviolet radiation damage. Exemplary adhesives which are typically resistant to ultraviolet radiation damage include silicone adhesives and acrylic adhesives containing UV-stabilizing/blocking additive(s), for example. U.S. Pat. No. 5,504,134 (Palmer et al.), for instance, describes attenuation of polymer substrate degradation due to ultraviolet radiation through the use of metal oxide particles in a size range of about 0.001 to about 0.2 micrometers (in some embodiments, about 0.01 micrometers to about 0.15 micrometers) in diameter. U.S. Pat. No. 5,876, 688 (Laundon), describes a method for producing micronized zinc oxide that are small enough to be transparent when incorporated as UV blocking and/or scattering agents in paints, coatings, finishes, plastic articles, cosmetics and the like which are well suited for use in the present invention. These fine particles such as zinc oxide and titanium oxide with particle sizes ranging from 10 nm to 100 nm that can attenuate UV radiation are available, for example, from Kobo Products, Inc., South Plainfield, NJ.

Ultraviolet-Reflective Layer

The optional ultraviolet-reflective layer is typically a UV-reflective multilayer optical film that is at least 50 percent reflective of ultraviolet radiation (i.e., at normal incidence) over a majority of wavelengths in the range of at least 340 but less than 400 nanometers. In some embodiments, the ultraviolet-reflective layer is at least 60 percent, at least 70 percent, at least 75 percent, at least 80 percent, at least 85 percent, at least 90 percent, at least 95 percent, or even at least 98 percent reflective (i.e., at normal incidence)

of ultraviolet radiation (i.e., at normal incidence) over a majority of wavelengths in the range of at least 340 but less than 400 nanometers. This reflectivity advantageously serves to reduce ultraviolet radiation damage (e.g., photodegradation by sunlight) to the white diffusely reflective microporous layer, especially layers comprising polyethylene terephthalate (PET) polyester.

The ultraviolet-reflective layer can be a UV-reflective multilayer optical film, many of which are known in the art. Such UV-reflective MOFs generally comprise alternating layers of different polymers with different refractive indexes and appropriate layer thicknesses. FIG. 3 shows an exemplary UV-reflective multilayer optical film 320, which may also be used as a reflective mirror for visible, and/or infrared wavelengths depending on the configuration of the optical layers. UV-reflective multilayer optical film 320 includes one or more first optical layers 312, one or more second optical layers 314, and optionally one or more UV/VIS transparent additional skin layers 318.

UV-reflective multilayer optical film 320 includes a multilayer optical stack 308 having alternating layers 312, 314 of at least two materials, typically comprising different polymers. An in-plane index of refraction n1 in one in-plane direction of high refractive index layer 312 is higher than the in-plane index of refraction n2 of low refractive index layer 314 in the same in-plane direction. The difference in refractive index at each boundary between layers 312, 314 causes part of the incident light to be reflected. The transmission and reflection characteristics of multilayer optical film 320 is based on coherent interference of light caused by the refractive index difference between layers 312, 314 and the thicknesses of layers 312, 314. When the effective indices of refraction (or in-plane indices of refraction for normal incidence) differ between layers 312, 314, the interface between adjacent layers 312, 314 forms a reflecting surface. The reflective power of the reflecting surface depends on the square of the difference between the effective indexes of refraction of the layers 312, 314 (e.g., $(n1-n2)^2$). By increasing the difference in the indices of refraction between the layers 312, 314, improved optical power (higher reflectivity), thinner films (thinner or fewer layers), and broader bandwidth performance can be achieved. The refractive index difference in one in-plane direction in an exemplary embodiment is at least about 0.05, preferably greater than about 0.10, more preferably greater than about 0.15 and even more preferably greater than about 0.20.

In some embodiments, the materials of layers 312, 314 inherently have differing indices of refraction. In another embodiment, at least one of the materials of the layers 312, 314 has the property of stress induced birefringence, such that the index of refraction (n) of the material is affected by the stretching process. By stretching multilayer optical film 320 over a range of uniaxial to biaxial orientations, films can be created with a range of reflectivities for differently oriented plane-polarized incident light.

The number of layers in the UV-reflective multilayer optical film 320 is selected to achieve the desired optical properties using the minimum number of layers for reasons of film thickness, flexibility and economy. In the case of reflective films such as mirrors, the number of layers is preferably less than about 2,000, more preferably less than about 1,000, and even more preferably less than about 750. In some embodiments, the number of layers is at least 150 or 200. In other embodiments, the number of layer is at least 250.

In some embodiments, the UV-reflective multilayer optical film 320 further comprises optional additional nonoptical or optical skin layers. Optional skin layers 318 may protect the optical layers 312, 314 from damage, aid in the co-extrusion processing, and/or enhance post-processing mechanical properties. The additional skin layers 318 are often thicker than the optical layers 312, 314. The thickness of the skin layers 318 is usually at least two times, preferably at least four times, and more preferably at least ten times, the thickness of the individual optical layers 312, 314. The thickness of the skin layers 318 may be varied to make a UV-reflective multilayer optical film having a particular thickness. A tie layer (not shown) may optionally be present between the skin layer(s) and the optical layers. Further, an optional top coat may be disposed on the skin layer. Typically, one or more of the additional layers 318 are placed so that at least a portion of the light to be transmitted, polarized, and/or reflected by the optical layers 312, 314, also travels through the additional layers (i.e., the additional layers are placed in the path of light which travels through or is reflected by optical layers 312, 314). To provide a degree of antisoiling properties, one or both of the skin layers (preferably at least the outermost skin layer) comprises fluoropolymer.

UV-reflective multilayer optical film 320 comprises multiple low/high index pairs of film layers, wherein each low/high index pair of layers 312,314 has a combined optical thickness of ½ the center wavelength of the band it is designed to reflect. Stacks of such films are commonly referred to as quarter-wave stacks. In some embodiments, different low/high index pairs of layers may have different combined optical thicknesses, such as where a broadband reflective optical film is desired.

The various constituent layers of UV-reflective multilayer optical film 320, whether as skin layers or optical layers, are preferably resistant to ultraviolet radiation. Many fluoropolymers are resistant to UV-radiation. Examples of fluoropolymers that may be used include copolymers of tetrafluoroethylene (TFE), hexafluoropropylene (HFP), and vinylidene fluoride (e.g., available from 3M Company under the trade designation 3M DYNEON THV); a copolymer of TFE, HFP, vinylidene fluoride, and perfluoropropyl vinyl ether (PPVE) (e.g., available from 3M Company under the trade designation 3M DYNEON THVP); a polyvinylidene fluoride (PVDF) (e.g., 3M DYNEON PVDF 6008 from 3M Company); ethylene chlorotrifluoroethylene polymer (ECTFE) (e.g., available as HALAR 350LC ECTFE from Solvay, Brussels, Belgium); an ethylene tetrafluoroethylene copolymer (ETFE) (e.g., available as 3M DYNEON ETFE 6235 from 3M Company); perfluoroalkoxyalkane polymers (PFA); fluorinated ethylene propylene copolymer (FEP); a polytetrafluoroethylene (PTFE); copolymers of TFE, HFP, and ethylene (HTE) (e.g., available as 3M DYNEON HTE1705 from 3M Company). Combinations of fluoropolymers can also be used. In some embodiments, the fluoropolymer includes FEP. In some embodiments, the fluoropolymer includes PFA.

Examples of non-fluorinated polymers that may be used in at least one layer of UV-reflective multilayer optical film 320 include at least one of: polypropylene, polyethylene, polyethylene copolymers, polyethylene methacrylate copolymers, ethylene vinyl acetate copolymers, polymethyl methacrylate, methyl methacrylate copolymers (e.g., copolymers of ethyl acrylate and methyl methacrylate), polyurethanes, extended chain polyethylene polymers (ECPEs), or a combinations thereof. In general, combinations of non-fluorinated polymers can be used. Exemplary nonfluorinated polymers, especially for use in high refractive index optical layers, may include homopolymers of polymethyl methacrylate (PMMA), such as those available as CP71 and CP80 from Ineos Acrylics, Inc., Wilmington, DE; and polyethyl methacrylate (PEMA), which has a lower glass transition temperature than PMMA. Additional useful polymers include: copolymers of methyl methacrylate such as, for example, a copolymer made from 75 wt. % methyl methacrylate and 25 wt. % ethyl acrylate, for example, as available from Ineos Acrylics, Inc. as PERSPEX CP63, or as available from Arkema, Philadelphia, PA as ALTUGLAS 510, and copolymers of methyl methacrylate monomer units and n-butyl methacrylate monomer units. Blends of PMMA and PVDF may also be used.

Suitable triblock acrylic copolymers are available, for example, as KURARITY LA4285 from Kuraray America Inc., Houston, TX. Additional suitable polymers for the optical layers, especially for use in the refractive index optical layers, may include at least one of: polyolefin copolymers such as poly(ethylene-co-octene) (e.g., available as ENGAGE 8200 from Dow Elastomers, Midland, MI), polyethylene methacrylate (e.g., available as ELVALOY from Dow Elastomers), poly (propylene-co-ethylene) (e.g., available as Z9470 from Atofina Petrochemicals, Inc., Houston, TX); and a copolymer of atactic polypropylene and isotactic polypropylene. Materials may be selected based on absorbance or transmittance properties described herein, as well as on refractive index. In general, the greater the refractive index between two materials, the thinner the film can be, which may be desirable for efficient heat transfer.

Multilayer optical films (including reflective polarizers and mirrors) can be made by coextrusion of alternating polymer layers having different refractive indices, for example, as described in U.S. Pat. No. 5,882,774 (Jonza et al.); U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); U.S. Pat. No. 7,271,951 B2 (Weber et al); U.S. Pat. No. 7,632,568 (Padiyath et al.); U.S. Pat. No. 7,652,736 (Padiyath et al.); and U.S. Pat. No. 7,952,805 (McGurran et al.); and PCT Publications WO 95/17303 (Ouderkirk et al.) and WO 99/39224 (Ouderkirk et al.).

In one preferred embodiment, the UV-reflective multilayer optical film reflects a wavelength range from 340 to 400 nanometers made with 150 high refractive index layers comprising a methyl methacrylate copolymer (CoPMMA) (e.g., available as PERSPEX CP63 from Lucite International, Cordova, Tennessee) alternating with 150 low refractive index layer comprising a fluoropolymer (e.g., available as 3M DYNEON THV221 from 3M Company).

Infrared-Reflective Layer

The radiative cooling article optionally includes an infrared-reflective layer disposed between the white diffusely reflective microporous layer and the non-white color reflective mirror film or disposed adjacent to the non-white color reflective mirror film and opposite the white diffusely reflective microporous layer. The function of the optional infrared-reflective layer is to reduce (by reflection) the amount of IR thermal radiation that is generated, e.g., by the reflective microporous film, and transmitted toward any substrate that is intended to be cooled by the radiative cooling article.

The optional infrared-reflective layer may be composed of any material that has an average reflectivity of at least 50 percent over at least the wavelength range of 800 to 1300 nm, and preferably 700 to 2500 nm, and more preferably 700 to 3000 nm.

Exemplary infrared-reflective layers include infrared-reflective multilayer films, for example, as described in the section on UV-reflective multilayer films hereinabove, except tuned to infrared wavelengths. For multilayer optical films concerned with the visible and the near infrared wavelengths, a quarterwave stack design results in each of the layers 312, 314 (see FIG. 3) in the multilayer stack having an average thickness of not more than about 0.7 micrometers.

Multilayer optical films (including reflective polarizers and mirrors) can be made by coextrusion of alternating polymer layers having different refractive indices, for example, as described in U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); U.S. Pat. No. 7,271,951 B2 (Weber et al); U.S. Pat. No. 7,632,568 (Padi-yath et al.); and U.S. Pat. No. 7,952,805 (McGurran et al.); and PCT Publications WO 95/17303 (Ouderkirk et al.) and WO 99/39224 (Ouderkirk et al.).

Exemplary IR-reflective layers also include: layers of a metal such as, for example, aluminum, gold, or silver; and layers of metal oxide or metal sulfide such as, for example, cerium oxide, aluminum oxide, magnesium oxide, and indium tin oxide.

Other IR-reflective layers known in the art may also be used.

Air Bleed Adhesive Layer

The radiative cooling article optionally includes an air bleed adhesive layer disposed adjacent to the white diffusely reflective microporous layer and opposite the non-white color reflective mirror film. Adhesives that allow for air (or other fluid) to be released from between the adhesive layer and a substrate are well known in the art.

For example, micro-structured adhesive articles have been prepared by applying a flowable pressure sensitive adhesive to the surface of a microstructured release liner or the surface of a microstructured molding tool. The process results in the creation of an adhesive having a microstruc-tured surface. When the resulting articles are dry laminated under pressure to substrates such as glass or polymer films, the microstructural features created in the adhesive surface allow air to escape from the bonding interface, thereby minimizing or preventing the formation of bubbles and pinholes.

During lamination, the microstructural features may flat-ten out and wet the substrate surface. Typically, applied pressure is used to collapse the structures during lamination and form the adhesive bond. However, this process intro-duces stresses into the adhesive as the adhesive relaxes and tries to return to its initial microstructured state. These stresses can create defects in the adhesive that adversely affect its adhesive and optical properties.

A variety of techniques have been used to prepare adhe-sive articles with microstructured surfaces. Typically, the adhesive surface is contacted to a structured tool or release liner to form a structured pattern in the adhesive layer. For example, in U.S. Pat. No. 6,315,651 (Mazurek et al.) micro-structured pressure sensitive adhesives are formed by mold-ing an adhesive layer against a microstructured tool or a microstructured liner, and in U.S. Patent Publication No. 2006/0188704 (Mikami et al.) fluid egress structures are formed in an adhesive surface by contacting the adhesive to a structured release tool or a structured release liner. Japa-nese Utility Model Publication 7-29569 (Kawada et al.) describes forming a tack label for a container such as a bottle. The tack label is readily removable from the bottle surface by soaking the bottle in an aqueous solution, because the adhesive contains an uneven shape to form penetration channels permitting fluid entry to the bond line. The labels are formed by contacting an adhesive to a structured release liner, the release liner having been formed by embossing, and then contacting the label material to the exposed adhe-sive surface. Additionally, in U.S. Patent Publication No. 2007/0212635 (Sherman et al.), a structured adhesive sur-face is formed by pressing a microstructured tool or release liner to a crosslinked adhesive surface.

Another example of a temporary topography formed on an adhesive surface is disclosed in U.S. Pat. No. 5,268,228 (Orr). A double-sided adhesive-coated tape has fine grooves on one or both sides of the tape to facilitate air venting to minimize non-contact areas. The grooves in the tape are fine enough that, once the two surfaces to be bonded are in position, the grooves largely or completely disappear. Example 1 describes scribing lines through a protective sheet that placed grooves 70-150 micrometers deep in the underlying adhesive surface.

In Japanese Patent Publication 7-138541 (Shimizu), an adhesion process film is prepared with an embossing process to form fine continuous concave grooves.

In addition, several applications have been described in which microstructured adhesive layers have beads or pegs that protrude from the adhesive surface to make the adhesive surface positionable or repositionable upon contact with a substrate surface. U.S. Pat. No. 5,296,277 (Wilson et al.) describes such a system. U.S. Pat. No. 7,060,351 (Hanning-ton), describes an adhesive article that provides air egress, by providing an area of no initial adhesion for the air to flow out from under the construction. In the article, a continuous layer of adhesive is adhered to a surface that has a plurality of spaced-apart non-adhesive material, and the non-adhesive material becomes embedded in the adhesive layer.

Representative examples of patents describing how an adhesive's topography is built from the interface between the adhesive and the release liner include U.S. Pat. Nos. 5,296,277 and 5,362,516 (both Wilson et al.) and U.S. Pat. No. 5,141,790 (Calhoun et al.). The principal topographical features in the adhesive surface are isolated protrusions from the adhesive surface with identified contact areas.

An example of a temporary topography formed on an adhesive surface is disclosed in U.S. Pat. Nos. 5,344,681 and 5,449,540 (both Calhoun et al.). A segmented pressure-sensitive adhesive transfer tape is designed to prevent lateral flow of the adhesive prior to transfer but allows flow after transfer to form a continuous adhesive bond. The small adhesive segments have controllable thickness. An adhesive transfer tape comprises: a carrier with two opposed surfaces with one containing a series of recesses and the other being relatively smooth; a pressure sensitive adhesive being pres-ent in the recesses which are surrounded by an adhesive free area such that when the tape is wound about itself with the surfaces contacting and then unwound, adhesive transfers from the one surface to the other. Preferably, the recesses are formed by embossing and are in spaced-apart relationship. Preferably, they are oval, circular, polygonal or rectangular in cross section. Preferably, the adhesive is acrylic or rubber resin, pressure sensitive.

Any of the adhesive layers described above may be suitable for use with the radiative cooling article.

Multi-Surface Passive Cooling Article

In a third aspect, the present disclosure provides a multi-surface passive cooling article. For instance, the radiative cooling article optionally can be combined with a multi-surface passive cooling layer (e.g., disposed adjacent to a major surface of the white diffusely reflective microporous layer and opposite the non-white color reflective mirror film)

to provide a multi-surface passive cooling article. The multi-surface passive cooling article comprises:

a plurality of first elements defining first element outer surfaces, the plurality of first elements defining a first absorbance of greater than or equal to 0.6 in an atmospheric window wavelength range from 8 to 13 micrometers and defining a first average reflectance of greater than or equal to 80% in a solar wavelength range from 0.4 to 2.5 micrometers, wherein at least one of the first elements comprises a radiative cooling layer comprising a) a white diffusely reflective microporous layer that has a solar weighted reflectivity at normal incidence of electromagnetic radiation over a majority of wavelengths in a range of 350 nanometers (nm) to 2500 nm of 0.8 or greater, 0.85, 0.9, or 0.95 or greater; and b) a non-white color reflective mirror film having a plurality of first optical layers and a plurality of second optical layers, the non-white color reflective film disposed adjacent to a major surface of the white diffusely reflective microporous layer, wherein the non-white color reflective film reflects a wavelength bandwidth of at least 30 nm within a wavelength range of 350 nm to 700 nm; and a plurality of second elements defining second element outer surfaces, the plurality of second elements defining a second absorbance of less than or equal to 0.5 in the atmospheric window wavelength range and defining a second average reflectance of greater than or equal to 60% in the solar wavelength range;

wherein the plurality of first elements and the plurality of second elements are interspersed to form a major structure having a first major surface comprising the first element outer surfaces and the second element outer surfaces and a second major surface opposing the first major surface;

wherein the major structure has a first end region and a second end region, wherein the first element outer surfaces face a first direction toward the first end region and the second element outer surfaces face a second direction toward the second end region.

In some applications, the major structure is applicable to a vertical surface of a substrate (such as a building or a vehicle) with the high emissivity elements facing, or oriented, upward toward the sky and the low emissivity elements facing, or oriented, downward toward the ground or at least "shaded" by the high emissivity elements.

Figure 14:
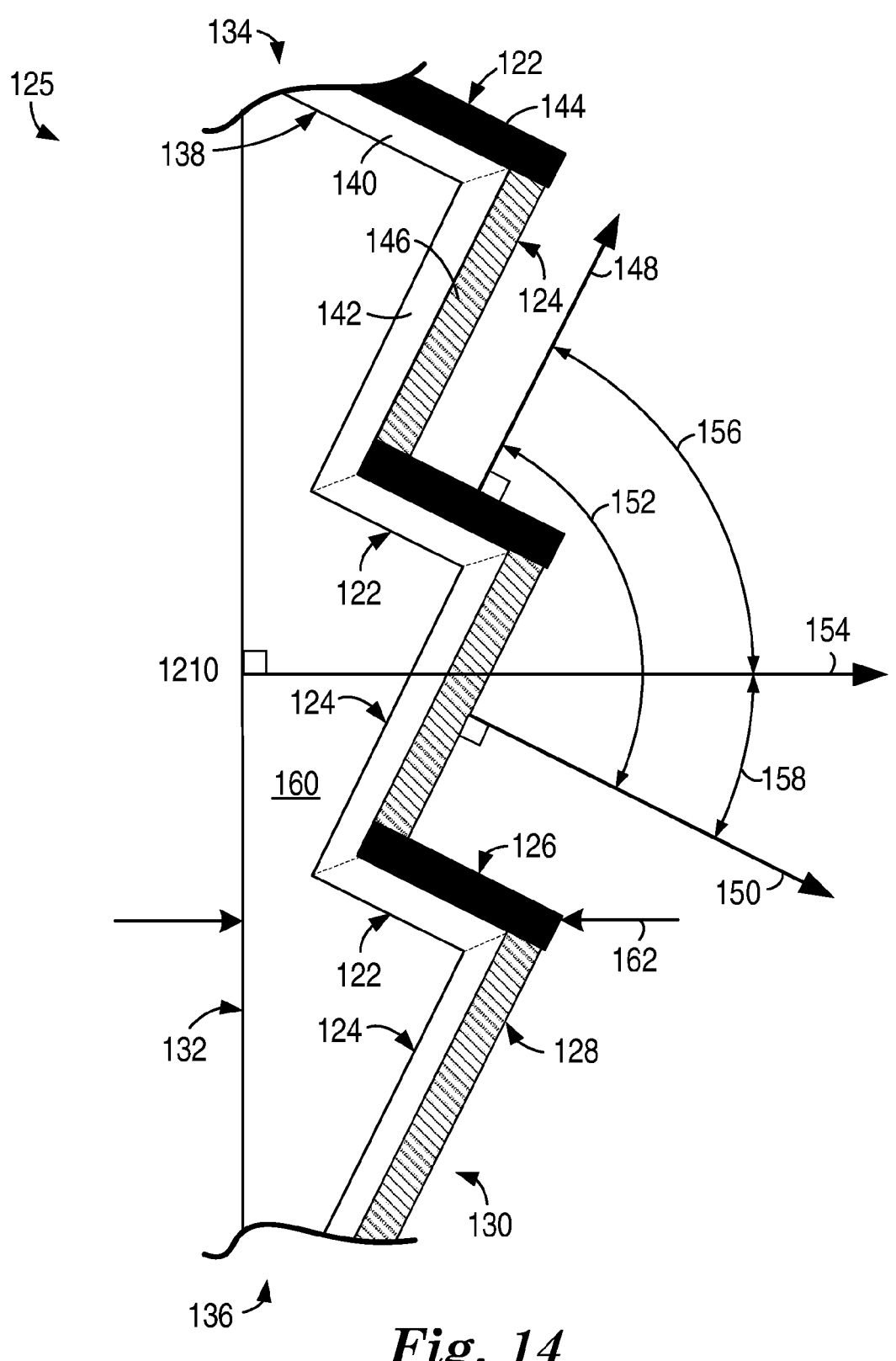
FIG. 14 is a schematic cross-sectional illustration of one example of a multi-surface passive cooling article
Figure 15:
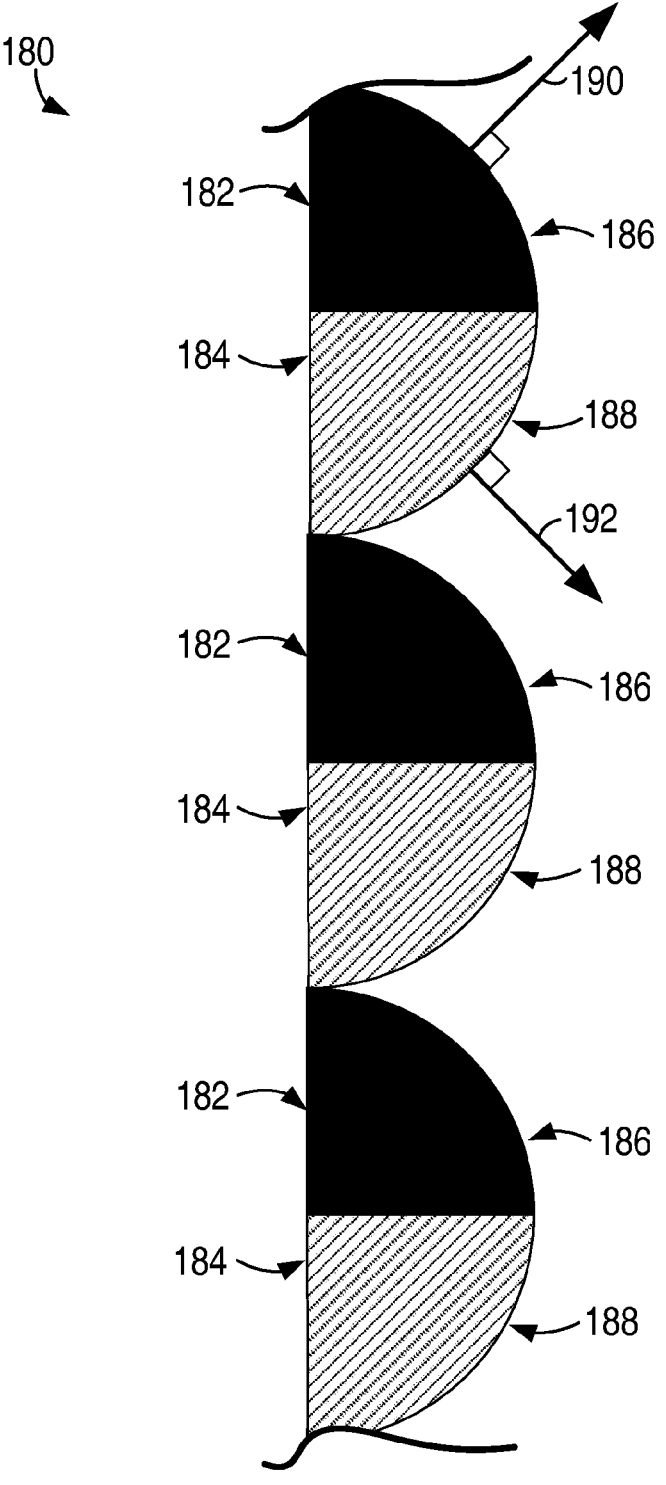
FIG. 15 is a schematic cross-sectional illustration of another example of a multi-surface passive cooling article.
Figure 16:
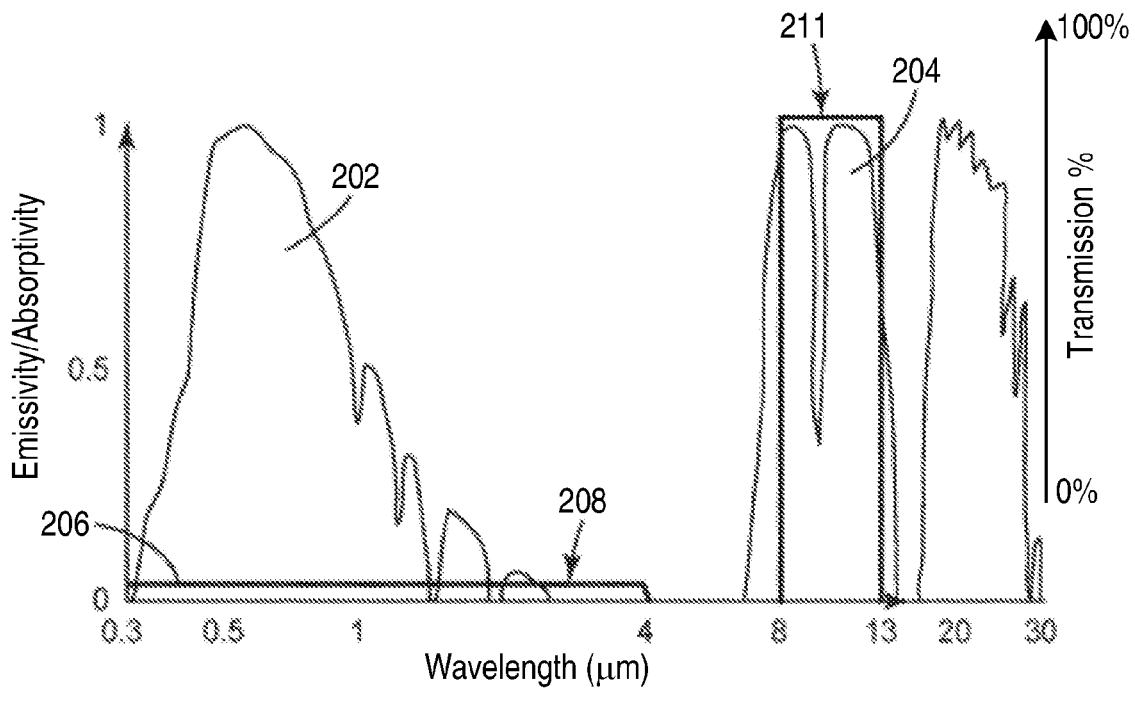
FIG. 16 is a graph of an energy spectrum of solar energy (or sunlight) described as terrestrial reference spectrum found in ASTM G173-03 (2012), an energy transmission % spectrum in an atmospheric window region, and one example of an absorption of high emissivity elements of a multi-surface passive cooling article.

FIG. 16 is a graph of: an energy spectrum 202 of solar energy (or sunlight) described as terrestrial reference spectrum found in ASTM G173-03 (2012), an energy transmission % spectrum 204 in an atmospheric window region (for example, from 0 to 1), and one example of an absorption 206 (for example, absorptivity or emissivity, as shown on the y-axis from 0 to 1) of high emissivity elements of an article, such as the first elements 122 (FIG. 14) or the first elements 182 (FIG. 15). Absorption 206 may also be described in terms of absorbance (for example, the logarithm of transmission).

High emissivity elements may define reflectors to reflect some or all the light of the energy spectrum 202 in the reflective band 208. The reflective band 208 at least partially (or entirely) covers wavelengths in the solar region and, in some cases (such as an infrared mirror film), at least partially (or entirely) covers wavelengths in the visible, near-infrared, or mid-infrared regions. Reflectors may have low absorption 206 in the reflective band 208. High emissivity elements may have a high absorption 206 in an absorptive band 211. The absorptive band 211 may at least partially (or entirely)

cover the wavelengths in the atmospheric window region, which may facilitate transmitting at least some infrared energy (for example, from any article of the present disclosure) through the high transmission regions of the atmosphere, for example, as shown by the energy transmission % spectrum 204. High emissivity elements may have low reflectivity in the absorptive band 211.

FIG. 14 is a schematic cross-sectional illustration of one example of a multi-surface passive cooling article 125. The article 125 is couplable to an outer surface of a substrate 1210 (FIG. 12A). The illustrated view shows a cross-section the multi-surface passive cooling article 125 along a plane orthogonal to the outer surface of at least a portion of the substrate 1210. In some embodiments, the substrate 1210 is coupled to a fluid, a liquid or a gas, which can transfer heat away from another article (such as a heat exchanger, building, battery, refrigerator, freezer, air conditioner, or photovoltaic module). As illustrated, the multi-surface passive cooling article 125 includes a plurality of first elements 122 defining first element outer surfaces 126 and a plurality of second elements 124 defining second element outer surfaces 128. Each first element 122 may define one first element outer surface 126. Each second element 124 may define one second element outer surface 128. In general, each first element 122 may be disposed proximate, or adjacent, to one of the second elements 124, and vice versa. The plurality of first elements 122 and the plurality of second elements 124 may be interspersed to form a first major surface 130 of a major structure (which may be generally formed as a sheet with an uneven major surface). Accordingly, the multi-surface passive cooling article typically is formed of more than a single layer.

The first major surface 130 includes the first element outer surfaces 126 and the second element outer surfaces 128. The first major surface 130 may be formed continuously by the first elements 122 and the second elements 124. A second major surface 132 may be defined opposing the first major surface 130. In particular, the second major surface 132 may be on the opposite side of the article 120 than the first major surface 130.

The multi-surface passive cooling article 125 may include a backing layer 160 couplable to the substrate 1210. The backing layer 160 may be defined as being coupled to the second major surface 132 at least partially (or entirely) formed by the plurality of first and second elements 122, 124 or may be defined as at least partially (or entirely) forming the second major surface 132. The multi-surface passive cooling article 125 may define a first end region 134 and a second end region 136. The first element outer surfaces 126 may face a first direction toward the first end region 134. The second element surfaces may face a second direction toward the second end region 136. In use, the multi-surface passive cooling article 125 may be oriented such that the first end region 134 is closer to the sky and the second end region 136 is closer to the ground. The first element outer surfaces 126 may be described as sky-facing surfaces. The second element outer surfaces 128 may be described as ground-facing surfaces.

The plurality of first elements 122 and the plurality of second elements 124 may be formed in any suitable shape to provide the first element outer surfaces 126 and the second element outer surfaces 128 in the proper orientation. For example, any of the shapes described with respect to FIG. 4A-11 or 13A-13E may be used to form the shape of one or more of the elements 122, 124. In some embodiments, at least some (or all) of the elements 122, 124 are formed as continuous surface structures. As used herein, the term "continuous surface structures" refers to surface structures that extend fully across the first major surface 130 in at least one direction, such as a vertical or horizontal direction. In one or more embodiments, at least some (or all) of the elements 122, 124 are formed as, or arranged as, alternating rows of elongate elements. In one example, each element 122, 124 may extend horizontally from a first side of the multi-surface passive cooling article 125 to a second side opposite to the first side, for example, along a horizontal direction orthogonal to a vertical direction, which is defined as being aligned to a direction between the first end region 134 to the second end region 136. Multiple elements 122, 124 may be interspersed vertically, for example, in a linear array. Any suitable shape may be used to form the elements 122, 124 as alternating rows or elongate elements, for example, similar to those shown in FIGS. 4A-8). In particular, a first element 122 may be used to form part of each structure shown in FIGS. 4A-8 (for example, a portion closer to the first end region 134) and a second element 124 may be used to form the other part of each structure (for example, a portion closer to the second end region 136).

In some embodiments, such as the illustrated embodiment of FIG. 14, the multi-surface passive cooling article 125 may be described as plurality of first elements 122 and the plurality of second elements 124 separated by multiple parallel ridges. In some embodiments, the multi-surface passive cooling article 125 may be described as having multiple parallel ridges each having first and second opposing ridge faces, corresponding to the first elements 122 and the second elements 124, respectively.

In some embodiments, at least some (or all) of the first elements 122, 124 are formed as discrete surface structures. As used herein, the term "discrete surface structures" refers to surface structures that do not extend fully across the first major surface 130 in a vertical or horizontal direction. In some embodiments, the elements 122, 124 may be interspersed both vertically and horizontally (for example, in a two-dimensional array). Any suitable shape may be used to form the elements 122, 124 as discrete surface structures, for example, similar to the shapes shown in FIGS. 9-11 and 13A-13E. In some embodiments, the discrete surface structures may have any suitable three-dimensional shape, such as a hemisphere, a half ovoid, a half-prolate spheroid, a half-oblate spheroid, or a pyramid-like shape. In some embodiments, the discrete surface structures define surfaces 126, 128 (for example, when viewed perpendicular to the first major surface 130) shaped as rectangles, squares, circles, ovals, triangles, or other suitable geometric shapes.

In general, the cross-sectional profiles of one or more elements 122, 124 may have a cross-sectional profile shape (for example, viewed in the horizontal direction or a direction parallel to a major surface 130, 132), for example, generally like or similar to a quarter circle, quarter oval, triangle, square, rectangle, multiples or combinations thereof, or another suitable geometric shape that provides the first major surface 130. The cross-sections of the elements 122, 124 may be the same or similar. In one example, the cross-sections of one first element 122 and one adjacent second element 124 may each be generally formed as one or more rectangular shapes (see FIG. 14), which meet at an angle to form the first major surface 130. In another example, the cross-sections of one first element 122 and one adjacent second element 124 may each be generally formed as quarter circles (see FIG. 15), which may meet to form a half circle. The cross-sections of the elements 122, 124 may also be different. In a further example, the cross-section of one first element 122 may be formed as a right triangle and the cross-section of one adjacent second element 124 may be formed as a quarter circle, which together may form a triangle-like shape having one curved side. In some embodiments, at least some of the first element outer surfaces 126 or second element outer surfaces 128 define generally planar surfaces (see FIG. 14). In some embodiments, at least some of the first element outer surfaces 126 or second element outer surfaces 128 define curved surfaces (see FIG. 15).

In some embodiments, as illustrated, the supporting layer 138 may define a surface profile (for example, the surface facing the elements 122, 124) that has the same contours of the first major surface 130, for example, in at least one cross-sectional view. In some embodiments, at least some of the plurality of first elements 122 or second elements 124 define generally planar element outer surfaces 126, 128 applied to the contoured surface of the supporting layer 138, which at least partially (or entirely) defines the angle between the element outer surfaces 126, 128. One or more angles may be used to define the relative orientation of the first element outer surfaces 126 and the second element outer surfaces 128 relative to one another. In some embodiments, normal vectors may be used to facilitate defining such angles. Normal vectors may be defined normal (or orthogonal or perpendicular) to a particular surface. As used herein, the term "normal" when referring to vectors refers to being normal to at least a portion of a particular surface or normal to an average tangent to the particular surface.

In some embodiments, first vectors 148 are defined normal to the first element outer surfaces 126. Second vectors 150 may be defined normal to the second element surfaces 128. At least one of the first vectors 148 and at least one of the second vectors 150 may define an interelement angle 152 therebetween. In some embodiments, the interelement angle 152 is greater than or equal to 15 degrees and less than or equal to 165 degrees (in some embodiments, greater than or equal to 45, 60, 90, or even 120 degrees or less than or equal to 135, 120, 90, or even 60 degrees). The first vectors 148 of the first element outer surfaces 126 may also be defined relative to a major surface vector 154. In some embodiments, the major surface vector 154 may be defined normal to the second major surface 132 of the multi-surface passive cooling article 125. At least one of the first vectors 148 and the major surface vector 154 may define a first element angle 156 therebetween. In some embodiments, the first element angle 156 is greater than or equal to 15 degrees (or greater than or equal to 45, 60, or even 75 degrees) and less than or equal to 75 degrees (or less than or equal to 65 or even 50 degrees). The second vectors 150 of the element outer surfaces 128 may also be defined relative to the major surface vector 154. At least one of the second vectors 150 and the major surface vector 154 may define a second element angle 158 therebetween. In some embodiments, the second element angle 158 is greater than or equal to 15 degrees (or greater than or equal to 30 or even 45 degrees) and less than or equal to 75 degrees (or less than or equal to 45 or even 30 degrees).

Various suitable materials and structures may be used to at least partially (or entirely) form at least some (or all) the first elements 122. Non-limiting examples of materials and structures that may be used to form the first elements 122 include: a radiative cooling article as described in detail above with respect to the first aspect, a dense fluoropolymer layer, a microporous (or micro-voided) fluoropolymer layer, a dense polyester layer at least partially (or entirely) covered by a dense fluoropolymer layer, a microporous (or micro-voided) polyester layer at least partially (or entirely) covered by a dense fluoropolymer layer, a multilayer optical film at least partially (or entirely) defining a high average reflectance in the solar wavelength range, and a metal layer at least partially (or entirely) defining a high average reflectance in the solar wavelength range.

In some embodiments, at least some (or all) of the plurality of first elements 122 may include inorganic particles at least partially (or entirely) defining a high average reflectance in the solar region. In particular, the inorganic particles may be, or include, white inorganic particles. Various types of inorganic particles, fluoropolymers, microporous (or micro-voided) polymer layers, multilayer optical films (such as solar mirror films), and metal layers are described further herein.

Various suitable materials and structures may be used to at least partially (or entirely) form at least some (or all) of the second elements 124. Non-limiting examples of materials and structures that may be used to form the second elements 124 include: a dense polyethylene layer, a dense polyethylene copolymer layer, a microporous (or micro-voided) polyethylene layer, a microporous (or micro-voided) polyethylene copolymer layer, a fluoropolymer layer defining a thickness less than or equal to 10 micrometers, a coating including metal, an infrared mirror film at least partially (or entirely) defining a low absorbance in the atmospheric window wavelength range, a graphic layer at least partially (or entirely) defining a low absorbance in the atmospheric window wavelength range, a graphic layer at least partially (or entirely) covered by an infrared mirror film at least partially (or entirely) defining a low absorbance in the atmospheric window wavelength range, and a metal layer at least partially (or entirely) defining a high average reflectance in the solar wavelength range. One commercially available material that may be used to form the second elements 124 (or 128) is a film sold under the trade designation "3M THINSULATE Window Film Climate Control 75" from 3M Company.

Various types of polyethylene copolymers, coatings including metal, infrared mirror films (such as low emissivity infrared mirror films), and graphic layers are described further herein.

Various suitable materials and structures may be used to at least partially (or entirely) form at least some (or all) first outer layers 144 of the plurality of first elements 122. Non-limiting examples of materials and structures that may be used to form the first outer layers 144 include: a radiative cooling article as described in detail above with respect to the first aspect, a dense fluoropolymer layer, a microporous (or micro-voided) fluoropolymer layer, a dense polyester layer at least partially (or entirely) covered by a dense fluoropolymer layer, a microporous (or micro-voided) polyester layer at least partially (or entirely) covered by a dense fluoropolymer layer, and a multilayer optical film at least partially (or entirely) defining a high average reflectance in the solar wavelength range.

Various suitable materials and structures may be used to at least partially (or entirely) form at least some (or all) of the second outer layers 146. Non-limiting examples of materials and structures that may be used to form the second outer layers 146 include: a dense polyethylene layer, a dense polyethylene copolymer layer, a microporous (or micro-voided) polyethylene layer, a microporous (or micro-voided) polyethylene copolymer layer, a fluoropolymer layer defining a thickness less than or equal to 10 micrometers, a coating including metal, an infrared mirror film at least partially (or entirely) defining a low absorbance in the atmospheric window wavelength range, a graphic layer at least partially (or entirely) defining a low absorbance in the atmospheric window wavelength range, and a graphic layer at least partially (or entirely) covered by an infrared mirror film at least partially (or entirely) defining a low absorbance in the atmospheric window wavelength range.

Various suitable materials and structures may be used to at least partially (or entirely) form at least some (or all) of the supporting layer 138, first supporting layers 140, or second supporting layers 142. Non-limiting examples of materials and structures that may be used to form the supporting layer 138, first supporting layers 140, or second supporting layers 142 include: a metal layer and a polymer layer. Non-limiting examples of materials and structures that may be used to form the polymer layer include: a dense polymer layer, a microporous (or micro-voided) polymer layer that may at least partially (or entirely) define a high average reflectance in the solar wavelength range, a multilayer optical film at least partially (or entirely) defining a high average reflectance in the solar wavelength range, and a graphic layer.

Various suitable materials and structures may be used to at least partially (or entirely) define the high absorbance in the atmospheric window region for the plurality of first elements 122. Non-limiting examples of materials and structures that may be used to at least partially (or entirely) define the high absorbance in the atmospheric window region include: a radiative cooling article as described in detail above with respect to the first aspect, a dense fluoropolymer layer, a microporous (or micro-voided) fluoropolymer layer, a dense polyester layer at least partially (or entirely) covered by a dense fluoropolymer layer, a microporous (or micro-voided) polyester layer at least partially (or entirely) covered by a dense fluoropolymer layer, and a multilayer optical film.

In some embodiments, at least some (or all) of the first elements 122 may include various structures, which may contribute to the high absorbance in the atmospheric window region. In some embodiments, inorganic particles may be provided as surface or embedded structures on or in material of the plurality of first elements 122, such as embedded in any polymer layer (such as a dense polymer layer, a microporous (or micro-voided) polymer layer, or a multilayer optical film), to contribute to the high absorbance in the atmospheric window region. In some embodiments, the inorganic particles may be, or include, white inorganic particles, which may at least partially (or entirely) define a high average reflectance in the solar region. Any suitable white inorganic particles may be used known to one skilled in the art having the benefit of the present disclosure. Inorganic particles may include those discussed above with respect to FIGS. 13A-13E.

Various suitable materials and structures may be used to at least partially (or entirely) define the low absorbance in the atmospheric window region for the plurality of second elements 124. Non-limiting examples of materials and structures that may be used to at least partially (or entirely) define the low absorbance in the atmospheric window region include: a dense polyethylene layer, a dense polyethylene copolymer layer, a microporous (or micro-voided) polyethylene layer, a microporous (or micro-voided) polyethylene copolymer layer, a fluoropolymer layer defining a thickness less than or equal to 10 micrometers, a coating including metal, an infrared mirror film at least partially (or entirely) defining a low absorbance in the atmospheric window wavelength range, a graphic layer, and a graphic layer at least partially (or entirely) covered by an infrared mirror film.

Various suitable materials and structures may be used to at least partially (or entirely) define the high average reflectance in the solar region for the plurality of first elements 122 or second elements 124. Non-limiting examples of materials and structures that may be used to at least partially (or entirely) define the high average reflectance in the solar region include: a radiative cooling article as described in detail above with respect to the first aspect, a metal layer at least partially (or entirely) defining a high average reflectance in the solar wavelength range, a microporous (or micro-voided) polymer layer, and a multilayer optical film. In some embodiments, one or more of the structures also include white inorganic particles, such as any polymer layer or multilayer optical film, that at least partially (or entirely) define a high average reflectance in the solar region.

The first major surface 130 may be described as a textured surface. Some textures (for example, depending on the dimensions of the various surface structures relative to the wavelength of electromagnetic radiation) may enhance the passive cooling effects achieved by the multi-surface passive cooling article 125 as a whole. While one purpose of texturing the first major surface 130 to include surface structures may be to provide radiative cooling, texturing may also provide additional benefits, such as drag resistance or antisoiling. Various types of surface structures may include surface microstructures or surface nanostructures, which may be discrete or continuous.

In some embodiments, at least some of the plurality of first elements 122 or second elements 124 may define various anti-drag surface structures to provide a reduction in drag resistance, for instance when used on a surface of a vehicle. The texturing may achieve drag reduction, for example, when the vehicle moves through the air. The presence of surface microstructures or nanostructures may result in a lowered coefficient of friction between the surface and the air through which the vehicle is moving, which can result in cost or fuel savings. Any suitable shape may be used to form the anti-drag surface structures, for example, similar to the shapes shown in FIGS. 9-11 and 13A-13E.

In some embodiments, at least some of the plurality of first elements 122 or second elements 124 may define various antisoiling surface structures, which may contribute to dirt resistance and antisoiling properties. In some embodiments, antisoiling surface structures may be defined in, or on, at least some of the first outer surfaces 126 or the second outer surfaces 128 to contribute to dirt resistance or antisoiling properties. In particular, in some embodiments, at least the first outer surfaces 126, which may be more susceptible to dirt and soiling than the second outer surfaces 128, may include antisoiling surface structures. Non-limiting examples of antisoiling surface structures for dirt resistance and antisoiling properties are shown in FIGS. 4A-11 and 13A-13E and discussed in detail above with respect to the antisoiling layer.

Any suitable fluoropolymer material may be used in the multi-surface passive cooling article 125. Non-limiting examples of fluoropolymers that may be used include those discussed above in detail with respect to the protective layer.

Any suitable microporous (or micro-voided) polymer layer (or film) may be used, for instance as discussed above with respect to the white diffusely reflective layer.

FIG. 15 is a schematic cross-sectional illustration of another example of a multi-surface passive cooling article 180. The plurality of first elements 182 and the plurality of second elements 184 may each include structures or materials to provide a reflectance and a high or low absorbance and emissivity, respectively. In particular, the plurality of first elements 182 may provide a high absorbance in the atmospheric window region and a high reflectance in the solar region, and the plurality of second elements 184 may provide a low absorbance in the atmospheric window region and a high reflectance in the solar region. Any suitable materials may be used to form the article 180, such as the same or similar materials used to form the multi-surface passive cooling article 125. Also shown are first element outer surfaces 186 and second element outer surfaces 188 that are curved, which may also be used as the corresponding first element outer surfaces 126 or second element outer surfaces 128 of FIG. 14. In the illustrated embodiment, the cross-sectional profile of each of the first element outer surfaces 186 or the second element outer surfaces 188 has a quarter circle shape. In some embodiments, the shape of the multi-surface passive cooling article 125 is advantageous in that it can readily be employed with half of a pipe (or a whole pipe) that carries fluid, thus cooling the fluid within the pipe structure.

First vectors 190 may be defined normal to the first element outer surfaces 186. Second vectors 192 may be defined normal to the second element outer surfaces 188. As illustrated, the first and second vectors 190, 192 are defined as being normal to either at least a portion of the respective outer surfaces 186, 188 or normal to an average tangent to the respective outer surfaces 186, 188.

Figure 17:
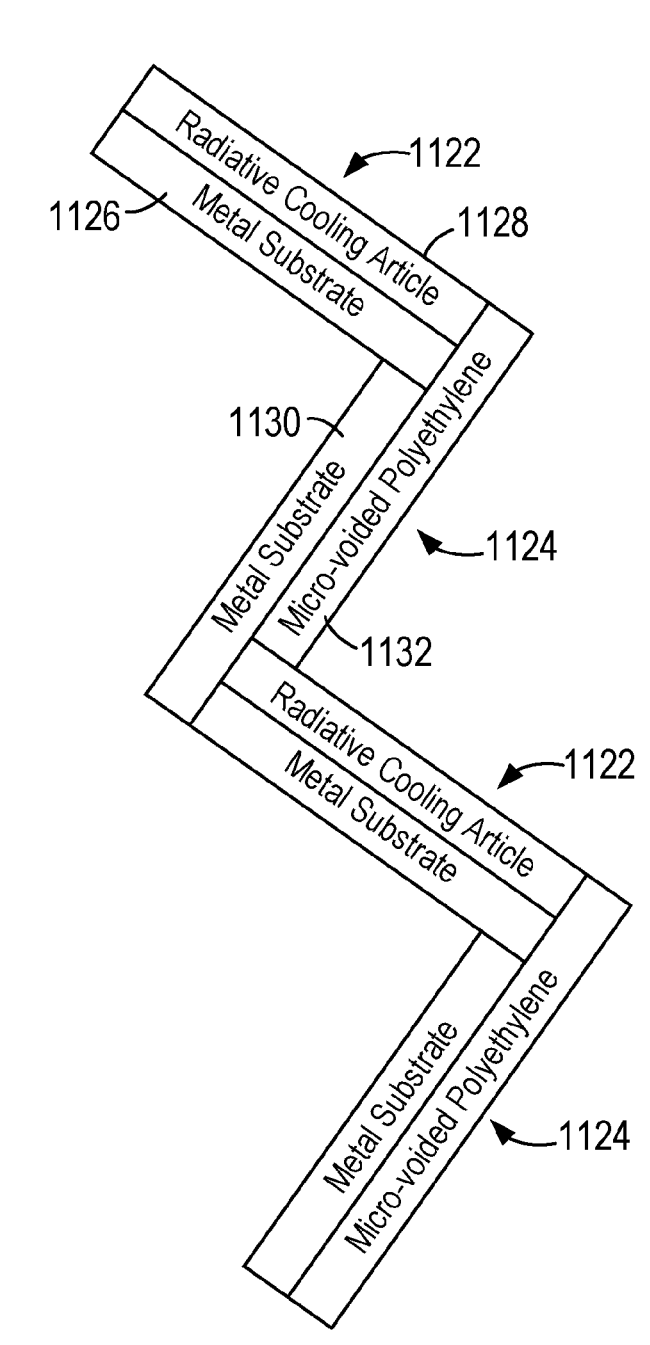
FIG. 17 is a schematic cross-sectional illustration of a particular example of a multi-surface passive cooling article

FIG. 17 is a schematic illustration one example of the multi-surface passive cooling article 125 of FIG. 14. In the illustrated embodiment, the article 1120 includes a plurality of first elements 1122 and a plurality of second elements 1124. The plurality of first elements 1122 include first supporting layers 1126 and first outer layers 1128 at least partially, or entirely, covering the respective first supporting layers. The plurality of second elements 1124 include second supporting layers 1130 and second outer layers 1132 at least partially, or entirely, covering the respective second supporting layers. The first outer layers 1128 may include a radiative cooling article, and which at least partially, or entirely, define high average reflectance in the solar region and high absorbance in the atmospheric window region. The second outer layers 1132 may be at least partially formed of, or include, a microporous polyethylene, which may be a micro-voided polyethylene, to at least partially, or entirely, define high average reflectance in the solar region and low absorbance in the atmospheric window region. The first and second supporting layers 1126, 1130 may be formed of a metal such that they are metal substrates.

In any embodiment, the multi-surface passive cooling article comprises one or more optional transparent adhesive tie layers to adhere any elements/structures to each other as needed. Suitable transparent adhesive tie layers are described above in detail with respect to the radiative cooling article.

Further details regarding suitable multi-surface passive cooling layers are described in co-owned U.S. Application Ser. No. 62/955,800 (Hebrink et al.) entitled "Multi-Surface Passive Cooling Articles", incorporated by reference herein in its entirety.

EXEMPLARY EMBODIMENTS

In a first embodiment, the present disclosure provides a radiative cooling article. The radiative cooling article comprises a) a white diffusely reflective microporous layer; and b) a non-white color reflective mirror film having a plurality of first optical layers and a plurality of second optical layers. The white diffusely reflective microporous layer has a solar weighted reflectivity at normal incidence of electromagnetic radiation over a majority of wavelengths in a range of 350 nanometers (nm) to 2500 nm of 0.8 or greater, 0.85, 0.9, or 0.95 or greater. The non-white color reflective film is disposed adjacent to a major surface of the white diffusely reflective microporous layer and the non-white color reflective film reflects a wavelength bandwidth of at least 30 nm within a wavelength range of 350 nm to 700 nm.

In a second embodiment, the present disclosure provides a radiative cooling article according to the first embodiment, wherein the white diffusely reflective microporous layer comprises a micro-voided film.

In a third embodiment, the present disclosure provides a radiative cooling article according to the first embodiment or the second embodiment, wherein the white diffusely reflective microporous layer comprises a polyester or polyester copolymer.

In a fourth embodiment, the present disclosure provides a radiative cooling article according to any of the first through third embodiments, wherein the white diffusely reflective microporous layer comprises at least one of polyethylene, polypropylene, a polysaccharide, a fluoropolymer, or a fluoropolymer copolymer.

In a fifth embodiment, the present disclosure provides a radiative cooling article according to any of the first through fourth embodiments, wherein the white diffusely reflective microporous layer comprises white inorganic particles.

In a sixth embodiment, the present disclosure provides a radiative cooling article according to any of the first through fifth embodiments, wherein the white diffusely reflective microporous layer comprises particles of an aromatic polyester.

In a seventh embodiment, the present disclosure provides a radiative cooling article according to any of the first through sixth embodiments, wherein the non-white color reflective mirror film comprises a multilayer optical film comprising alternating layers of polyethylene terephthalate (PET) and a copolymer of methyl methacrylate (coPMMA).

In an eighth embodiment, the present disclosure provides a radiative cooling article according to any of the first through seventh embodiments, wherein the non-white color reflective mirror film comprises a multilayer optical film comprising alternating layers of PET and a fluoropolymer.

In a ninth embodiment, the present disclosure provides a radiative cooling article according to any of the first through eighth embodiments, wherein the non-white color reflective mirror film reflects a wavelength bandwidth of at least 30 nm within a wavelength range from 600 nm to 700 nm.

In a tenth embodiment, the present disclosure provides a radiative cooling article according to any of the first through eighth embodiments, wherein the non-white color reflective mirror film reflects a wavelength bandwidth of at least 30 nm within a wavelength range from 400 nm to 500 nm.

In an eleventh embodiment, the present disclosure provides a radiative cooling article according to any of the first through eighth embodiments, wherein the non-white color reflective mirror film reflects a wavelength bandwidth of at least 30 nm within a wavelength range from 500 nm to 600 nm.

In a twelfth embodiment, the present disclosure provides a radiative cooling article according to any of the first through eleventh embodiments, wherein the non-white color reflective mirror also reflects a wavelength bandwidth of at least 30 nm within a wavelength range from 700 nm to 2000 nm.

In a thirteenth embodiment, the present disclosure provides a radiative cooling article according to any of the first through twelfth embodiments, further comprising one or more indicium present on a major surface of at least one of the white diffusely reflective microporous layer or the non-white color reflective mirror film.

In a fourteenth embodiment, the present disclosure provides a radiative cooling article according to the thirteenth embodiment, wherein the one or more indicium comprises at least one infrared-reflective pigment.

In a fifteenth embodiment, the present disclosure provides a radiative cooling article according to any of the first through fourteenth embodiments, further comprising a hard coat or overlaminate layer disposed adjacent to a major surface of the non-white color reflective mirror film and opposite the white diffusely reflective microporous layer, wherein the hard coat or overlaminate layer is an outer layer.

In a sixteenth embodiment, the present disclosure provides a radiative cooling article according to any of the first through fourteenth embodiments, further comprising a protective layer comprising a fluoropolymer, the protective layer disposed adjacent to a major surface of the non-white color reflective mirror film and opposite the white diffusely reflective microporous layer, wherein the protective layer is an outer layer.

In a seventeenth embodiment, the present disclosure provides a radiative cooling article according to the sixteenth embodiment, wherein the protective layer comprises surface structures.

In a eighteenth embodiment, the present disclosure provides a radiative cooling article according to any of the first through fourteenth embodiments, further comprising an antisoiling layer disposed adjacent to a major surface of the non-white color reflective mirror film and opposite the white diffusely reflective microporous layer, wherein the antisoiling layer is an outer layer.

In a nineteenth embodiment, the present disclosure provides a radiative cooling article according to the eighteenth embodiment, wherein the antisoiling layer comprises an outwardly facing antisoiling surface extending along an axis, wherein a plane containing the axis defines a cross section of the layer and intersects the surface to define a line describing the surface in two dimensions. The layer comprises a) series of micro-structures at least partially defined by the line, the line defining a series of alternating micro-peaks and micro-spaces along the axis, wherein either 1) a boundary between each adjacent micro-peak and micro-space includes at least one of a bend or an inflection point of the line, or 2) each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees. The layer further comprises b) a plurality of nano-structures at least partially defined by the line, the line defining at least one series of nano-peaks disposed on at least the micro-spaces along the axis, wherein each nano-peak has a height and each corresponding micro-peak has a height of at least 10 times the height of the nano-peak.

In a twentieth embodiment, the present disclosure provides a radiative cooling article according to any of the fifteenth through nineteenth embodiments, wherein the hard coat or overlaminate layer, the protective layer, or the antisoiling layer comprises ceramic or glass beads, ceramic or glass bubbles, or combinations thereof.

In a twenty-first embodiment, the present disclosure provides a radiative cooling article according to any of the first through twentieth embodiments, further comprising an infrared-reflective layer disposed between the white diffusely reflective microporous layer and the non-white color reflective mirror film or adjacent to the non-white color reflective mirror film and opposite the white diffusely reflective microporous layer, wherein the infrared-reflective layer has an average reflectance of at least 50 percent over the wavelength range of 700 nm to 2000 nm.

In a twenty-second embodiment, the present disclosure provides a radiative cooling article according to any of the first through twenty-first embodiments, further comprising an ultraviolet-reflective multilayer optical film disposed adjacent to the non-white color reflective mirror film and opposite the white diffusely reflective microporous layer, wherein the ultraviolet-reflective multilayer optical film is at least 50 percent reflective of ultraviolet radiation over a majority of wavelengths in a range of at least 340 nm but less than 400 nm.

In a twenty-third embodiment, the present disclosure provides a radiative cooling article according to any of the first through twenty-second embodiments, further comprising a transparent adhesive tie layer disposed between the white diffusely reflective microporous layer and the non-white color reflective mirror film.

In a twenty-fourth embodiment, the present disclosure provides a radiative cooling article according to any of the first through twenty-third embodiments, further comprising an air bleed adhesive disposed adjacent to the white diffusely reflective microporous layer and opposite the non-white color reflective mirror film.

In a twenty-fifth embodiment, the present disclosure provides a radiative cooling article according to any of the first through twenty-fourth embodiments, having an average absorbance of electromagnetic radiation of at least 0.80 over the wavelength range of 8-13 micrometers.

In a twenty-sixth embodiment, the present disclosure provides a radiative cooling article according to any of the first through twenty-fifth embodiments, exhibiting passive radiative cooling to below ambient temperature under direct sunlight.

In a twenty-seventh embodiment, the present disclosure provides a composite cooling system. The composite cooling system comprises a radiative cooling article according to any of the first through twenty-sixth embodiments attached to a vehicle or a trailer.

In a twenty-eighth embodiment, the present disclosure provides a multi-surface passive cooling article. The multi-surface passive cooling article comprises a plurality of first elements defining first element outer surfaces, the plurality of first elements defining a first absorbance of greater than or equal to 0.6 in an atmospheric window wavelength range from 8 to 13 micrometers and defining a first average reflectance of greater than or equal to 80% in a solar wavelength range from 0.4 to 2.5 micrometers. At least one of the first elements comprises a radiative cooling layer comprising a) a white diffusely reflective microporous layer that has a solar weighted reflectivity at normal incidence of electromagnetic radiation over a majority of wavelengths in a range of 350 nanometers (nm) to 2500 nm of 0.8 or greater, 0.85, 0.9, or 0.95 or greater; and b) a non-white color reflective mirror film having a plurality of first optical layers and a plurality of second optical layers, the non-white color reflective film disposed adjacent to a major surface of the white diffusely reflective microporous layer, wherein the non-white color reflective film reflects a wavelength bandwidth of at least 30 nm within a wavelength range of 350 nm to 700 nm. The multi-surface passive cooling article further comprises a plurality of second elements defining second element outer surfaces, the plurality of second elements defining a second absorbance of less than or equal to 0.5 in the atmospheric window wavelength range and defining a second average reflectance of greater than or equal to 60% in the solar wavelength range. The plurality of first elements and the plurality of second elements are interspersed to form a major structure having a first major surface comprising the first element outer surfaces and the second element outer surfaces and a second major surface opposing the first major surface. The major structure has a first end region and a second end region, wherein the first element outer surfaces face a first direction toward the first end region and the second element outer surfaces face a second direction toward the second end region.

In a twenty-ninth embodiment, the present disclosure provides a multi-surface passive cooling article according to the twenty-eighth embodiment, wherein the radiative cooling later is according to any of the second through twenty-sixth embodiments.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

A red color reflective (590-795 nm) film (obtained under the trade designation "3M DICHROIC GLASS FINISH DF-PA BLAZE" from 3M, St. Paul, MN) was laminated to a 188 micron thick micro-voided PET film (obtained under the trade designation "LUMIRROR XJSA2" from Toray Plastics (America) Inc., North Kingstown, RI) using an optically clear adhesive (obtained under the trade designation "3M OCA 8171" from 3M, St. Paul, MN).

The red color reflecting microporous composite film was then laminated with the optically clear adhesive 3M OCA 8171 to an aluminum plate having a thermistor temperature data logger (obtained under the trade designation "HOBO MX2303" from Onset Computer Corporation, Bourne, MA) embedded in its surface and adhered with aluminum-backed tape (obtained under the trade designation "3M ALUMINUM FOIL TAPE 425", from 3M, St. Paul, MN) to create radiative cooling plate RCP1. One inch (2.54 cm) thick polystyrene foam insulation was placed under the aluminum control radiative cooling plate RCP1 to thermally isolate it from the ground. Another HOBO MX2303 thermistor temperature data logger was used to measure the ambient air temperature adjacent to RCP1. Ambient air temperature and RCP1 temperature were measured continuously for 100 hours (hr) with temperature being recorded by the thermocouple data logger every 1 minute. Ambient air temperatures and RCP1 temperatures recorded every minute were averaged over 100 hr or 6000 data points. Average ambient air temperature was measured to be 21.5° C. Average RCP1 temperature was measured to be 19.4° C. for a difference of −2.1° C. sub-ambient cooling.

Example 2

A red color reflective and near IR reflective (650-1350 nm) film (obtained under the trade designation "3M COOL MIRROR FILM 330" from 3M, St. Paul, MN) was laminated to a 188 micron thick micro-voided PET film (obtained under the trade designation "LUMIRROR XJSA2" from Toray Plastics (America) Inc., North Kingstown, RI) using an optically clear adhesive (obtained under the trade designation "3M OCA 8171" from 3M, St. Paul, MN).

The red color reflecting microporous composite film was then laminated with optically clear adhesive obtained as 3M OCA 8171 to an aluminum plate having a thermistor temperature data logger (obtained under the trade designation "HOBO MX2303" from Onset Computer Corporation, Bourne, MA) embedded in its surface and adhered with aluminum-backed tape (obtained under the trade designation "3M ALUMINUM FOIL TAPE 425 from 3M, St. Paul, MN) to create radiative cooling plate RCP2. One-inch thick polystyrene foam insulation was placed under the aluminum control radiative cooling plate RCP2 to thermally isolate it from the ground. Another HOBO MX2303 thermistor temperature data logger was used to measure the ambient air temperature adjacent to RCP2. Ambient air temperature and RCP2 temperature were measured continuously for 100 hr with temperature being recorded by the thermocouple data logger every 1 minute. Ambient air temperatures and RCP2 temperatures recorded every minute were averaged over 100 hr or 6000 data points. Average ambient air temperature was measured to be 21.5° C. Average RCP2 temperature was measured to be 18.4° C. for a difference of −3.1° C. sub-ambient cooling.

Example 3

Figure 18:
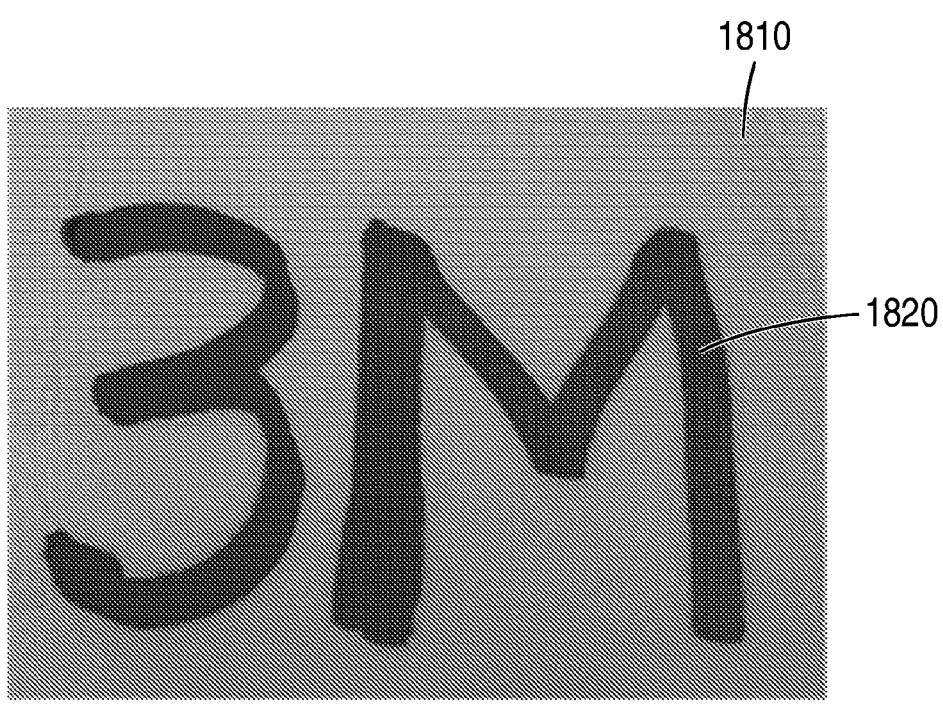
FIG. 18 is a photograph of the exemplary radiative cooling article prepared in Example 3.

A red color reflective and near IR reflective (650-1350 nm) film (obtained under the trade designation "3MCOOL MIRROR 330" from 3M, St. Paul, MN) was laminated to a 188 micron thick micro-voided PET film (obtained under the trade designation "LUMIRROR XJSA2" from Toray Plastics (America) Inc., North Kingstown, RI) using an optically clear adhesive (obtained under the trade designation "3M OCA 8171" from 3M. St. Paul, MN). Prior to lamination a 3M Logo was drawn onto the LUMIRROR XJSA2 micro-voided PET film with a black permanent marker (obtained under the trade designation "SHARPIE" from Newell Brands, Oak Brook, IL) as shown in FIG. 18.

The red color reflecting microporous composite film was then laminated with optically clear adhesive obtained as 3M OCA 8171 to an aluminum plate having a thermistor temperature data logger (obtained under the trade designation "HOBO MX2303" from Onset Computer Corporation, Bourne, MA) embedded in its surface and adhered with aluminum-backed tape (obtained under the trade designation "3M ALUMINUM FOIL TAPE 425" from 3M, St. Paul, MN to create radiative cooling plate RCP3. One-inch thick polystyrene foam insulation was placed under the aluminum control radiative cooling plate RCP3 to thermally isolate it from the ground. Another HOBO MX2303 thermistor temperature data logger was used to measure the ambient air temperature adjacent to RCP3. Ambient air temperature and RCP3 temperature were measured continuously for 100 hr with temperature being recorded by the thermocouple data logger every 1 minute. Ambient air temperatures and RCP3 temperatures recorded every minute were averaged over 100 hr or 6000 data points. Average ambient air temperature was measured to be 21.5° C. Average RCP3 temperature was measured to be 18.8° C. for a difference of −2.7° C. sub-ambient cooling.

Modeled Examples 4-6

The 4×4 matrix method using the Berreman algorithm was used for modeling the spectra of constructive and destructive interference generated from layer interfaces of materials having different refractive indices. The Berreman 4×4 matrix methodology is described in the Journal of the Optical Society of America (Volume 62, Number 4, April 1972) and the Journal of Applied Physics (Volume 85, Number 6, March 1999), the disclosures of which are incorporated herein by reference. Input parameters for this optical model were individual layer refractive indices, layer thicknesses, number of layers, and reflection bandwidth including a left band edge and a right band edge. The Berreman methodology was used to calculate the percent light reflected at each layer interface and the percent light transmitted at each layer interface and outputs reflection spectra and transmission spectra. The Berreman methodology was used to calculate % Reflectance spectra shown in FIGS. 20-22 of multilayer optical films (MOFs).

Figure 19:
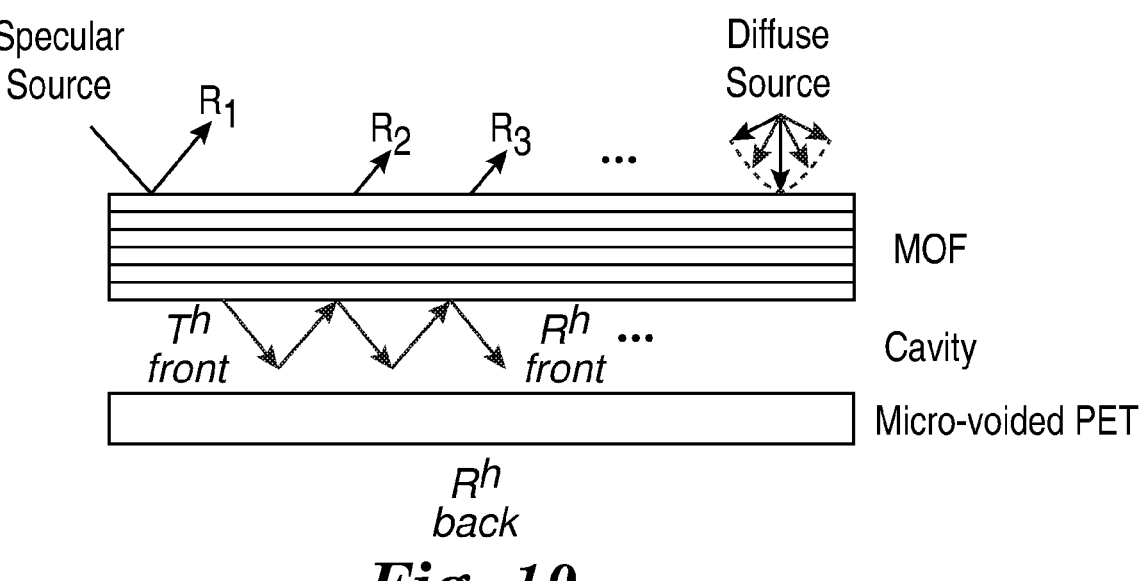
FIG. 19 is a schematic side view of a recycling cavity model for Examples 4-6.

To predict the reflected color of the composite MOF plus Micro-voided PET film, a recycling cavity model was developed as shown in FIG. 19. When a beam of light is incident on the composite film, it can be directly reflected by the MOF or transmitted through the MOF and undergo multiple reflections in the cavity between the MOF and the Micro-voided PET, and eventually, be either reflected or absorbed by the composite film.

Because the reflection from the Micro-voided PET is highly diffuse, the light intensity in the cavity can be assumed as isotropic, i.e., independent of directions. This allows the hemispherically averaged transmittance and reflectance of the MOF to be used when estimating the total reflectance of the composite film. Specifically, by tracking light that undergoes multiple reflections and transmissions, we can write down the equations for each reflection terms shown in FIG. 19 as follows:

$$
\begin{aligned}
R_1 &= R_{front} \\
R_2 &= T_{front} \cdot \left( R_{back}^h \cdot T_{front}^h \right) \\
R_3 &= T_{front} \cdot \left( R_{back}^h \cdot R_{front}^h \right) \cdot \left( R_{back}^h \cdot T_{front}^h \right) \\
R_4 &= T_{front} \cdot \left( R_{back}^h \cdot R_{front}^h \right)^2 \cdot \left( R_{back}^h \cdot T_{front}^h \right) \\
&\cdots \\
R_n &= T_{front} \cdot \left( R_{back}^h \cdot R_{front}^h \right)^{n-2} \cdot \left( R_{back}^h \cdot T_{front}^h \right)
\end{aligned}
$$

$$\text{Eq. 1}$$

where $T_{front}$, $R_{front}$ are the specular transmittance and reflectance (average of p- and s-polarization) of the MOF (as a function of wavelength and angle); $R_{back}^h$ is the diffuse reflectance of the Micro-voided PET (assumed as a constant of 0.95 in this model); $T_{front}^h$, $R_{front}^h$ are the hemispherically averaged transmittance and reflectance of the MOF (as a function of wavelength). Using Eq. 1, we can sum all the reflection terms to get the total reflection. To account for the relative contribution of the specular and diffuse light source, a weight factor w was introduced such that w=1 represents a pure specular light source, and w=0 represents a pure diffuse light source. The total reflectance of composite film can then be expressed as $$
\begin{aligned}
R_{total} &= w R_{front} + (1-w) \sum_{i=2}^{\infty} R_i \\
&= w R_{front} + (1-w) \frac{T_{front} \cdot R_{back}^h \cdot T_{front}^h}{1 - R_{back}^h \cdot R_{front}^h}
\end{aligned}
$$

$$\text{Eq. 2}$$

Eq. 2 combined with the spectral 4×4 model was used to predict the reflected color of the composite film. To match typical light source condition, 10% specular and 90% diffuse light source was used to generate predicted color in FIGS. 20-22.

Modeled Example 4: Light Red MOF+Micro-Voided PET

Micro-voided diffusely reflective white PET film available from Toray under the trade designation "LUMIRROR XJSA2" and used in Examples 1-3 above was modeled as a diffuse reflector in the solar spectrum with 95% diffuse reflectance. A modeled MOF of 275 alternating layers of PET and coPMMA in a quarter-wave stack was modelled as being laminated to the micro-voided PET film with an optically clear pressure sensitive adhesive. The MOF had left/right band edges at 400 nm and 600 nm, respectively. The modeled color of the composite film in reflection under diffuse light source ranged from light-red (on-axis) to gold (off-axis). The modeled solar reflectance was 92.68%. Since the material and construction were similar to previous Examples, the emissivity (~0.92) in the infrared wavelengths of 4-20 microns was presumed to stay the same.

Figure 20:
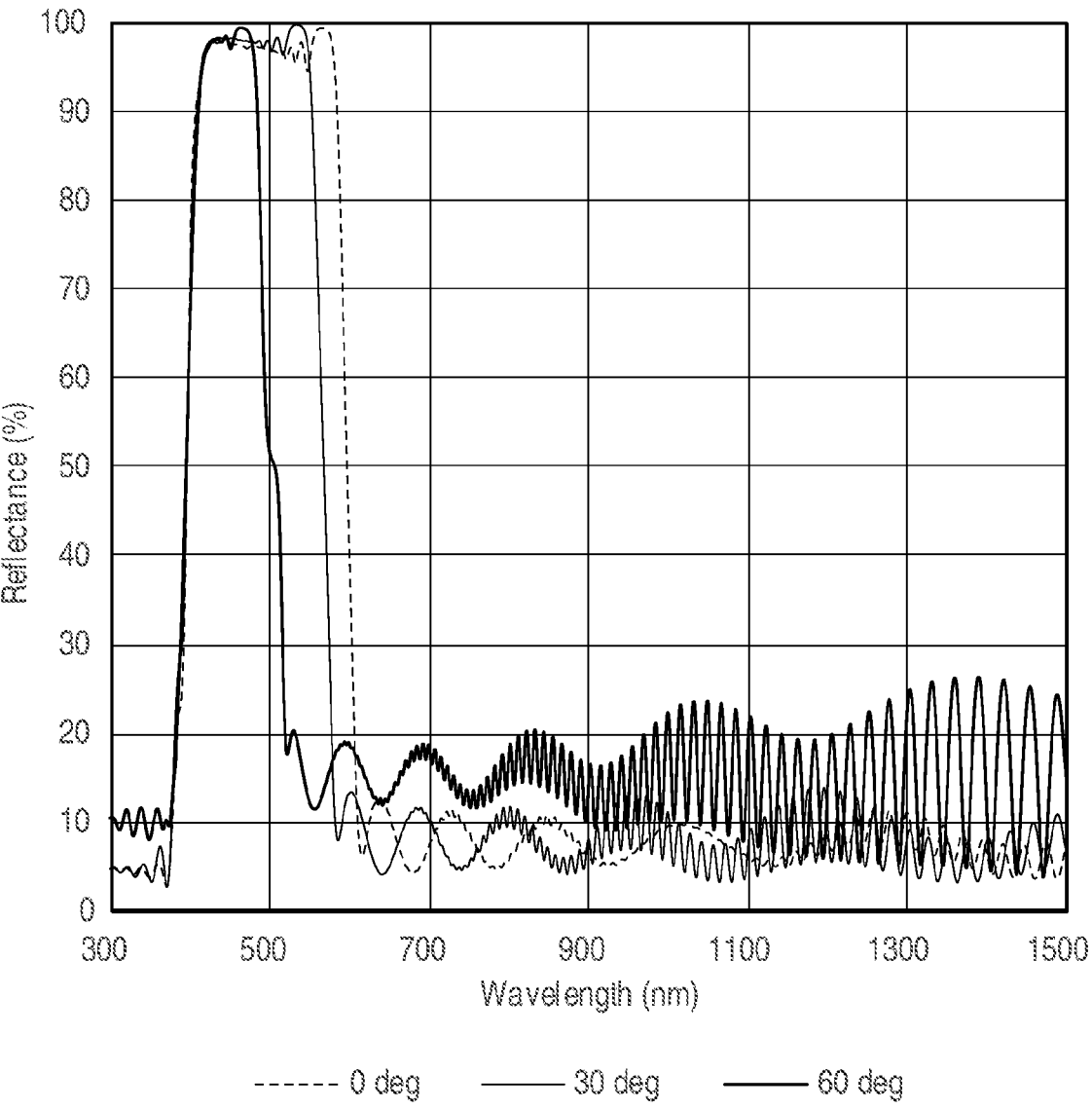
FIG. 20 is a graph of modeled reflectance spectra of the modeled multilayer optical film alone of Example 4, at 0°, 30°, and 60° incidence angles.

FIG. 20 provides a graph of modeled reflectance spectra of the modeled MOF alone at 0°, 30°, and 60° incidence angle.

TABLE 1

| Reflective La*b* values of the composite film MOF + Micro-voided PET film from 0° to 70° incidence angle. | | | |
|---|---|---|---|
| Theta | L | a* | b* |
| 0 | 60.49 | 52.80 | 37.57 |
| 5 | 60.85 | 52.62 | 38.21 |
| 10 | 61.94 | 51.93 | 40.11 |
| 15 | 63.74 | 50.25 | 43.26 |
| 20 | 66.22 | 47.00 | 47.57 |
| 25 | 69.29 | 41.68 | 52.89 |
| 30 | 72.76 | 34.21 | 58.84 |
| 35 | 76.36 | 24.99 | 64.91 |
| 40 | 79.75 | 14.76 | 70.39 |
| 45 | 82.54 | 4.72 | 74.29 |
| 50 | 84.46 | −3.90 | 75.68 |
| 55 | 85.43 | −10.08 | 73.99 |
| 60 | 85.46 | −13.51 | 68.88 |

Modeled Example 5: Green MOF+Micro-Voided PET

Micro-voided diffusely reflective white PET film available from Toray under the trade designation "LUMIRROR XJSA2" and used in Examples 1-3 above was modeled as a diffuse reflector in the solar spectrum with 95% diffuse reflectance. A modeled MOF of 550 (275×2) alternating layers of PET and coPMMA in a quarter-wave stack was modelled as being laminated to the micro-voided PET film with an optically clear pressure sensitive adhesive. The MOF had two packets of 275 layers each. The first packet had left/right band edges at 550 nm and 750 nm, respectively. The second packet had left/right band edges at 400 nm and 500 nm, respectively. The leak between the two packets in the range of 500 to 550 nm created a saturated green color. The modeled color of the composite film in reflection under diffuse light source ranged from green (on-axis) to purple (off-axis). The modeled solar reflectance was 91.87%. Since the material and construction were similar to previous Examples, the emissivity (~0.92) in the infrared wavelengths of 4-20 microns was presumed to stay the same.

Figure 21:
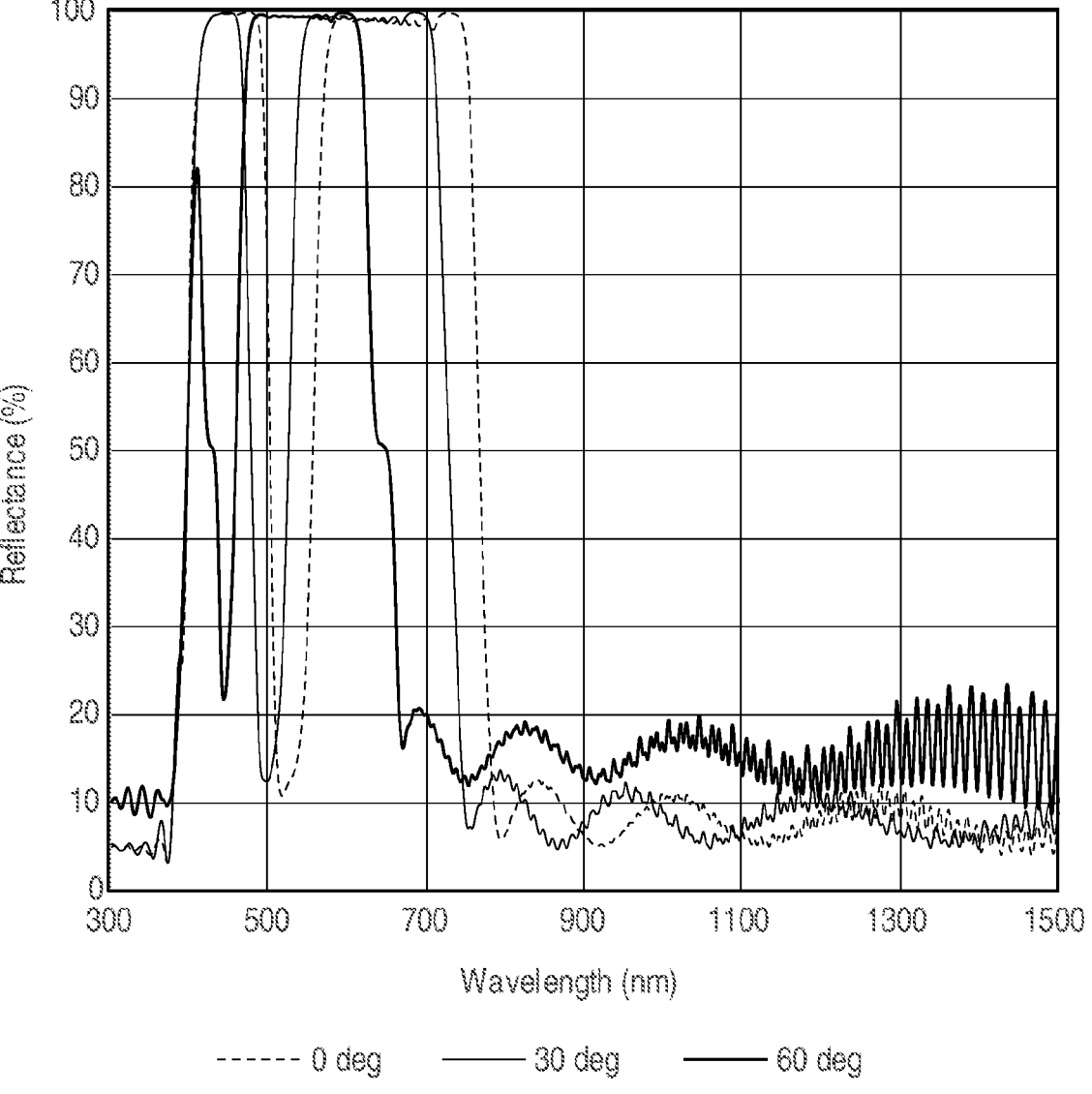
FIG. 21 is a graph of modeled reflectance spectra of the modeled multilayer optical film alone of Example 5, at 0°, 30°, and 60° incidence angles

FIG. 21 provides a graph of modeled reflectance spectra of the modeled MOF alone at 0°, 30°, and 60° incidence angle.

TABLE 2

| Reflective La*b* values of the composite film MOF + Micro-voided PET film from 0° to 70° incidence angle. | | | |
|---|---|---|---|
| Theta | L | a* | b* |
| 0 | 61.45 | −72.35 | 33.22 |
| 5 | 61.41 | −72.73 | 32.85 |
| 10 | 61.12 | −73.19 | 31.29 |
| 15 | 60.51 | −73.54 | 28.27 |
| 20 | 59.12 | −71.67 | 22.72 |
| 25 | 56.84 | −65.77 | 13.77 |
| 30 | 53.58 | −53.20 | 1.06 |
| 35 | 49.80 | −33.30 | −14.49 |
| 40 | 46.20 | −9.45 | −30.18 |
| 45 | 43.42 | 13.09 | −42.94 |
| 50 | 41.81 | 29.97 | −49.88 |
| 55 | 41.39 | 40.16 | −49.29 |
| 60 | 42.06 | 43.89 | −40.42 |

Modeled Example 6: Dark Blue MOF+Micro-Voided PET

Micro-voided diffusely reflective white PET film available from Toray under the trade designation "LUMIRROR XJSA2" and used in Examples 1-3 above was modeled as a diffuse reflector in the solar spectrum with 95% diffuse reflectance. A modeled MOF of 550 (275×2) alternating layers of PET and coPMMA in a quarter-wave stack was modelled as being laminated to the micro-voided PET film with an optically clear pressure sensitive adhesive. The MOF had two packets of 275 layers each. The first packet had left/right band edges at 500 nm and 750 nm, respectively. The second packet had left/right band edges at 400 nm and 450 nm, respectively. The leak between the two packets in the range of 450 to 500 nm created a dark blue color. The modeled color of the composite film in reflection under diffuse light source ranged from dark blue (on-axis) to dark red (off-axis). The modeled solar reflectance was 91.98%. Since the material and construction were similar to previous Examples, the emissivity (~0.92) in the infrared wavelengths of 4-20 microns was presumed to stay the same.

Figure 22:
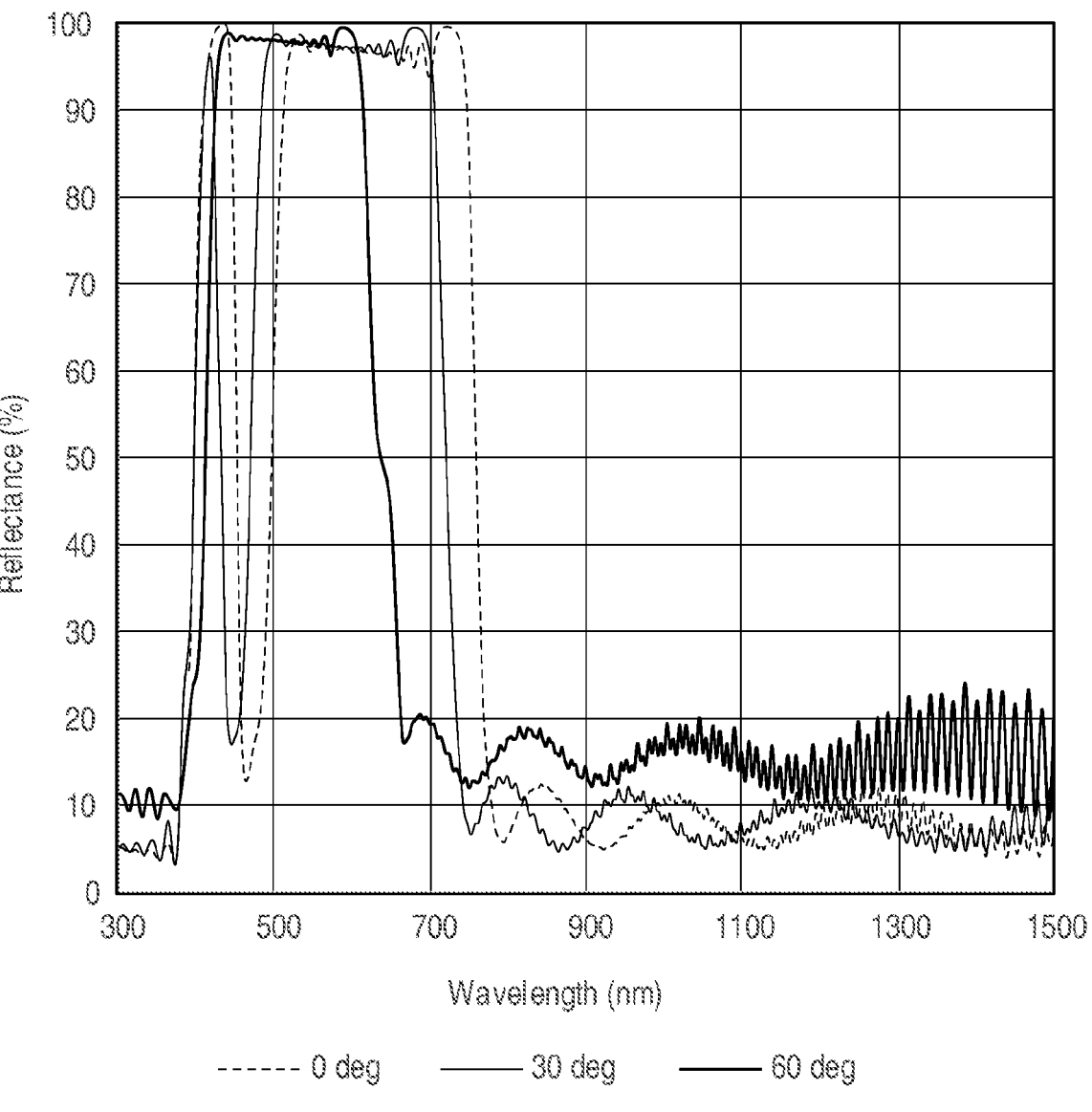
FIG. 22 is a graph of modeled reflectance spectra of the modeled multilayer optical film alone of Example 6, at 0°, 30°, and 60° incidence angles

FIG. 22 provides a graph of modeled reflectance spectra of the modeled MOF alone at 0°, 30°, and 60° incidence angle.

TABLE 3

| Reflective La*b* values of the composite film MOF + Micro-voided PET film from 0° to 70° incidence angle. | | | |
|---|---|---|---|
| Theta | L | a* | b* |
| 0 | 43.31 | 15.94 | −41.92 |
| 5 | 43.24 | 16.89 | −42.68 |
| 10 | 43.01 | 19.79 | −44.91 |
| 15 | 42.63 | 24.27 | −48.12 |
| 20 | 42.10 | 29.92 | −51.76 |
| 25 | 41.45 | 35.32 | −54.52 |
| 30 | 40.74 | 38.55 | −54.77 |
| 35 | 40.10 | 37.78 | −51.07 |
| 40 | 39.62 | 32.67 | −42.97 |
| 45 | 39.43 | 24.76 | −30.87 |

TABLE 3-continued

Reflective La*b* values of the composite film MOF + Micro-voided
PET film from 0° to 70° incidence angle.

| Theta | L | a* | b* |
|---|---|---|---|
| 50 | 39.72 | 18.39 | −16.71 |
| 55 | 40.72 | 18.86 | −4.80 |
| 60 | 42.46 | 24.78 | 3.62 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A radiative cooling article comprising:
a) a white diffusely reflective microporous layer that has a solar weighted reflectivity at normal incidence of electromagnetic radiation over a majority of wavelengths in a range of 350 nanometers (nm) to 2500 nm of at least 0.8; and
b) a non-white color reflective mirror film having a plurality of first optical layers and a plurality of second optical layers, the non-white color reflective film disposed adjacent to a major surface of the white diffusely reflective microporous layer, wherein the non-white color reflective film reflects a wavelength bandwidth of at least 30 nm within a wavelength range of 350 nm to 700 nm.

2. The radiative cooling article of claim 1, wherein the white diffusely reflective microporous layer comprises a micro-voided film.

3. The radiative cooling article of claim 1, wherein the white diffusely reflective microporous layer comprises white inorganic particles, particles of an aromatic polyester, or both.

4. The radiative cooling article of claim 1, wherein the non-white color reflective mirror film comprises a multilayer optical film comprising alternating layers of polyethylene terephthalate (PET) and a copolymer of methyl methacrylate (coPMMA) or alternating layers of PET and a fluoropolymer.

5. The radiative cooling article of claim 1, wherein the non-white color reflective mirror film reflects a wavelength bandwidth of at least 30 nm within a wavelength range from 400 nm to 500 nm, from 500 nm to 600 nm, or from 600 nm to 700 nm.

6. The radiative cooling article of claim 1, wherein the non-white color reflective mirror also reflects a wavelength bandwidth of at least 30 nm within a wavelength range from 700 nm to 2000 nm.

7. The radiative cooling article of claim 1, further comprising one or more indicium present on a major surface of at least one of the white diffusely reflective microporous layer or the non-white color reflective mirror film.

8. The radiative cooling article of claim 7, wherein the one or more indicium comprises at least one infrared-reflective pigment.

9. The radiative cooling article of claim 1, further comprising a hard coat or overlaminate layer disposed adjacent to a major surface of the non-white color reflective mirror film and opposite the white diffusely reflective microporous layer, wherein the hard coat or overlaminate layer is an outer layer.

10. The radiative cooling article of claim 1, further comprising a protective layer comprising a fluoropolymer, the protective layer disposed adjacent to a major surface of the non-white color reflective mirror film and opposite the white diffusely reflective microporous layer, wherein the protective layer is an outer layer, wherein the protective layer optionally comprises surface structures.

11. The radiative cooling article of claim 1, further comprising an antisoiling layer disposed adjacent to a major surface of the non-white color reflective mirror film and opposite the white diffusely reflective microporous layer, wherein the antisoiling layer is an outer layer, wherein the antisoiling layer comprises an outwardly facing antisoiling surface extending along an axis, wherein a plane containing the axis defines a cross section of the antisoiling layer and intersects the surface to define a line describing the surface in two dimensions, the layer comprising:
a) a series of micro-structures at least partially defined by the line, the line defining a series of alternating micro-peaks and micro-spaces along the axis, wherein either 1) a boundary between each adjacent micro-peak and micro-space includes at least one of a bend or an inflection point of the line, or 2) each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees; and
b) a plurality of nano-structures at least partially defined by the line, the line defining at least one series of nano-peaks disposed on at least the micro-spaces along the axis,
wherein each nano-peak has a height and each corresponding micro-peak has a height of at least 10 times the height of the nano-peak.

12. The radiative cooling article of claim 9, wherein the hard coat or overlaminate layer comprises ceramic or glass beads, ceramic or glass bubbles, or combinations thereof.

13. The radiative cooling article of claim 1, further comprising an infrared-reflective layer disposed between the white diffusely reflective microporous layer and the non-white color reflective mirror film or adjacent to the non-white color reflective mirror film and opposite the white diffusely reflective microporous layer, wherein the infrared-reflective layer has an average reflectance of at least 50 percent over the wavelength range of 700 nm to 2000 nm.

14. The radiative cooling article of claim 1, further comprising an ultraviolet-reflective multilayer optical film disposed adjacent to the non-white color reflective mirror film and opposite the white diffusely reflective microporous layer, wherein the ultraviolet-reflective multilayer optical film is at least 50 percent reflective of ultraviolet radiation over a majority of wavelengths in a range of at least 340 nm but less than 400 nm.

15. The radiative cooling article of claim 1, further comprising a transparent adhesive tie layer disposed between the white diffusely reflective microporous layer and the non-white color reflective mirror film.

16. The radiative cooling article of claim 1, further comprising an air bleed adhesive disposed adjacent to the white diffusely reflective microporous layer and opposite the non-white color reflective mirror film.

17. The radiative cooling article of claim 1, having an average absorbance of electromagnetic radiation of at least 0.80 over the wavelength range of 8-13 micrometers.

18. The radiative cooling article of claim 1, exhibiting passive radiative cooling to below ambient temperature under direct sunlight.

19. A composite cooling system comprising the radiative cooling article of claim 1 attached to a vehicle or a trailer.

20. A multi-surface passive cooling article comprising:

a plurality of first elements defining first element outer surfaces, the plurality of first elements defining a first absorbance of greater than or equal to 0.6 in an atmospheric window wavelength range from 8 to 13 micrometers and defining a first average reflectance of greater than or equal to 80% in a solar wavelength range from 0.4 to 2.5 micrometers, wherein at least one of the first elements comprises a radiative cooling layer comprising a) a white diffusely reflective microporous layer that has a solar weighted reflectivity at normal incidence of electromagnetic radiation over a majority of wavelengths in a range of 350 nanometers (nm) to 2500 nm of at least 0.8; and b) a non-white color reflective mirror film having a plurality of first optical layers and a plurality of second optical layers, the non-white color reflective film disposed adjacent to a major surface of the white diffusely reflective microporous layer, wherein the non-white color reflective film reflects a wavelength bandwidth of at least 30 nm within a wavelength range of 350 nm to 700 nm; and a plurality of second elements defining second element outer surfaces, the plurality of second elements defining a second absorbance of less than or equal to 0.5 in the atmospheric window wavelength range and defining a second average reflectance of greater than or equal to 60% in the solar wavelength range;

wherein the plurality of first elements and the plurality of second elements are interspersed to form a major structure having a first major surface comprising the first element outer surfaces and the second element outer surfaces and a second major surface opposing the first major surface;

wherein the major structure has a first end region and a second end region, wherein the first element outer surfaces face a first direction toward the first end region and the second element outer surfaces face a second direction toward the second end region.

* * * * *